US010161255B2

(12) United States Patent
Brozyna et al.

(10) Patent No.: US 10,161,255 B2
(45) Date of Patent: Dec. 25, 2018

(54) TURBINE NOZZLE HAVING NON-AXISYMMETRIC ENDWALL CONTOUR (EWC)

(71) Applicant: General Electric Company, Schenectady, NY (US)

(72) Inventors: Lee Larned Brozyna, Mauldin, SC (US); Christopher Lee Golden, Greer, SC (US); Christopher Donald Porter, Greenville, SC (US)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 15/019,442

(22) Filed: Feb. 9, 2016

(65) Prior Publication Data

US 2017/0226878 A1    Aug. 10, 2017

(51) Int. Cl.
*F01D 9/04* (2006.01)
*F01D 5/14* (2006.01)

(52) U.S. Cl.
CPC ............. *F01D 9/041* (2013.01); *F01D 5/145* (2013.01); *F01D 5/143* (2013.01); *F05D 2220/31* (2013.01); *F05D 2220/32* (2013.01); *F05D 2240/121* (2013.01); *F05D 2240/128* (2013.01); *F05D 2250/73* (2013.01); *F05D 2250/74* (2013.01); *Y02T 50/673* (2013.01)

(58) Field of Classification Search
CPC .. F01D 9/041; F05D 2220/31; F05D 2250/73; F05D 2240/128; F05D 2220/32; F05D 2250/74
See application file for complete search history.

(56) References Cited

U.S. PATENT DOCUMENTS

| 2,675,208 | A | 4/1954 | Weinberg |
| 3,628,880 | A | 12/1971 | Smuland |
| 4,194,869 | A | 3/1980 | Corcokios |
| 4,257,741 | A | 3/1981 | Betts et al. |
| 4,798,519 | A | 1/1989 | Zipps et al. |
| 4,804,311 | A | 2/1989 | Anderson et al. |
| 4,919,593 | A | 4/1990 | Brown |
| 5,137,426 | A | 8/1992 | Rhoda |
| 5,167,489 | A | 12/1992 | Nadia et al. |

(Continued)

OTHER PUBLICATIONS

U.S. Appl. No. 15/019,516, Office Action 1 dated Nov. 21, 2017, 15 pages.

(Continued)

*Primary Examiner* — Eldon T Brockman
(74) *Attorney, Agent, or Firm* — Ernest G. Cusick; Hoffman Warnick LLC

(57) ABSTRACT

Various embodiments of the invention include turbine nozzles and systems employing such nozzles. Various particular embodiments include a turbine nozzle having: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, pressure side, trailing edge and the leading edge, the at least one endwall including a non-axisymmetric contour proximate a junction between the endwall and the leading edge of the airfoil.

18 Claims, 6 Drawing Sheets

(56) References Cited

U.S. PATENT DOCUMENTS

| | | |
|---|---|---|
| 5,257,908 A | 11/1993 | Ortolano |
| 5,397,215 A | 3/1995 | Spear et al. |
| 5,466,123 A | 11/1995 | Rose |
| 5,482,435 A | 1/1996 | Dorris et al. |
| 6,017,186 A | 1/2000 | Hoeger et al. |
| 6,079,948 A | 6/2000 | Sasaki et al. |
| 6,503,054 B1 | 1/2003 | Bielek et al. |
| 6,685,434 B1 | 2/2004 | Humanchuk et al. |
| 6,736,599 B1 | 5/2004 | Jacks et al. |
| 6,739,838 B1 | 5/2004 | Bielek et al. |
| 6,779,980 B1 | 8/2004 | Brittingham et al. |
| 6,808,368 B1 | 10/2004 | Tomberg et al. |
| 6,832,897 B2 | 12/2004 | Urban |
| 6,857,853 B1 | 2/2005 | Tomberg et al. |
| 6,969,232 B2 | 11/2005 | Zess et al. |
| 7,063,509 B2 | 6/2006 | Snook et al. |
| 7,134,842 B2 | 11/2006 | Tam et al. |
| 7,220,100 B2 | 5/2007 | Lee et al. |
| 7,249,933 B2 | 7/2007 | Lee et al. |
| 7,371,046 B2 | 5/2008 | Lee et al. |
| 7,396,205 B2 | 7/2008 | Dube et al. |
| 7,527,473 B2 | 5/2009 | Humanchuk et al. |
| 7,690,890 B2 | 4/2010 | Aotsuka et al. |
| 7,731,483 B2 | 6/2010 | DeLong et al. |
| 7,758,311 B2 | 7/2010 | Loehle et al. |
| 8,070,428 B2 | 12/2011 | Bielek et al. |
| 8,105,037 B2 * | 1/2012 | Grover .......... F01D 5/143 416/179 |
| 8,182,228 B2 | 5/2012 | Riley et al. |
| 8,206,115 B2 | 6/2012 | Gupta et al. |
| 8,313,291 B2 | 11/2012 | Mariolli et al. |
| 8,439,643 B2 | 5/2013 | Kuhne et al. |
| 8,469,659 B2 * | 6/2013 | Sakamoto .......... F01D 5/143 415/191 |
| 8,714,930 B2 | 5/2014 | Herzlinger et al. |
| 8,720,207 B2 * | 5/2014 | Gersbach .......... F01D 5/143 415/191 |
| 8,807,950 B2 | 8/2014 | Bielek et al. |
| 8,814,511 B2 | 8/2014 | Check et al. |
| 8,834,129 B2 | 9/2014 | Barnes et al. |
| 9,085,985 B2 | 7/2015 | Barr et al. |
| 9,140,128 B2 * | 9/2015 | Aggarwala .......... F01D 5/143 |
| 9,322,282 B2 | 4/2016 | Chouhan et al. |
| 9,638,041 B2 | 5/2017 | Brozyna et al. |
| 2005/0106025 A1 | 5/2005 | Snook et al. |
| 2005/0169761 A1 | 8/2005 | Dube et al. |
| 2006/0233641 A1 | 10/2006 | Lee et al. |
| 2010/0080708 A1 | 4/2010 | Gupta et al. |
| 2010/0143139 A1 | 6/2010 | Pandey et al. |
| 2010/0196154 A1 * | 8/2010 | Sakamoto .......... F01D 5/143 415/208.2 |
| 2010/0254797 A1 * | 10/2010 | Grover .......... F01D 5/143 415/1 |
| 2010/0278644 A1 * | 11/2010 | Gersbach .......... F01D 5/143 415/208.2 |
| 2011/0044818 A1 | 2/2011 | Kuhne et al. |
| 2012/0201688 A1 | 8/2012 | Mahle et al. |
| 2013/0164137 A1 | 6/2013 | Barnes et al. |
| 2014/0090380 A1 * | 4/2014 | Aggarwala .......... F01D 5/143 60/726 |
| 2014/0119923 A1 | 5/2014 | Chouhan |
| 2014/0154079 A1 | 6/2014 | Chouhan et al. |
| 2015/0110618 A1 | 4/2015 | Stein et al. |
| 2015/0211373 A1 | 7/2015 | Subbareddyar et al. |
| 2017/0089203 A1 | 3/2017 | Lohaus |
| 2017/0183972 A1 | 6/2017 | McDufford |
| 2017/0183973 A1 | 6/2017 | McDufford et al. |
| 2017/0183974 A1 | 6/2017 | McDufford |

OTHER PUBLICATIONS

U.S. Appl. No. 15/019,426, Office Action 1 dated Dec. 29, 2017, 11 pages.
U.S. Appl. No. 15/019,461, Office Action 1 dated Jan. 5, 2018, 14 pages.
U.S. Appl. No. 15/019,476, Office Action 1 dated Jan. 5, 2018, 14 pages.
U.S. Appl. No. 15/019,487, Office Action 1 dated Jan. 5, 2018, 13 pages.
U.S. Appl. No. 15/019,502, Office Action 1 dated Jan. 5, 2018, 13 pages.
U.S. Appl. No. 15/019,379 Office Action dated Mar. 19, 2018, 21 pages.
U.S. Appl. No. 15/019,516, Notice of Allowance dated Apr. 6, 2018, 14 pages.
U.S. Appl. No. 15/019,426, Office Action dated Jun. 12, 2018, 19 pages.
U.S. Appl. No. 15/019,487, Final Office Action dated Jun. 14, 2018, 17 pages.
U.S. Appl. No. 15/019,461, Final Office Action dated Jun. 29, 2018, 16 pages.
U.S. Appl. No. 15/019,476, Final Office Action dated Jun. 29, 2018, 17 pages.
U.S. Appl. No. 15/019,502, Final Office Action dated Jun. 29, 2018, 16 pages.
U.S. Appl. No. 15/019,426, Notice of Allowance dated Sep. 12, 2018, 11 pages.
U.S. Appl. No. 15/019,461, Notice of Allowance dated Sep. 17, 2018, 11 pages.
U.S. Appl. No. 15/019,487, Notice of Allowance dated Sep. 18, 2018, 13 pages.
U.S. Appl. No. 15/019,379, Notice of Allowance dated Sep. 25, 2018, 9 pages.
U.S. Appl. No. 15/019,502, Notice of Allowance dated Oct. 24, 2018, 11 pages.

* cited by examiner

TURBINE NOZZLE HAVING NON-AXISYMMETRIC ENDWALL CONTOUR (EWC)

FIELD OF THE INVENTION

The subject matter disclosed herein relates to turbomachines. More particularly, the subject matter disclosed herein relates to components within turbomachines such as gas and/or steam turbines.

BACKGROUND OF THE INVENTION

Some aircraft and/or power plant systems, for example certain jet aircraft, nuclear, simple cycle and combined cycle power plant systems, employ turbines (also referred to as turbomachines) in their design and operation. Some of these turbines employ airfoils (e.g., turbine blades, blades, airfoils, etc.) which during operation are exposed to fluid flows. These airfoils are configured to aerodynamically interact with the fluid flows and generate energy (e.g., creating thrust, turning kinetic energy to mechanical energy, thermal energy to mechanical energy, etc.) from these fluid flows as part of power generation. As a result of this interaction and conversion, the aerodynamic characteristics and losses of these airfoils have an impact on system and turbine operation, performance, thrust, efficiency, and power.

BRIEF DESCRIPTION OF THE INVENTION

Various embodiments of the invention include turbine nozzles and systems employing such nozzles. Various particular embodiments include a turbine nozzle having: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, pressure side, trailing edge and the leading edge, the at least one endwall including a non-axisymmetric contour proximate a junction between the endwall and the leading edge of the airfoil.

A first aspect of the invention includes a turbine nozzle having: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, pressure side, trailing edge and the leading edge, the at least one endwall including a non-axisymmetric contour proximate a junction between the endwall and the leading edge of the airfoil.

A second aspect of the invention includes a static nozzle section having: a set of static nozzles, the set of static nozzles including at least one nozzle having: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, pressure side, trailing edge and the leading edge, the at least one endwall including a non-axisymmetric contour proximate a junction between the endwall and the leading edge of the airfoil, wherein at least one of the suction side or the pressure side of the airfoil includes a nominal profile substantially in accordance with Cartesian coordinate values of X, Y and Z set forth in TABLE I, wherein the coordinate values are non-dimensional values of from 0 to 1 convertible to distances by multiplying the values by a trailing edge height expressed in units of distance, and wherein X and Y values connected by smooth continuing arcs define airfoil profile sections at each distance Z along the airfoil, the profile sections at the Z distances being joined smoothly with one another to form the airfoil profile, wherein the Cartesian coordinate values have an origin at a root of the leading edge of the airfoil.

A third aspect of the invention includes a turbine nozzle comprising: an airfoil having: a suction side; a pressure side opposing the suction side; a leading edge spanning between the pressure side and the suction side; and a trailing edge opposing the leading edge and spanning between the pressure side and the suction side; and at least one endwall connected with the airfoil along the suction side, pressure side, trailing edge and the leading edge, wherein at least one of the pressure side or the suction side of the airfoil includes a nominal profile substantially in accordance with Cartesian coordinate values of X, Y and Z set forth in TABLE I, wherein the coordinate values are non-dimensional values of from 0 to 1 convertible to distances by multiplying the values by a trailing edge height expressed in units of distance, and wherein X and Y values connected by smooth continuing arcs define airfoil profile sections at each distance Z along the airfoil, the profile sections at the Z distances being joined smoothly with one another to form the airfoil profile, wherein the Cartesian coordinate values have an origin at a root of the leading edge of the airfoil.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-6, like numbering may represent like elements. Redundant explanation of these elements has been omitted for clarity. Finally, it is understood that the components of FIGS. 1-6 and their accompanying descriptions may be applied to any embodiment described herein.

DETAILED DESCRIPTION OF THE INVENTION

As noted herein, various aspects of the invention are directed toward turbine nozzles. Particular aspects of the invention include turbine nozzles having at least one endwall with a non-axisymmetric contour.

In contrast to conventional turbine nozzles, aspects of the invention include a turbine nozzle (e.g., a static nozzle for directing a working fluid such as gas or steam) having a non-axisymmetric contour at the leading edge of its endwall. This non-axisymmetric contour can provide for enhanced performance, efficiency and/or durability of the nozzle (and associated turbine stages and turbine machines) when compared with conventional nozzles.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location. Further, the terms leading edge/pressure side refer to components and/or surfaces which are oriented predominately upstream relative to the fluid flow of the system, and the terms trailing edge/suction side refer to components and/or surfaces which are oriented predominately downstream relative to the fluid flow of the system.

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
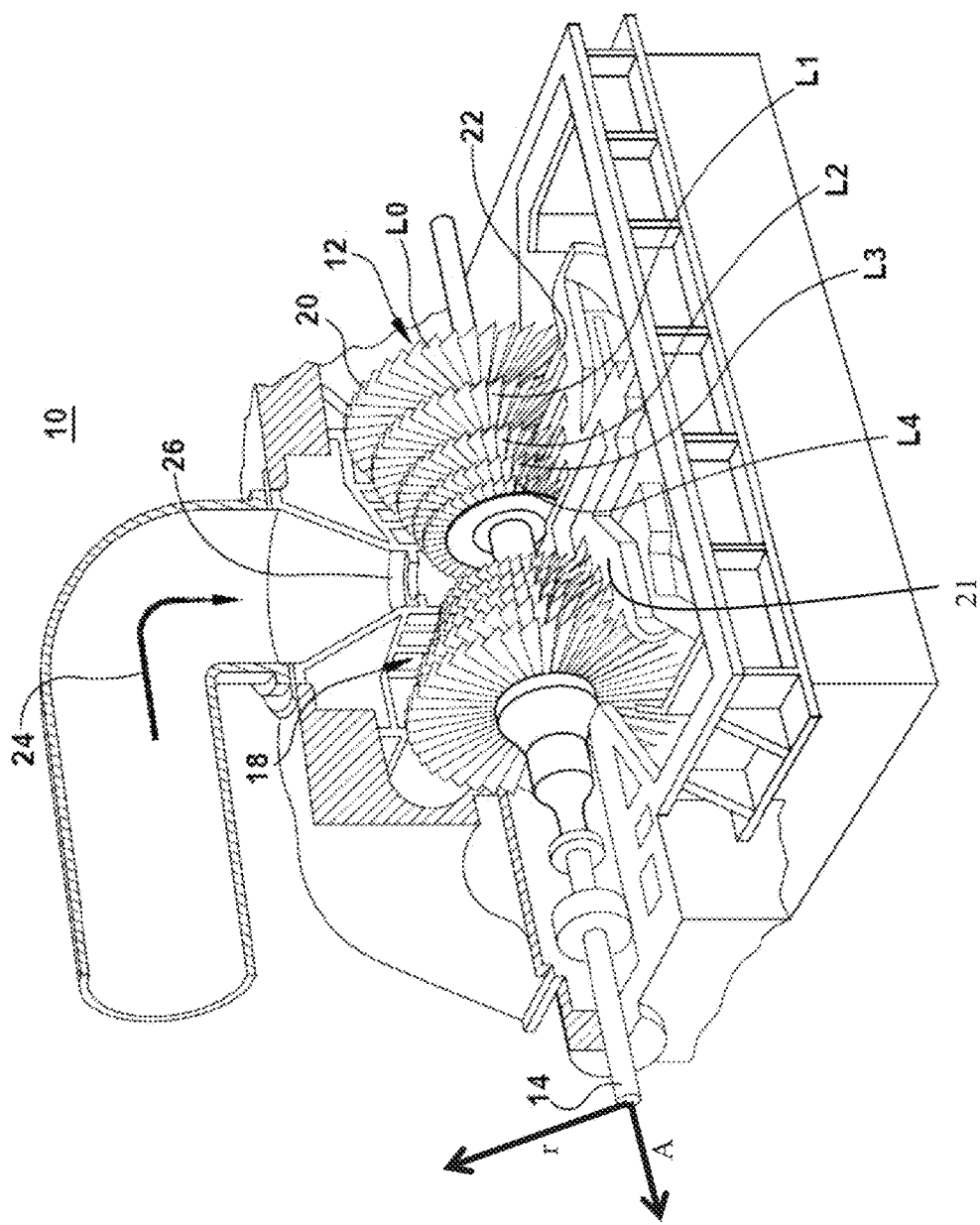
FIG. 1 shows a three-dimensional partial cut-away perspective view of a portion of a turbine according to an embodiment of the invention.

Referring to the drawings, FIG. 1 shows a perspective partial cut-away illustration of a turbine 10 (e.g., a gas or steam turbine and/or an aviation jet engine) according to various embodiments of the invention. Turbine 10 includes a rotor 12 that includes a rotating shaft 14 and a plurality of axially spaced rotor wheels 18. A plurality of rotating buckets 20 are mechanically coupled to each rotor wheel 18. More specifically, buckets 20 are arranged in rows that extend circumferentially around each rotor wheel 18. A static nozzle section 21 is shown including a plurality of stationary nozzles 22 that circumferentially around shaft 14, and the nozzles 22 are axially positioned between adjacent rows of buckets 20. Stationary nozzles 22 cooperate with buckets 20 to form a stage of the turbine 10, and to define a portion of a flow path through turbine 10. As shown, the static nozzle section 21 at least partially surrounds the rotor 12 (shown in this cut-away view). It is understood that the turbine 10 shown is a dual-flow turbine 10 that includes an axially centered inlet mouth which feeds two sets of turbine stages. It is understood that various teachings can be applied to axial turbines, e.g., axial inlet gas turbines that inlet a combustion gas from a first axial end and outlet that combustion gas to a second axial end after the gas has performed mechanical work on the turbine.

Returning to FIG. 1, in operation, gas 24 enters an inlet 26 of turbine 10 and is channeled through stationary nozzles 22. Nozzles 22 direct gas 24 against blades 20. Gas 24 passes through the remaining stages imparting a force on buckets 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine. In another embodiment, turbine 10 may comprise an aircraft engine used to produce thrust.

Figure 2:
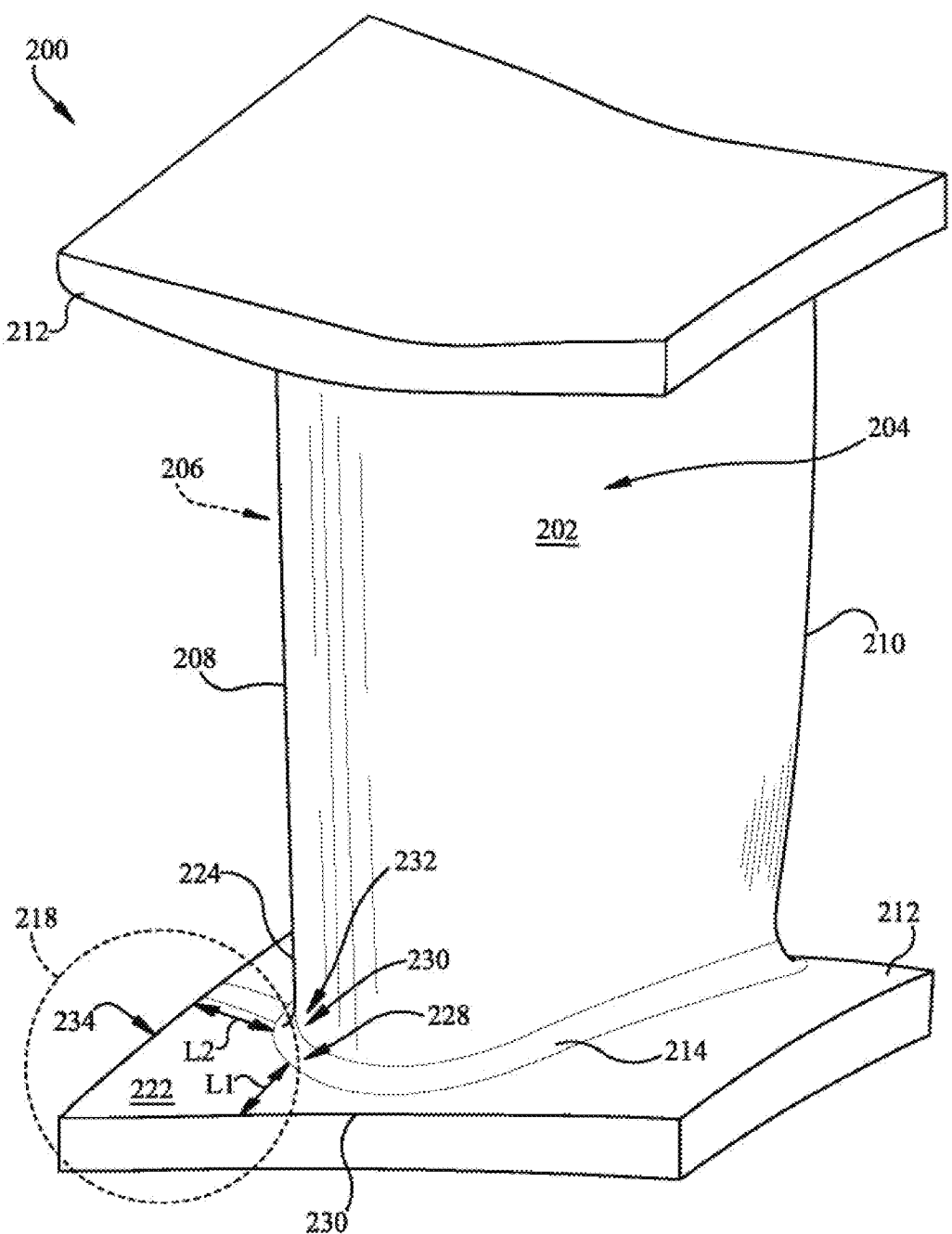
FIG. 2 shows a schematic three-dimensional depiction of a turbine nozzle including an airfoil and endwalls according to various embodiments of the invention.

Turning to FIG. 2, a schematic three-dimensional depiction of a turbine nozzle (or simply, nozzle) 200 is shown according to various embodiments. The nozzle 200 is a stationary nozzle which forms an annulus of stationary nozzles in a stage of a turbine (e.g., turbine 10). That is, during operation of a turbine (e.g., turbine 10), the nozzle 200 will remain stationary in order to direct the flow of working fluid (e.g., gas or steam) to one or more movable buckets (e.g., buckets 20), causing those movable buckets to initiate rotation of a rotor shaft (e.g., shaft 14). It is understood that nozzle 200 is configured to couple (mechanically couple via fasteners, welds, slot/grooves, etc.) with a plurality of similar or distinct nozzles (e.g., nozzles 200 or other nozzles) to form an annulus of nozzles in a stage of the turbine.

Returning to FIG. 2, the turbine nozzle 200 can include an airfoil 202 having a suction side 204, and a pressure side 206 (obstructed in this view) opposing the suction side 204. The nozzle 200 can also include a leading edge 208 spanning between the pressure side 206 and the suction side 204, and a trailing edge 210 opposing the leading edge 208 and spanning between the pressure side 206 and the suction side 204.

As shown, the nozzle 200 can also include at least one endwall 212 (two shown) connected with the airfoil 202. The nozzle 200 can be connected with the airfoil 202 along the suction side 204, pressure side 206, trailing edge 210 and the leading edge 208. In various embodiments, the nozzle includes a fillet 214 connecting the nozzle 210 and each endwall 212. The fillet 214 can include a weld or braze fillet, which may be formed via conventional MIG welding, TIG welding, brazing, etc.

As described herein, and in contrast to conventional turbine nozzles, the turbine nozzle 200 can include at least one endwall 212 with a non-axisymmetric contour 218 proximate a junction 220 between the endwall 212 and the leading edge 208 of the airfoil 202. That is, the nozzle 200 includes an endwall 212 with a contour 218 proximate the junction 220 between the endwall 212 and the leading edge 208 of the airfoil 202 that improves the flow area around the airfoil 202 when compared with conventional nozzles.

In various embodiments, the contour 218 allows for more efficient fluid flow across the airfoil 202 than conventional nozzles 200, allowing for fewer heat load-related failures, and improving the efficiency of fluid flow within a turbine utilizing such a nozzle 200.

With reference to FIG. 1, in various embodiments, the nozzle 200 can include a first stage nozzle (L4) or second stage nozzle (L3). In particular embodiments, the nozzle 200 is a second stage nozzle (L3), and the improved flow profile across the airfoil 200 and endwall 212 interface allows that second stage nozzle (L3) to withstand the high-temperature gas entering the turbine 10 at that first stage. In various embodiments, the turbine 10 can include a set of nozzles 200 in only the second stage (L3) of the turbine 10, or in only the first stage (L4) and the second stage (L3) of the turbine 10.

In various embodiments, at least one of the endwalls 212 including the contour 218 can include an inner endwall, e.g., a radially inner endwall configured to align on the radially inner side of a the static nozzle section. In other embodiments, at least one of the endwalls 212 including the contour 218 can include an outer endwall, e.g., a radially outer endwall configured to align on the radially outer side of the static nozzle section. In some cases, both endwalls 212 include the contour 218, and in other cases, only one of the endwalls 212 includes the contour 218.

According to various embodiments, the non-axisymmetric contour 218 includes a first surface 222 along the endwall 212 on the suction side 204 of the leading edge 208, and a second surface 224 along the endwall 212 on the pressure side 206 of the leading edge 208. The second surface 224 and the first surface 222 can have distinct slopes, e.g., distinct radial v. circumferential ratios. In various embodiments, the first surface 222 has a distinct profile from the second surface 224. In some cases, the distinct profile includes distinct endwall features (e.g., bump(s), trough(s), etc.) in the first surface 222 as compared with the second surface 224 (having its own endwall features (e.g., bump(s), trough(s), etc.). In some cases, the second surface 224 has a substantially flat, or unsloped gradient, and the first surface 222 has a gradient distinct from the gradient of the second surface 224, e.g., a gradient that is positive or negative, but not equal to zero.

According to various particular embodiments, the first surface 222 has a first length L1 measured from a junction 228 of the suction side 204 and the leading edge 208 of the airfoil 202 along the endwall 212 to an outer edge 230 of the endwall 212. In these embodiments, the second surface 224 has a second length L2 measured from a junction 232 of the pressure side 206 and the leading edge 208 of the airfoil 202 along the endwall 212 to an inner edge 234 of the endwall 212. In various embodiments, the first length L1 is distinct from the second length L2, and in particular embodiments, the second length L2 is greater than the first length L1.

Figure 3:
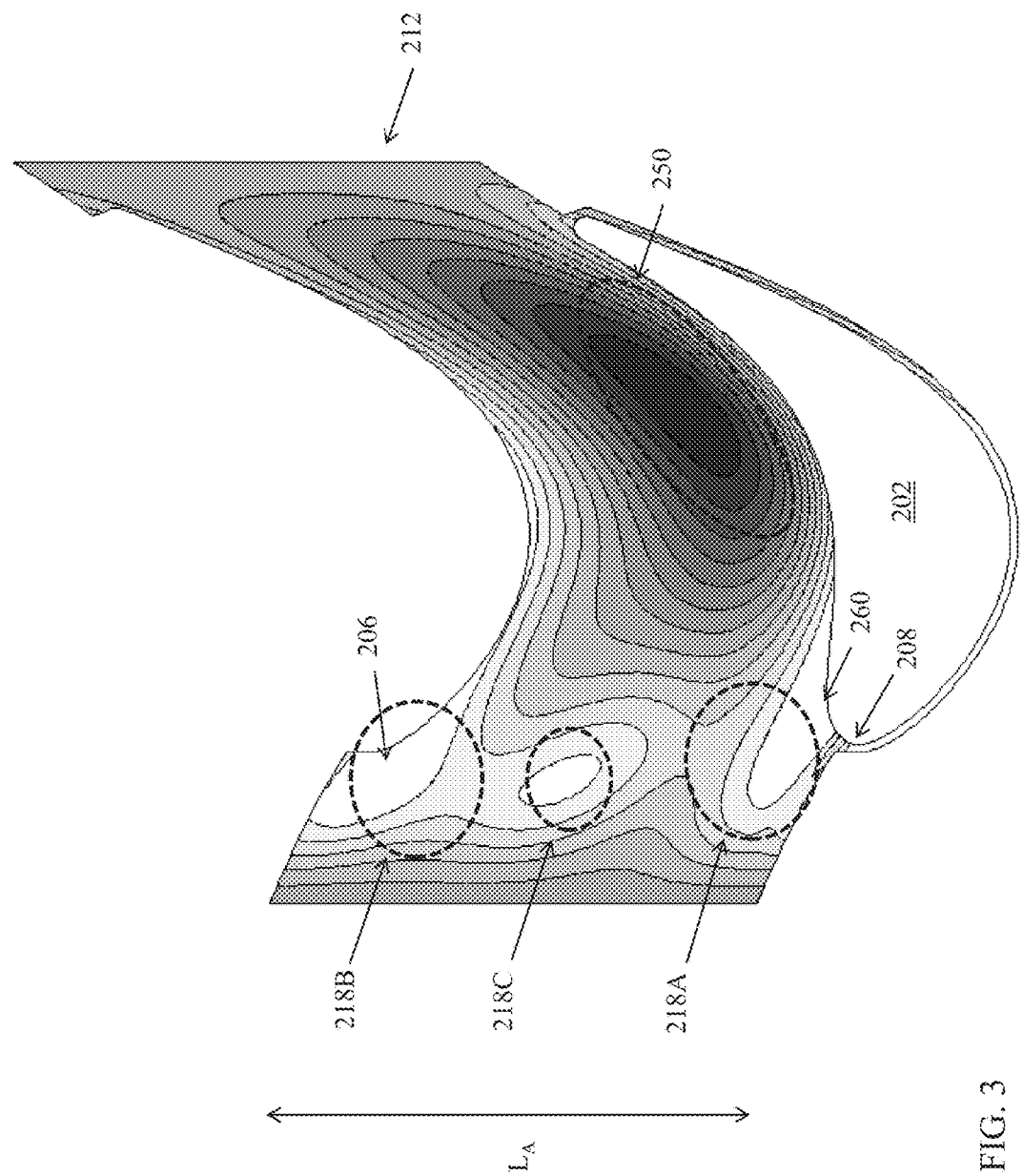
FIG. 3 shows an example contour plot of an area along the endwall surrounding the airfoil of FIG. 2 according to various embodiments of the invention.

Turning to FIG. 3, a radial contour map of a portion of the endwall 212 (excluding the nozzle 200) is shown according to various embodiments. As can be seen in this example radial contour map, the contour 218 (shown in three parts as a leading edge pressure side feature 218A, a leading edge suction side feature 218B and a mid-passage feature 218C) can aid in improving aerodynamic efficiency proximate the leading edge 208 of the nozzle 200. The radial contour map also shows a passage trough 250 on the pressure side 206 of the nozzle 200.

With reference to FIG. 2 and FIG. 3, according to various particular embodiments, the non-axisymmetric contour 218 includes at least one bump (thickened area) 260 and a passage trough 250 on the pressure side 206 of the nozzle 200. In particular embodiments, the leading edge pressure side feature 218A can include at least one bump (thickened area) 260, and the leading edge suction side feature 218B and mid passage feature 218C can include at least one bump (thickened area) 260. It is understood that according to various embodiments, the bump (thickened area) 260 along the leading edge pressure side 218A can be thinner than the bump 260 along the leading edge suction side 218B (extending a lesser distance toward the opposite endwall 212 from the second surface 224 than the bump 260 extends toward the opposite endwall from the first surface 222).

In various particular embodiments, each bump (thickened area) 260 can extend across approximately at least 10 percent of the axial length $L_A$ (along axis A) of the endwall 212. In some particular cases, each thickened area 260 can extend across approximately 20-30 percent of the axial length $L_A$ of the endwall 212.

In various particular embodiments, at least one bump 260 (within 218A) can have an apex at approximately 0% axial chord upstream of the leading edge 208 (+/−5%). In these cases, the bump 260 can span approximately 10-20% pitch as measured from the pressure side 206.

In other particular embodiments, at least one bump 260 (e.g., within 218B) has an apex at approximately 5% of the axial cord length upstream of the leading edge 208 (+/−5%). In these cases, the bump 260 can span approximately 0-10% pitch as measured from the suction side 204.

In another embodiment, at least one bump 260 (within 218C) has an apex at approximately 40-60% pitch as measured from pressure side 206. This bump 260 may span approximately 10-20% pitch.

In various embodiments, the passage trough 250 includes a depression having an apex at approximately 60% (+/−10%) of the chord length of the pressure side 206 (+/−10%). In this case, the depression in the pressure trough 250 can span approximately 40-60% pitch as measured from the pressure side 206.

It is understood that in various embodiments, other apex locations and pitches are possible, and those values given herein are merely illustrative of several of the many possible embodiments in accordance with the disclosure.

Figure 4:
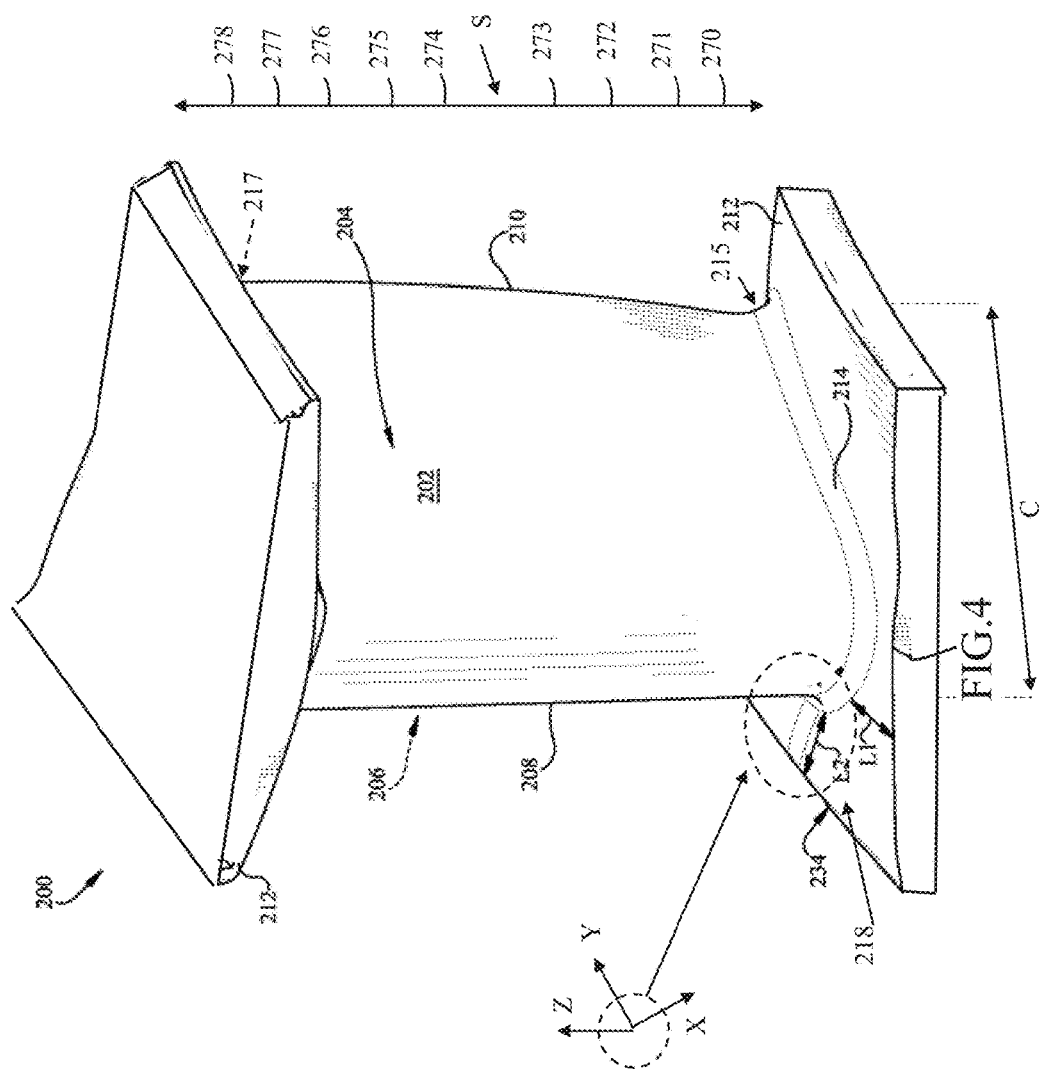
FIG. 4 shows a schematic three-dimensional depiction of a plurality of turbine nozzles according to various embodiments of the invention.

With reference to FIG. 4 (and continuing reference to FIGS. 2-3), a plurality of points 270-278 along span S, including root 215 and tip 217, can correspond to Z coordinate values of chord lines, and a cross section of airfoil 202 at each point can be described by a respective set of X and Y coordinates. For example, 100 points can be listed for each cross section 270-278, though it should be apparent that more or fewer points can be used for each cross section, and more or fewer cross sections can be used, as may be desired and/or appropriate. The X, Y, and Z coordinate values in TABLE I have been expressed in normalized or non-dimensionalized form in values of from 0 to 1, but it should be apparent that any or all of the coordinate values could instead be expressed in distance units so long as the proportions are maintained. To convert an X, Y or Z value of TABLE I to a respective X, Y or Z coordinate value in units of distance, such as inches or meters, the non-dimensional X, Y or Z value given in TABLE I can be multiplied by a trailing edge height of airfoil 202 in such units of distance. By connecting the X and Y values with smooth continuing arcs, each profile cross section at each distance Z can be fixed, and the airfoil profiles of the various surface locations between the distances Z can be determined by smoothly connecting adjacent profile sections to one another, thus forming the airfoil profile.

The values in TABLE I are generated and shown to four decimal places for determining the profile of at least one of a suction side or a pressure side of a nominal airfoil 202 at ambient, non-operating, or non-hot conditions, and do not take any coatings or fillets into account, though embodiments could account for other conditions, coatings, and/or fillets. To allow for typical manufacturing tolerances and/or coating thicknesses, ±values can be added to the values listed in TABLE I, particularly to the X and Y values therein. For example, a tolerance of about 10-20percent of a thickness of the trailing edge in a direction normal to any surface location along the airfoil profile can define an airfoil profile envelope for a nozzle airfoil design at cold or room temperature. In other words, a distance of about 10-20 percent of a thickness of the trailing edge in a direction normal to any surface location along the airfoil profile can define a range of variation between measured points on an actual airfoil surface and ideal positions of those points, particularly at a cold or room temperature, as embodied by the invention. The nozzle airfoil design, as embodied by the invention, is robust to this range of variation without impairment of mechanical and aerodynamic functions. Likewise, the profile and/or design can be scaled up or down, such as geometrically, without impairment of operation, and such scaling can be facilitated by use of normalized coordinate values, i.e. multiplying the normalized values by a scaling factor, or a larger or smaller number of distance units than might have originally been used. For example, the values in TABLE I, particularly the X and Y values, could be multiplied by a scaling factor of 2, 0.5, or any other desired scaling factor. Alternatively, the values could be multiplied by a larger or smaller desired span. As referenced herein, the origin of the X, Y, Z coordinate system is the root of the leading edge (junction 232) of the airfoil 202.

TABLE I

| | Non-Dimensionalized (X Y Z/Span Height) | | | |
|---|---|---|---|---|
| N | Location | X | Y | Z |
| 1 | Suction-Side | −0.00776 | −0.02251 | 0.00000 |
| 2 | Suction-Side | −0.00609 | −0.01050 | 0.00000 |
| 3 | Suction-Side | −0.00579 | −0.03453 | 0.00000 |
| 4 | Suction-Side | −0.00171 | −0.04602 | 0.00000 |
| 5 | Suction-Side | 0.00000 | 0.00000 | 0.00000 |
| 6 | Suction-Side | 0.00363 | −0.05698 | 0.00000 |
| 7 | Suction-Side | 0.00979 | −0.06752 | 0.00000 |
| 8 | Suction-Side | 0.01656 | −0.07768 | 0.00000 |
| 9 | Suction-Side | 0.02380 | −0.08750 | 0.00000 |
| 10 | Suction-Side | 0.03143 | −0.09703 | 0.00000 |
| 11 | Suction-Side | 0.03938 | −0.10628 | 0.00000 |
| 12 | Suction-Side | 0.04764 | −0.11526 | 0.00000 |
| 13 | Suction-Side | 0.05617 | −0.12398 | 0.00000 |
| 14 | Suction-Side | 0.06497 | −0.13244 | 0.00000 |
| 15 | Suction-Side | 0.07401 | −0.14063 | 0.00000 |
| 16 | Suction-Side | 0.08330 | −0.14855 | 0.00000 |
| 17 | Suction-Side | 0.09281 | −0.15619 | 0.00000 |
| 18 | Suction-Side | 0.10257 | −0.16353 | 0.00000 |
| 19 | Suction-Side | 0.11255 | −0.17056 | 0.00000 |
| 20 | Suction-Side | 0.12275 | −0.17724 | 0.00000 |
| 21 | Suction-Side | 0.13317 | −0.18358 | 0.00000 |
| 22 | Suction-Side | 0.14383 | −0.18955 | 0.00000 |
| 23 | Suction-Side | 0.15469 | −0.19510 | 0.00000 |
| 24 | Suction-Side | 0.16577 | −0.20022 | 0.00000 |
| 25 | Suction-Side | 0.17705 | −0.20487 | 0.00000 |
| 26 | Suction-Side | 0.18852 | −0.20902 | 0.00000 |
| 27 | Suction-Side | 0.20018 | −0.21263 | 0.00000 |
| 28 | Suction-Side | 0.21199 | −0.21567 | 0.00000 |
| 29 | Suction-Side | 0.22395 | −0.21811 | 0.00000 |
| 30 | Suction-Side | 0.23602 | −0.21991 | 0.00000 |
| 31 | Suction-Side | 0.24818 | −0.22104 | 0.00000 |
| 32 | Suction-Side | 0.26037 | −0.22147 | 0.00000 |
| 33 | Suction-Side | 0.27257 | −0.22120 | 0.00000 |
| 34 | Suction-Side | 0.28473 | −0.22021 | 0.00000 |
| 35 | Suction-Side | 0.29681 | −0.21848 | 0.00000 |
| 36 | Suction-Side | 0.30877 | −0.21605 | 0.00000 |
| 37 | Suction-Side | 0.32055 | −0.21291 | 0.00000 |
| 38 | Suction-Side | 0.33216 | −0.20911 | 0.00000 |
| 39 | Suction-Side | 0.34352 | −0.20467 | 0.00000 |
| 40 | Suction-Side | 0.35463 | −0.19962 | 0.00000 |
| 41 | Suction-Side | 0.36547 | −0.19403 | 0.00000 |
| 42 | Suction-Side | 0.37602 | −0.18790 | 0.00000 |
| 43 | Suction-Side | 0.38628 | −0.18129 | 0.00000 |
| 44 | Suction-Side | 0.39625 | −0.17425 | 0.00000 |
| 45 | Suction-Side | 0.40592 | −0.16682 | 0.00000 |
| 46 | Suction-Side | 0.41531 | −0.15901 | 0.00000 |
| 47 | Suction-Side | 0.42440 | −0.15087 | 0.00000 |
| 48 | Suction-Side | 0.43322 | −0.14244 | 0.00000 |
| 49 | Suction-Side | 0.44177 | −0.13373 | 0.00000 |
| 50 | Suction-Side | 0.45006 | −0.12477 | 0.00000 |
| 51 | Suction-Side | 0.45810 | −0.11560 | 0.00000 |
| 52 | Suction-Side | 0.46591 | −0.10622 | 0.00000 |
| 53 | Suction-Side | 0.47350 | −0.09667 | 0.00000 |
| 54 | Suction-Side | 0.48088 | −0.08694 | 0.00000 |
| 55 | Suction-Side | 0.48805 | −0.07707 | 0.00000 |
| 56 | Suction-Side | 0.49503 | −0.06706 | 0.00000 |
| 57 | Suction-Side | 0.50182 | −0.05692 | 0.00000 |
| 58 | Suction-Side | 0.50844 | −0.04666 | 0.00000 |
| 59 | Suction-Side | 0.51488 | −0.03631 | 0.00000 |
| 60 | Suction-Side | 0.52117 | −0.02585 | 0.00000 |
| 61 | Suction-Side | 0.52731 | −0.01530 | 0.00000 |
| 62 | Suction-Side | 0.53332 | −0.00468 | 0.00000 |
| 63 | Suction-Side | 0.53918 | 0.00603 | 0.00000 |
| 64 | Suction-Side | 0.54492 | 0.01680 | 0.00000 |
| 65 | Suction-Side | 0.55053 | 0.02764 | 0.00000 |
| 66 | Suction-Side | 0.55603 | 0.03854 | 0.00000 |
| 67 | Suction-Side | 0.56141 | 0.04949 | 0.00000 |
| 68 | Suction-Side | 0.56670 | 0.06048 | 0.00000 |
| 69 | Suction-Side | 0.57188 | 0.07154 | 0.00000 |
| 70 | Suction-Side | 0.57697 | 0.08262 | 0.00000 |
| 71 | Suction-Side | 0.58198 | 0.09376 | 0.00000 |
| 72 | Suction-Side | 0.58690 | 0.10492 | 0.00000 |
| 73 | Suction-Side | 0.59175 | 0.11612 | 0.00000 |
| 74 | Suction-Side | 0.59651 | 0.12735 | 0.00000 |
| 75 | Suction-Side | 0.60121 | 0.13862 | 0.00000 |
| 76 | Suction-Side | 0.60584 | 0.14990 | 0.00000 |
| 77 | Suction-Side | 0.61041 | 0.16123 | 0.00000 |
| 78 | Suction-Side | 0.61491 | 0.17256 | 0.00000 |
| 79 | Suction-Side | 0.61935 | 0.18394 | 0.00000 |
| 80 | Suction-Side | 0.62375 | 0.19531 | 0.00000 |
| 81 | Suction-Side | 0.62810 | 0.20672 | 0.00000 |
| 82 | Suction-Side | 0.63240 | 0.21815 | 0.00000 |
| 83 | Suction-Side | 0.63665 | 0.22959 | 0.00000 |
| 84 | Suction-Side | 0.64085 | 0.24103 | 0.00000 |
| 85 | Suction-Side | 0.64503 | 0.25251 | 0.00000 |
| 86 | Suction-Side | 0.64916 | 0.26399 | 0.00000 |
| 87 | Suction-Side | 0.65324 | 0.27549 | 0.00000 |
| 88 | Suction-Side | 0.65729 | 0.28700 | 0.00000 |
| 89 | Suction-Side | 0.66131 | 0.29852 | 0.00000 |
| 90 | Suction-Side | 0.66528 | 0.31007 | 0.00000 |
| 91 | Suction-Side | 0.66923 | 0.32162 | 0.00000 |
| 92 | Suction-Side | 0.67315 | 0.33317 | 0.00000 |
| 93 | Suction-Side | 0.67703 | 0.34474 | 0.00000 |
| 94 | Suction-Side | 0.67998 | 0.40050 | 0.00000 |
| 95 | Suction-Side | 0.68088 | 0.35632 | 0.00000 |
| 96 | Suction-Side | 0.68470 | 0.36790 | 0.00000 |
| 97 | Suction-Side | 0.68507 | 0.39694 | 0.00000 |
| 98 | Suction-Side | 0.68842 | 0.39172 | 0.00000 |
| 99 | Suction-Side | 0.68850 | 0.37951 | 0.00000 |
| 100 | Suction-Side | 0.68960 | 0.38562 | 0.00000 |
| 101 | Pressure-Side | 0.00000 | 0.00000 | 0.00000 |
| 102 | Pressure-Side | 0.00627 | 0.00621 | 0.00000 |
| 103 | Pressure-Side | 0.01352 | 0.01123 | 0.00000 |
| 104 | Pressure-Side | 0.02146 | 0.01507 | 0.00000 |
| 105 | Pressure-Side | 0.02983 | 0.01785 | 0.00000 |
| 106 | Pressure-Side | 0.03845 | 0.01977 | 0.00000 |
| 107 | Pressure-Side | 0.04718 | 0.02104 | 0.00000 |
| 108 | Pressure-Side | 0.05597 | 0.02177 | 0.00000 |

TABLE I-continued

Non-Dimensionalized (X Y Z/Span Height)

| N | Location | X | Y | Z |
|---|---|---|---|---|
| 109 | Pressure-Side | 0.06480 | 0.02213 | 0.00000 |
| 110 | Pressure-Side | 0.07362 | 0.02218 | 0.00000 |
| 111 | Pressure-Side | 0.08246 | 0.02202 | 0.00000 |
| 112 | Pressure-Side | 0.09128 | 0.02170 | 0.00000 |
| 113 | Pressure-Side | 0.10010 | 0.02126 | 0.00000 |
| 114 | Pressure-Side | 0.10891 | 0.02076 | 0.00000 |
| 115 | Pressure-Side | 0.11772 | 0.02020 | 0.00000 |
| 116 | Pressure-Side | 0.12653 | 0.01964 | 0.00000 |
| 117 | Pressure-Side | 0.13534 | 0.01908 | 0.00000 |
| 118 | Pressure-Side | 0.14416 | 0.01855 | 0.00000 |
| 119 | Pressure-Side | 0.15297 | 0.01806 | 0.00000 |
| 120 | Pressure-Side | 0.16180 | 0.01762 | 0.00000 |
| 121 | Pressure-Side | 0.17061 | 0.01726 | 0.00000 |
| 122 | Pressure-Side | 0.17943 | 0.01700 | 0.00000 |
| 123 | Pressure-Side | 0.18827 | 0.01681 | 0.00000 |
| 124 | Pressure-Side | 0.19709 | 0.01674 | 0.00000 |
| 125 | Pressure-Side | 0.20592 | 0.01680 | 0.00000 |
| 126 | Pressure-Side | 0.21474 | 0.01697 | 0.00000 |
| 127 | Pressure-Side | 0.22357 | 0.01728 | 0.00000 |
| 128 | Pressure-Side | 0.23239 | 0.01773 | 0.00000 |
| 129 | Pressure-Side | 0.24120 | 0.01833 | 0.00000 |
| 130 | Pressure-Side | 0.25000 | 0.01910 | 0.00000 |
| 131 | Pressure-Side | 0.25877 | 0.02001 | 0.00000 |
| 132 | Pressure-Side | 0.26754 | 0.02110 | 0.00000 |
| 133 | Pressure-Side | 0.27627 | 0.02238 | 0.00000 |
| 134 | Pressure-Side | 0.28498 | 0.02383 | 0.00000 |
| 135 | Pressure-Side | 0.29366 | 0.02546 | 0.00000 |
| 136 | Pressure-Side | 0.30229 | 0.02728 | 0.00000 |
| 137 | Pressure-Side | 0.31089 | 0.02930 | 0.00000 |
| 138 | Pressure-Side | 0.31944 | 0.03151 | 0.00000 |
| 139 | Pressure-Side | 0.32793 | 0.03393 | 0.00000 |
| 140 | Pressure-Side | 0.33637 | 0.03653 | 0.00000 |
| 141 | Pressure-Side | 0.34474 | 0.03934 | 0.00000 |
| 142 | Pressure-Side | 0.35305 | 0.04233 | 0.00000 |
| 143 | Pressure-Side | 0.36127 | 0.04553 | 0.00000 |
| 144 | Pressure-Side | 0.36942 | 0.04893 | 0.00000 |
| 145 | Pressure-Side | 0.37749 | 0.05252 | 0.00000 |
| 146 | Pressure-Side | 0.38546 | 0.05631 | 0.00000 |
| 147 | Pressure-Side | 0.39335 | 0.06028 | 0.00000 |
| 148 | Pressure-Side | 0.40113 | 0.06444 | 0.00000 |
| 149 | Pressure-Side | 0.40882 | 0.06879 | 0.00000 |
| 150 | Pressure-Side | 0.41640 | 0.07332 | 0.00000 |
| 151 | Pressure-Side | 0.42387 | 0.07801 | 0.00000 |
| 152 | Pressure-Side | 0.43123 | 0.08289 | 0.00000 |
| 153 | Pressure-Side | 0.43848 | 0.08792 | 0.00000 |
| 154 | Pressure-Side | 0.44562 | 0.09312 | 0.00000 |
| 155 | Pressure-Side | 0.45265 | 0.09847 | 0.00000 |
| 156 | Pressure-Side | 0.45955 | 0.10398 | 0.00000 |
| 157 | Pressure-Side | 0.46635 | 0.10961 | 0.00000 |
| 158 | Pressure-Side | 0.47302 | 0.11539 | 0.00000 |
| 159 | Pressure-Side | 0.47959 | 0.12129 | 0.00000 |
| 160 | Pressure-Side | 0.48603 | 0.12733 | 0.00000 |
| 161 | Pressure-Side | 0.49236 | 0.13348 | 0.00000 |
| 162 | Pressure-Side | 0.49858 | 0.13975 | 0.00000 |
| 163 | Pressure-Side | 0.50468 | 0.14613 | 0.00000 |
| 164 | Pressure-Side | 0.51067 | 0.15260 | 0.00000 |
| 165 | Pressure-Side | 0.51656 | 0.15919 | 0.00000 |
| 166 | Pressure-Side | 0.52234 | 0.16586 | 0.00000 |
| 167 | Pressure-Side | 0.52801 | 0.17263 | 0.00000 |
| 168 | Pressure-Side | 0.53358 | 0.17947 | 0.00000 |
| 169 | Pressure-Side | 0.53906 | 0.18641 | 0.00000 |
| 170 | Pressure-Side | 0.54443 | 0.19341 | 0.00000 |
| 171 | Pressure-Side | 0.54970 | 0.20050 | 0.00000 |
| 172 | Pressure-Side | 0.55490 | 0.20763 | 0.00000 |
| 173 | Pressure-Side | 0.55999 | 0.21485 | 0.00000 |
| 174 | Pressure-Side | 0.56500 | 0.22212 | 0.00000 |
| 175 | Pressure-Side | 0.56993 | 0.22944 | 0.00000 |
| 176 | Pressure-Side | 0.57478 | 0.23682 | 0.00000 |
| 177 | Pressure-Side | 0.57954 | 0.24426 | 0.00000 |
| 178 | Pressure-Side | 0.58423 | 0.25173 | 0.00000 |
| 179 | Pressure-Side | 0.58885 | 0.25926 | 0.00000 |
| 180 | Pressure-Side | 0.59340 | 0.26682 | 0.00000 |
| 181 | Pressure-Side | 0.59789 | 0.27443 | 0.00000 |
| 182 | Pressure-Side | 0.60230 | 0.28207 | 0.00000 |
| 183 | Pressure-Side | 0.60666 | 0.28975 | 0.00000 |
| 184 | Pressure-Side | 0.61097 | 0.29746 | 0.00000 |
| 185 | Pressure-Side | 0.61522 | 0.30519 | 0.00000 |
| 186 | Pressure-Side | 0.61942 | 0.31297 | 0.00000 |
| 187 | Pressure-Side | 0.62356 | 0.32075 | 0.00000 |
| 188 | Pressure-Side | 0.62767 | 0.32857 | 0.00000 |
| 189 | Pressure-Side | 0.63174 | 0.33641 | 0.00000 |
| 190 | Pressure-Side | 0.63576 | 0.34426 | 0.00000 |
| 191 | Pressure-Side | 0.63976 | 0.35214 | 0.00000 |
| 192 | Pressure-Side | 0.64372 | 0.36002 | 0.00000 |
| 193 | Pressure-Side | 0.64766 | 0.36793 | 0.00000 |
| 194 | Pressure-Side | 0.65157 | 0.37585 | 0.00000 |
| 195 | Pressure-Side | 0.65547 | 0.38377 | 0.00000 |
| 196 | Pressure-Side | 0.65938 | 0.39169 | 0.00000 |
| 197 | Pressure-Side | 0.66277 | 0.39690 | 0.00000 |
| 198 | Pressure-Side | 0.66784 | 0.40048 | 0.00000 |
| 199 | Pressure-Side | 0.67390 | 0.40175 | 0.00000 |
| 200 | Pressure-Side | 0.67998 | 0.40050 | 0.00000 |
| 1 | Suction-Side | −0.01641 | −0.01591 | 0.10000 |
| 2 | Suction-Side | −0.01565 | −0.02816 | 0.10000 |
| 3 | Suction-Side | −0.01357 | −0.00399 | 0.10000 |
| 4 | Suction-Side | −0.01241 | −0.04003 | 0.10000 |
| 5 | Suction-Side | −0.00760 | −0.05135 | 0.10000 |
| 6 | Suction-Side | −0.00707 | 0.00642 | 0.10000 |
| 7 | Suction-Side | −0.00173 | −0.06217 | 0.10000 |
| 8 | Suction-Side | 0.00489 | −0.07255 | 0.10000 |
| 9 | Suction-Side | 0.01208 | −0.08254 | 0.10000 |
| 10 | Suction-Side | 0.01972 | −0.09219 | 0.10000 |
| 11 | Suction-Side | 0.02777 | −0.10150 | 0.10000 |
| 12 | Suction-Side | 0.03616 | −0.11051 | 0.10000 |
| 13 | Suction-Side | 0.04486 | −0.11922 | 0.10000 |
| 14 | Suction-Side | 0.05386 | −0.12763 | 0.10000 |
| 15 | Suction-Side | 0.06312 | −0.13574 | 0.10000 |
| 16 | Suction-Side | 0.07265 | −0.14353 | 0.10000 |
| 17 | Suction-Side | 0.08243 | −0.15101 | 0.10000 |
| 18 | Suction-Side | 0.09247 | −0.15816 | 0.10000 |
| 19 | Suction-Side | 0.10273 | −0.16496 | 0.10000 |
| 20 | Suction-Side | 0.11321 | −0.17139 | 0.10000 |
| 21 | Suction-Side | 0.12394 | −0.17744 | 0.10000 |
| 22 | Suction-Side | 0.13489 | −0.18307 | 0.10000 |
| 23 | Suction-Side | 0.14605 | −0.18828 | 0.10000 |
| 24 | Suction-Side | 0.15741 | −0.19302 | 0.10000 |
| 25 | Suction-Side | 0.16897 | −0.19724 | 0.10000 |
| 26 | Suction-Side | 0.18072 | −0.20094 | 0.10000 |
| 27 | Suction-Side | 0.19262 | −0.20407 | 0.10000 |
| 28 | Suction-Side | 0.20467 | −0.20660 | 0.10000 |
| 29 | Suction-Side | 0.21683 | −0.20850 | 0.10000 |
| 30 | Suction-Side | 0.22908 | −0.20973 | 0.10000 |
| 31 | Suction-Side | 0.24138 | −0.21029 | 0.10000 |
| 32 | Suction-Side | 0.25369 | −0.21015 | 0.10000 |
| 33 | Suction-Side | 0.26597 | −0.20927 | 0.10000 |
| 34 | Suction-Side | 0.27817 | −0.20769 | 0.10000 |
| 35 | Suction-Side | 0.29027 | −0.20539 | 0.10000 |
| 36 | Suction-Side | 0.30221 | −0.20240 | 0.10000 |
| 37 | Suction-Side | 0.31396 | −0.19872 | 0.10000 |
| 38 | Suction-Side | 0.32548 | −0.19440 | 0.10000 |
| 39 | Suction-Side | 0.33677 | −0.18948 | 0.10000 |
| 40 | Suction-Side | 0.34778 | −0.18398 | 0.10000 |
| 41 | Suction-Side | 0.35852 | −0.17794 | 0.10000 |
| 42 | Suction-Side | 0.36897 | −0.17143 | 0.10000 |
| 43 | Suction-Side | 0.37912 | −0.16447 | 0.10000 |
| 44 | Suction-Side | 0.38897 | −0.15709 | 0.10000 |
| 45 | Suction-Side | 0.39854 | −0.14933 | 0.10000 |
| 46 | Suction-Side | 0.40781 | −0.14124 | 0.10000 |
| 47 | Suction-Side | 0.41680 | −0.13283 | 0.10000 |
| 48 | Suction-Side | 0.42551 | −0.12412 | 0.10000 |
| 49 | Suction-Side | 0.43397 | −0.11518 | 0.10000 |
| 50 | Suction-Side | 0.44216 | −0.10600 | 0.10000 |
| 51 | Suction-Side | 0.45014 | −0.09661 | 0.10000 |
| 52 | Suction-Side | 0.45787 | −0.08703 | 0.10000 |
| 53 | Suction-Side | 0.46539 | −0.07729 | 0.10000 |
| 54 | Suction-Side | 0.47272 | −0.06739 | 0.10000 |
| 55 | Suction-Side | 0.47984 | −0.05734 | 0.10000 |
| 56 | Suction-Side | 0.48676 | −0.04718 | 0.10000 |
| 57 | Suction-Side | 0.49353 | −0.03688 | 0.10000 |
| 58 | Suction-Side | 0.50011 | −0.02647 | 0.10000 |
| 59 | Suction-Side | 0.50653 | −0.01596 | 0.10000 |
| 60 | Suction-Side | 0.51280 | −0.00537 | 0.10000 |

TABLE I-continued

Non-Dimensionalized (X Y Z/Span Height)

| N | Location | X | Y | Z |
|---|---|---|---|---|
| 61 | Suction-Side | 0.51892 | 0.00532 | 0.10000 |
| 62 | Suction-Side | 0.52490 | 0.01607 | 0.10000 |
| 63 | Suction-Side | 0.53075 | 0.02690 | 0.10000 |
| 64 | Suction-Side | 0.53649 | 0.03780 | 0.10000 |
| 65 | Suction-Side | 0.54210 | 0.04876 | 0.10000 |
| 66 | Suction-Side | 0.54760 | 0.05978 | 0.10000 |
| 67 | Suction-Side | 0.55300 | 0.07083 | 0.10000 |
| 68 | Suction-Side | 0.55830 | 0.08196 | 0.10000 |
| 69 | Suction-Side | 0.56350 | 0.09311 | 0.10000 |
| 70 | Suction-Side | 0.56861 | 0.10431 | 0.10000 |
| 71 | Suction-Side | 0.57365 | 0.11555 | 0.10000 |
| 72 | Suction-Side | 0.57859 | 0.12682 | 0.10000 |
| 73 | Suction-Side | 0.58346 | 0.13813 | 0.10000 |
| 74 | Suction-Side | 0.58825 | 0.14947 | 0.10000 |
| 75 | Suction-Side | 0.59299 | 0.16084 | 0.10000 |
| 76 | Suction-Side | 0.59765 | 0.17223 | 0.10000 |
| 77 | Suction-Side | 0.60225 | 0.18365 | 0.10000 |
| 78 | Suction-Side | 0.60679 | 0.19509 | 0.10000 |
| 79 | Suction-Side | 0.61129 | 0.20656 | 0.10000 |
| 80 | Suction-Side | 0.61572 | 0.21804 | 0.10000 |
| 81 | Suction-Side | 0.62011 | 0.22955 | 0.10000 |
| 82 | Suction-Side | 0.62444 | 0.24107 | 0.10000 |
| 83 | Suction-Side | 0.62873 | 0.25260 | 0.10000 |
| 84 | Suction-Side | 0.63299 | 0.26417 | 0.10000 |
| 85 | Suction-Side | 0.63720 | 0.27573 | 0.10000 |
| 86 | Suction-Side | 0.64137 | 0.28732 | 0.10000 |
| 87 | Suction-Side | 0.64549 | 0.29892 | 0.10000 |
| 88 | Suction-Side | 0.64959 | 0.31053 | 0.10000 |
| 89 | Suction-Side | 0.65363 | 0.32216 | 0.10000 |
| 90 | Suction-Side | 0.65764 | 0.33380 | 0.10000 |
| 91 | Suction-Side | 0.66161 | 0.34546 | 0.10000 |
| 92 | Suction-Side | 0.66556 | 0.35711 | 0.10000 |
| 93 | Suction-Side | 0.66947 | 0.36879 | 0.10000 |
| 94 | Suction-Side | 0.67228 | 0.42474 | 0.10000 |
| 95 | Suction-Side | 0.67335 | 0.38048 | 0.10000 |
| 96 | Suction-Side | 0.67719 | 0.39217 | 0.10000 |
| 97 | Suction-Side | 0.67744 | 0.42127 | 0.10000 |
| 98 | Suction-Side | 0.68084 | 0.41609 | 0.10000 |
| 99 | Suction-Side | 0.68100 | 0.40388 | 0.10000 |
| 100 | Suction-Side | 0.68206 | 0.41000 | 0.10000 |
| 101 | Pressure-Side | −0.00707 | 0.00642 | 0.10000 |
| 102 | Pressure-Side | −0.00072 | 0.01261 | 0.10000 |
| 103 | Pressure-Side | 0.00671 | 0.01749 | 0.10000 |
| 104 | Pressure-Side | 0.01483 | 0.02109 | 0.10000 |
| 105 | Pressure-Side | 0.02334 | 0.02364 | 0.10000 |
| 106 | Pressure-Side | 0.03205 | 0.02538 | 0.10000 |
| 107 | Pressure-Side | 0.04088 | 0.02651 | 0.10000 |
| 108 | Pressure-Side | 0.04973 | 0.02722 | 0.10000 |
| 109 | Pressure-Side | 0.05862 | 0.02758 | 0.10000 |
| 110 | Pressure-Side | 0.06751 | 0.02768 | 0.10000 |
| 111 | Pressure-Side | 0.07640 | 0.02764 | 0.10000 |
| 112 | Pressure-Side | 0.08528 | 0.02747 | 0.10000 |
| 113 | Pressure-Side | 0.09417 | 0.02722 | 0.10000 |
| 114 | Pressure-Side | 0.10306 | 0.02692 | 0.10000 |
| 115 | Pressure-Side | 0.11194 | 0.02661 | 0.10000 |
| 116 | Pressure-Side | 0.12083 | 0.02630 | 0.10000 |
| 117 | Pressure-Side | 0.12970 | 0.02602 | 0.10000 |
| 118 | Pressure-Side | 0.13860 | 0.02578 | 0.10000 |
| 119 | Pressure-Side | 0.14749 | 0.02561 | 0.10000 |
| 120 | Pressure-Side | 0.15638 | 0.02550 | 0.10000 |
| 121 | Pressure-Side | 0.16527 | 0.02548 | 0.10000 |
| 122 | Pressure-Side | 0.17416 | 0.02556 | 0.10000 |
| 123 | Pressure-Side | 0.18305 | 0.02573 | 0.10000 |
| 124 | Pressure-Side | 0.19193 | 0.02602 | 0.10000 |
| 125 | Pressure-Side | 0.20080 | 0.02645 | 0.10000 |
| 126 | Pressure-Side | 0.20968 | 0.02699 | 0.10000 |
| 127 | Pressure-Side | 0.21854 | 0.02768 | 0.10000 |
| 128 | Pressure-Side | 0.22739 | 0.02852 | 0.10000 |
| 129 | Pressure-Side | 0.23623 | 0.02952 | 0.10000 |
| 130 | Pressure-Side | 0.24504 | 0.03066 | 0.10000 |
| 131 | Pressure-Side | 0.25384 | 0.03197 | 0.10000 |
| 132 | Pressure-Side | 0.26260 | 0.03346 | 0.10000 |
| 133 | Pressure-Side | 0.27133 | 0.03512 | 0.10000 |
| 134 | Pressure-Side | 0.28003 | 0.03697 | 0.10000 |
| 135 | Pressure-Side | 0.28869 | 0.03900 | 0.10000 |
| 136 | Pressure-Side | 0.29730 | 0.04121 | 0.10000 |
| 137 | Pressure-Side | 0.30586 | 0.04360 | 0.10000 |
| 138 | Pressure-Side | 0.31436 | 0.04619 | 0.10000 |
| 139 | Pressure-Side | 0.32280 | 0.04897 | 0.10000 |
| 140 | Pressure-Side | 0.33118 | 0.05195 | 0.10000 |
| 141 | Pressure-Side | 0.33949 | 0.05511 | 0.10000 |
| 142 | Pressure-Side | 0.34772 | 0.05847 | 0.10000 |
| 143 | Pressure-Side | 0.35588 | 0.06201 | 0.10000 |
| 144 | Pressure-Side | 0.36394 | 0.06574 | 0.10000 |
| 145 | Pressure-Side | 0.37193 | 0.06965 | 0.10000 |
| 146 | Pressure-Side | 0.37981 | 0.07376 | 0.10000 |
| 147 | Pressure-Side | 0.38761 | 0.07804 | 0.10000 |
| 148 | Pressure-Side | 0.39529 | 0.08249 | 0.10000 |
| 149 | Pressure-Side | 0.40288 | 0.08713 | 0.10000 |
| 150 | Pressure-Side | 0.41036 | 0.09194 | 0.10000 |
| 151 | Pressure-Side | 0.41774 | 0.09691 | 0.10000 |
| 152 | Pressure-Side | 0.42499 | 0.10204 | 0.10000 |
| 153 | Pressure-Side | 0.43214 | 0.10731 | 0.10000 |
| 154 | Pressure-Side | 0.43917 | 0.11275 | 0.10000 |
| 155 | Pressure-Side | 0.44610 | 0.11833 | 0.10000 |
| 156 | Pressure-Side | 0.45290 | 0.12404 | 0.10000 |
| 157 | Pressure-Side | 0.45960 | 0.12990 | 0.10000 |
| 158 | Pressure-Side | 0.46618 | 0.13587 | 0.10000 |
| 159 | Pressure-Side | 0.47265 | 0.14197 | 0.10000 |
| 160 | Pressure-Side | 0.47902 | 0.14818 | 0.10000 |
| 161 | Pressure-Side | 0.48526 | 0.15450 | 0.10000 |
| 162 | Pressure-Side | 0.49140 | 0.16092 | 0.10000 |
| 163 | Pressure-Side | 0.49744 | 0.16746 | 0.10000 |
| 164 | Pressure-Side | 0.50336 | 0.17409 | 0.10000 |
| 165 | Pressure-Side | 0.50917 | 0.18082 | 0.10000 |
| 166 | Pressure-Side | 0.51488 | 0.18762 | 0.10000 |
| 167 | Pressure-Side | 0.52049 | 0.19452 | 0.10000 |
| 168 | Pressure-Side | 0.52601 | 0.20149 | 0.10000 |
| 169 | Pressure-Side | 0.53143 | 0.20854 | 0.10000 |
| 170 | Pressure-Side | 0.53675 | 0.21566 | 0.10000 |
| 171 | Pressure-Side | 0.54198 | 0.22285 | 0.10000 |
| 172 | Pressure-Side | 0.54712 | 0.23009 | 0.10000 |
| 173 | Pressure-Side | 0.55219 | 0.23740 | 0.10000 |
| 174 | Pressure-Side | 0.55717 | 0.24478 | 0.10000 |
| 175 | Pressure-Side | 0.56206 | 0.25219 | 0.10000 |
| 176 | Pressure-Side | 0.56689 | 0.25966 | 0.10000 |
| 177 | Pressure-Side | 0.57163 | 0.26718 | 0.10000 |
| 178 | Pressure-Side | 0.57631 | 0.27474 | 0.10000 |
| 179 | Pressure-Side | 0.58092 | 0.28235 | 0.10000 |
| 180 | Pressure-Side | 0.58545 | 0.28999 | 0.10000 |
| 181 | Pressure-Side | 0.58993 | 0.29767 | 0.10000 |
| 182 | Pressure-Side | 0.59434 | 0.30539 | 0.10000 |
| 183 | Pressure-Side | 0.59870 | 0.31314 | 0.10000 |
| 184 | Pressure-Side | 0.60301 | 0.32091 | 0.10000 |
| 185 | Pressure-Side | 0.60726 | 0.32873 | 0.10000 |
| 186 | Pressure-Side | 0.61146 | 0.33655 | 0.10000 |
| 187 | Pressure-Side | 0.61562 | 0.34442 | 0.10000 |
| 188 | Pressure-Side | 0.61972 | 0.35230 | 0.10000 |
| 189 | Pressure-Side | 0.62380 | 0.36020 | 0.10000 |
| 190 | Pressure-Side | 0.62784 | 0.36812 | 0.10000 |
| 191 | Pressure-Side | 0.63186 | 0.37605 | 0.10000 |
| 192 | Pressure-Side | 0.63583 | 0.38400 | 0.10000 |
| 193 | Pressure-Side | 0.63979 | 0.39196 | 0.10000 |
| 194 | Pressure-Side | 0.64372 | 0.39993 | 0.10000 |
| 195 | Pressure-Side | 0.64765 | 0.40790 | 0.10000 |
| 196 | Pressure-Side | 0.65155 | 0.41589 | 0.10000 |
| 197 | Pressure-Side | 0.65502 | 0.42105 | 0.10000 |
| 198 | Pressure-Side | 0.66012 | 0.42460 | 0.10000 |
| 199 | Pressure-Side | 0.66620 | 0.42589 | 0.10000 |
| 200 | Pressure-Side | 0.67228 | 0.42474 | 0.10000 |
| 1 | Suction-Side | −0.02579 | −0.00894 | 0.20001 |
| 2 | Suction-Side | −0.02522 | −0.02136 | 0.20001 |
| 3 | Suction-Side | −0.02280 | 0.00310 | 0.20001 |
| 4 | Suction-Side | −0.02211 | −0.03340 | 0.20001 |
| 5 | Suction-Side | −0.01736 | −0.04490 | 0.20001 |
| 6 | Suction-Side | −0.01619 | 0.01360 | 0.20001 |
| 7 | Suction-Side | −0.01147 | −0.05588 | 0.20001 |
| 8 | Suction-Side | −0.00477 | −0.06638 | 0.20001 |
| 9 | Suction-Side | 0.00256 | −0.07645 | 0.20001 |
| 10 | Suction-Side | 0.01042 | −0.08612 | 0.20001 |
| 11 | Suction-Side | 0.01871 | −0.09542 | 0.20001 |
| 12 | Suction-Side | 0.02738 | −0.10436 | 0.20001 |

TABLE I-continued

Non-Dimensionalized (X Y Z/Span Height)

| N | Location | X | Y | Z |
|---|---|---|---|---|
| 13 | Suction-Side | 0.03640 | −0.11296 | 0.20001 |
| 14 | Suction-Side | 0.04573 | −0.12121 | 0.20001 |
| 15 | Suction-Side | 0.05536 | −0.12911 | 0.20001 |
| 16 | Suction-Side | 0.06528 | −0.13665 | 0.20001 |
| 17 | Suction-Side | 0.07546 | −0.14383 | 0.20001 |
| 18 | Suction-Side | 0.08589 | −0.15064 | 0.20001 |
| 19 | Suction-Side | 0.09656 | −0.15705 | 0.20001 |
| 20 | Suction-Side | 0.10748 | −0.16305 | 0.20001 |
| 21 | Suction-Side | 0.11862 | −0.16863 | 0.20001 |
| 22 | Suction-Side | 0.12998 | −0.17373 | 0.20001 |
| 23 | Suction-Side | 0.14155 | −0.17837 | 0.20001 |
| 24 | Suction-Side | 0.15331 | −0.18249 | 0.20001 |
| 25 | Suction-Side | 0.16523 | −0.18608 | 0.20001 |
| 26 | Suction-Side | 0.17732 | −0.18911 | 0.20001 |
| 27 | Suction-Side | 0.18953 | −0.19154 | 0.20001 |
| 28 | Suction-Side | 0.20185 | −0.19335 | 0.20001 |
| 29 | Suction-Side | 0.21425 | −0.19452 | 0.20001 |
| 30 | Suction-Side | 0.22670 | −0.19502 | 0.20001 |
| 31 | Suction-Side | 0.23916 | −0.19485 | 0.20001 |
| 32 | Suction-Side | 0.25158 | −0.19400 | 0.20001 |
| 33 | Suction-Side | 0.26394 | −0.19244 | 0.20001 |
| 34 | Suction-Side | 0.27619 | −0.19020 | 0.20001 |
| 35 | Suction-Side | 0.28830 | −0.18727 | 0.20001 |
| 36 | Suction-Side | 0.30023 | −0.18370 | 0.20001 |
| 37 | Suction-Side | 0.31197 | −0.17950 | 0.20001 |
| 38 | Suction-Side | 0.32345 | −0.17469 | 0.20001 |
| 39 | Suction-Side | 0.33469 | −0.16932 | 0.20001 |
| 40 | Suction-Side | 0.34567 | −0.16342 | 0.20001 |
| 41 | Suction-Side | 0.35635 | −0.15704 | 0.20001 |
| 42 | Suction-Side | 0.36677 | −0.15020 | 0.20001 |
| 43 | Suction-Side | 0.37690 | −0.14294 | 0.20001 |
| 44 | Suction-Side | 0.38673 | −0.13530 | 0.20001 |
| 45 | Suction-Side | 0.39629 | −0.12730 | 0.20001 |
| 46 | Suction-Side | 0.40555 | −0.11898 | 0.20001 |
| 47 | Suction-Side | 0.41456 | −0.11037 | 0.20001 |
| 48 | Suction-Side | 0.42329 | −0.10149 | 0.20001 |
| 49 | Suction-Side | 0.43179 | −0.09236 | 0.20001 |
| 50 | Suction-Side | 0.44002 | −0.08303 | 0.20001 |
| 51 | Suction-Side | 0.44804 | −0.07349 | 0.20001 |
| 52 | Suction-Side | 0.45583 | −0.06376 | 0.20001 |
| 53 | Suction-Side | 0.46341 | −0.05389 | 0.20001 |
| 54 | Suction-Side | 0.47079 | −0.04384 | 0.20001 |
| 55 | Suction-Side | 0.47797 | −0.03366 | 0.20001 |
| 56 | Suction-Side | 0.48497 | −0.02336 | 0.20001 |
| 57 | Suction-Side | 0.49179 | −0.01293 | 0.20001 |
| 58 | Suction-Side | 0.49845 | −0.00241 | 0.20001 |
| 59 | Suction-Side | 0.50493 | 0.00823 | 0.20001 |
| 60 | Suction-Side | 0.51127 | 0.01895 | 0.20001 |
| 61 | Suction-Side | 0.51748 | 0.02977 | 0.20001 |
| 62 | Suction-Side | 0.52352 | 0.04065 | 0.20001 |
| 63 | Suction-Side | 0.52945 | 0.05160 | 0.20001 |
| 64 | Suction-Side | 0.53526 | 0.06263 | 0.20001 |
| 65 | Suction-Side | 0.54093 | 0.07372 | 0.20001 |
| 66 | Suction-Side | 0.54650 | 0.08487 | 0.20001 |
| 67 | Suction-Side | 0.55196 | 0.09606 | 0.20001 |
| 68 | Suction-Side | 0.55733 | 0.10731 | 0.20001 |
| 69 | Suction-Side | 0.56259 | 0.11859 | 0.20001 |
| 70 | Suction-Side | 0.56776 | 0.12993 | 0.20001 |
| 71 | Suction-Side | 0.57284 | 0.14131 | 0.20001 |
| 72 | Suction-Side | 0.57785 | 0.15272 | 0.20001 |
| 73 | Suction-Side | 0.58277 | 0.16416 | 0.20001 |
| 74 | Suction-Side | 0.58762 | 0.17563 | 0.20001 |
| 75 | Suction-Side | 0.59239 | 0.18714 | 0.20001 |
| 76 | Suction-Side | 0.59709 | 0.19868 | 0.20001 |
| 77 | Suction-Side | 0.60173 | 0.21024 | 0.20001 |
| 78 | Suction-Side | 0.60632 | 0.22183 | 0.20001 |
| 79 | Suction-Side | 0.61085 | 0.23343 | 0.20001 |
| 80 | Suction-Side | 0.61531 | 0.24506 | 0.20001 |
| 81 | Suction-Side | 0.61974 | 0.25671 | 0.20001 |
| 82 | Suction-Side | 0.62410 | 0.26838 | 0.20001 |
| 83 | Suction-Side | 0.62842 | 0.28006 | 0.20001 |
| 84 | Suction-Side | 0.63269 | 0.29176 | 0.20001 |
| 85 | Suction-Side | 0.63693 | 0.30348 | 0.20001 |
| 86 | Suction-Side | 0.64112 | 0.31521 | 0.20001 |
| 87 | Suction-Side | 0.64527 | 0.32696 | 0.20001 |
| 88 | Suction-Side | 0.64937 | 0.33872 | 0.20001 |
| 89 | Suction-Side | 0.65344 | 0.35049 | 0.20001 |
| 90 | Suction-Side | 0.65748 | 0.36228 | 0.20001 |
| 91 | Suction-Side | 0.66148 | 0.37407 | 0.20001 |
| 92 | Suction-Side | 0.66545 | 0.38588 | 0.20001 |
| 93 | Suction-Side | 0.66940 | 0.39770 | 0.20001 |
| 94 | Suction-Side | 0.67226 | 0.45405 | 0.20001 |
| 95 | Suction-Side | 0.67331 | 0.40953 | 0.20001 |
| 96 | Suction-Side | 0.67719 | 0.42137 | 0.20001 |
| 97 | Suction-Side | 0.67741 | 0.45058 | 0.20001 |
| 98 | Suction-Side | 0.68086 | 0.44541 | 0.20001 |
| 99 | Suction-Side | 0.68105 | 0.43321 | 0.20001 |
| 100 | Suction-Side | 0.68210 | 0.43933 | 0.20001 |
| 101 | Pressure-Side | −0.01619 | 0.01360 | 0.20001 |
| 102 | Pressure-Side | −0.00967 | 0.01987 | 0.20001 |
| 103 | Pressure-Side | −0.00209 | 0.02481 | 0.20001 |
| 104 | Pressure-Side | 0.00618 | 0.02851 | 0.20001 |
| 105 | Pressure-Side | 0.01484 | 0.03116 | 0.20001 |
| 106 | Pressure-Side | 0.02371 | 0.03305 | 0.20001 |
| 107 | Pressure-Side | 0.03268 | 0.03437 | 0.20001 |
| 108 | Pressure-Side | 0.04169 | 0.03526 | 0.20001 |
| 109 | Pressure-Side | 0.05074 | 0.03583 | 0.20001 |
| 110 | Pressure-Side | 0.05980 | 0.03619 | 0.20001 |
| 111 | Pressure-Side | 0.06885 | 0.03639 | 0.20001 |
| 112 | Pressure-Side | 0.07792 | 0.03647 | 0.20001 |
| 113 | Pressure-Side | 0.08699 | 0.03649 | 0.20001 |
| 114 | Pressure-Side | 0.09606 | 0.03648 | 0.20001 |
| 115 | Pressure-Side | 0.10512 | 0.03647 | 0.20001 |
| 116 | Pressure-Side | 0.11418 | 0.03645 | 0.20001 |
| 117 | Pressure-Side | 0.12325 | 0.03649 | 0.20001 |
| 118 | Pressure-Side | 0.13231 | 0.03657 | 0.20001 |
| 119 | Pressure-Side | 0.14137 | 0.03672 | 0.20001 |
| 120 | Pressure-Side | 0.15044 | 0.03694 | 0.20001 |
| 121 | Pressure-Side | 0.15949 | 0.03728 | 0.20001 |
| 122 | Pressure-Side | 0.16854 | 0.03769 | 0.20001 |
| 123 | Pressure-Side | 0.17759 | 0.03823 | 0.20001 |
| 124 | Pressure-Side | 0.18664 | 0.03888 | 0.20001 |
| 125 | Pressure-Side | 0.19566 | 0.03967 | 0.20001 |
| 126 | Pressure-Side | 0.20468 | 0.04059 | 0.20001 |
| 127 | Pressure-Side | 0.21368 | 0.04164 | 0.20001 |
| 128 | Pressure-Side | 0.22266 | 0.04284 | 0.20001 |
| 129 | Pressure-Side | 0.23162 | 0.04421 | 0.20001 |
| 130 | Pressure-Side | 0.24056 | 0.04573 | 0.20001 |
| 131 | Pressure-Side | 0.24947 | 0.04742 | 0.20001 |
| 132 | Pressure-Side | 0.25833 | 0.04926 | 0.20001 |
| 133 | Pressure-Side | 0.26717 | 0.05130 | 0.20001 |
| 134 | Pressure-Side | 0.27597 | 0.05350 | 0.20001 |
| 135 | Pressure-Side | 0.28471 | 0.05588 | 0.20001 |
| 136 | Pressure-Side | 0.29340 | 0.05845 | 0.20001 |
| 137 | Pressure-Side | 0.30204 | 0.06120 | 0.20001 |
| 138 | Pressure-Side | 0.31061 | 0.06412 | 0.20001 |
| 139 | Pressure-Side | 0.31913 | 0.06724 | 0.20001 |
| 140 | Pressure-Side | 0.32757 | 0.07054 | 0.20001 |
| 141 | Pressure-Side | 0.33594 | 0.07402 | 0.20001 |
| 142 | Pressure-Side | 0.34424 | 0.07769 | 0.20001 |
| 143 | Pressure-Side | 0.35243 | 0.08153 | 0.20001 |
| 144 | Pressure-Side | 0.36055 | 0.08556 | 0.20001 |
| 145 | Pressure-Side | 0.36859 | 0.08976 | 0.20001 |
| 146 | Pressure-Side | 0.37653 | 0.09414 | 0.20001 |
| 147 | Pressure-Side | 0.38437 | 0.09869 | 0.20001 |
| 148 | Pressure-Side | 0.39210 | 0.10340 | 0.20001 |
| 149 | Pressure-Side | 0.39973 | 0.10830 | 0.20001 |
| 150 | Pressure-Side | 0.40727 | 0.11335 | 0.20001 |
| 151 | Pressure-Side | 0.41468 | 0.11855 | 0.20001 |
| 152 | Pressure-Side | 0.42199 | 0.12391 | 0.20001 |
| 153 | Pressure-Side | 0.42919 | 0.12941 | 0.20001 |
| 154 | Pressure-Side | 0.43628 | 0.13507 | 0.20001 |
| 155 | Pressure-Side | 0.44325 | 0.14085 | 0.20001 |
| 156 | Pressure-Side | 0.45012 | 0.14677 | 0.20001 |
| 157 | Pressure-Side | 0.45688 | 0.15281 | 0.20001 |
| 158 | Pressure-Side | 0.46351 | 0.15899 | 0.20001 |
| 159 | Pressure-Side | 0.47005 | 0.16528 | 0.20001 |
| 160 | Pressure-Side | 0.47645 | 0.17167 | 0.20001 |
| 161 | Pressure-Side | 0.48276 | 0.17818 | 0.20001 |
| 162 | Pressure-Side | 0.48896 | 0.18480 | 0.20001 |
| 163 | Pressure-Side | 0.49506 | 0.19151 | 0.20001 |
| 164 | Pressure-Side | 0.50104 | 0.19832 | 0.20001 |

TABLE I-continued

Non-Dimensionalized (X Y Z/Span Height)

| N | Location | X | Y | Z |
|---|---|---|---|---|
| 165 | Pressure-Side | 0.50691 | 0.20523 | 0.20001 |
| 166 | Pressure-Side | 0.51269 | 0.21220 | 0.20001 |
| 167 | Pressure-Side | 0.51837 | 0.21927 | 0.20001 |
| 168 | Pressure-Side | 0.52395 | 0.22642 | 0.20001 |
| 169 | Pressure-Side | 0.52942 | 0.23364 | 0.20001 |
| 170 | Pressure-Side | 0.53482 | 0.24092 | 0.20001 |
| 171 | Pressure-Side | 0.54011 | 0.24829 | 0.20001 |
| 172 | Pressure-Side | 0.54532 | 0.25570 | 0.20001 |
| 173 | Pressure-Side | 0.55045 | 0.26318 | 0.20001 |
| 174 | Pressure-Side | 0.55548 | 0.27070 | 0.20001 |
| 175 | Pressure-Side | 0.56044 | 0.27829 | 0.20001 |
| 176 | Pressure-Side | 0.56533 | 0.28593 | 0.20001 |
| 177 | Pressure-Side | 0.57014 | 0.29362 | 0.20001 |
| 178 | Pressure-Side | 0.57487 | 0.30134 | 0.20001 |
| 179 | Pressure-Side | 0.57955 | 0.30911 | 0.20001 |
| 180 | Pressure-Side | 0.58415 | 0.31691 | 0.20001 |
| 181 | Pressure-Side | 0.58869 | 0.32477 | 0.20001 |
| 182 | Pressure-Side | 0.59317 | 0.33265 | 0.20001 |
| 183 | Pressure-Side | 0.59760 | 0.34055 | 0.20001 |
| 184 | Pressure-Side | 0.60197 | 0.34849 | 0.20001 |
| 185 | Pressure-Side | 0.60629 | 0.35646 | 0.20001 |
| 186 | Pressure-Side | 0.61057 | 0.36445 | 0.20001 |
| 187 | Pressure-Side | 0.61479 | 0.37248 | 0.20001 |
| 188 | Pressure-Side | 0.61898 | 0.38050 | 0.20001 |
| 189 | Pressure-Side | 0.62314 | 0.38857 | 0.20001 |
| 190 | Pressure-Side | 0.62726 | 0.39664 | 0.20001 |
| 191 | Pressure-Side | 0.63134 | 0.40473 | 0.20001 |
| 192 | Pressure-Side | 0.63541 | 0.41282 | 0.20001 |
| 193 | Pressure-Side | 0.63946 | 0.42094 | 0.20001 |
| 194 | Pressure-Side | 0.64347 | 0.42906 | 0.20001 |
| 195 | Pressure-Side | 0.64749 | 0.43719 | 0.20001 |
| 196 | Pressure-Side | 0.65147 | 0.44533 | 0.20001 |
| 197 | Pressure-Side | 0.65497 | 0.45047 | 0.20001 |
| 198 | Pressure-Side | 0.66010 | 0.45395 | 0.20001 |
| 199 | Pressure-Side | 0.66617 | 0.45523 | 0.20001 |
| 200 | Pressure-Side | 0.67226 | 0.45405 | 0.20001 |
| 1 | Suction-Side | −0.03514 | −0.00185 | 0.29999 |
| 2 | Suction-Side | −0.03453 | −0.01439 | 0.29999 |
| 3 | Suction-Side | −0.03221 | 0.01034 | 0.29999 |
| 4 | Suction-Side | −0.03142 | −0.02657 | 0.29999 |
| 5 | Suction-Side | −0.02662 | −0.03819 | 0.29999 |
| 6 | Suction-Side | −0.02557 | 0.02097 | 0.29999 |
| 7 | Suction-Side | −0.02067 | −0.04928 | 0.29999 |
| 8 | Suction-Side | −0.01385 | −0.05986 | 0.29999 |
| 9 | Suction-Side | −0.00635 | −0.06997 | 0.29999 |
| 10 | Suction-Side | 0.00169 | −0.07964 | 0.29999 |
| 11 | Suction-Side | 0.01019 | −0.08892 | 0.29999 |
| 12 | Suction-Side | 0.01910 | −0.09781 | 0.29999 |
| 13 | Suction-Side | 0.02839 | −0.10630 | 0.29999 |
| 14 | Suction-Side | 0.03801 | −0.11441 | 0.29999 |
| 15 | Suction-Side | 0.04793 | −0.12214 | 0.29999 |
| 16 | Suction-Side | 0.05817 | −0.12948 | 0.29999 |
| 17 | Suction-Side | 0.06867 | −0.13642 | 0.29999 |
| 18 | Suction-Side | 0.07943 | −0.14294 | 0.29999 |
| 19 | Suction-Side | 0.09043 | −0.14904 | 0.29999 |
| 20 | Suction-Side | 0.10168 | −0.15469 | 0.29999 |
| 21 | Suction-Side | 0.11315 | −0.15987 | 0.29999 |
| 22 | Suction-Side | 0.12483 | −0.16456 | 0.29999 |
| 23 | Suction-Side | 0.13669 | −0.16875 | 0.29999 |
| 24 | Suction-Side | 0.14873 | −0.17240 | 0.29999 |
| 25 | Suction-Side | 0.16093 | −0.17549 | 0.29999 |
| 26 | Suction-Side | 0.17327 | −0.17800 | 0.29999 |
| 27 | Suction-Side | 0.18571 | −0.17990 | 0.29999 |
| 28 | Suction-Side | 0.19822 | −0.18117 | 0.29999 |
| 29 | Suction-Side | 0.21080 | −0.18180 | 0.29999 |
| 30 | Suction-Side | 0.22338 | −0.18177 | 0.29999 |
| 31 | Suction-Side | 0.23594 | −0.18108 | 0.29999 |
| 32 | Suction-Side | 0.24846 | −0.17971 | 0.29999 |
| 33 | Suction-Side | 0.26087 | −0.17768 | 0.29999 |
| 34 | Suction-Side | 0.27316 | −0.17499 | 0.29999 |
| 35 | Suction-Side | 0.28530 | −0.17166 | 0.29999 |
| 36 | Suction-Side | 0.29724 | −0.16771 | 0.29999 |
| 37 | Suction-Side | 0.30898 | −0.16315 | 0.29999 |
| 38 | Suction-Side | 0.32047 | −0.15805 | 0.29999 |
| 39 | Suction-Side | 0.33173 | −0.15240 | 0.29999 |
| 40 | Suction-Side | 0.34271 | −0.14625 | 0.29999 |
| 41 | Suction-Side | 0.35342 | −0.13964 | 0.29999 |
| 42 | Suction-Side | 0.36385 | −0.13260 | 0.29999 |
| 43 | Suction-Side | 0.37399 | −0.12516 | 0.29999 |
| 44 | Suction-Side | 0.38386 | −0.11736 | 0.29999 |
| 45 | Suction-Side | 0.39346 | −0.10921 | 0.29999 |
| 46 | Suction-Side | 0.40279 | −0.10076 | 0.29999 |
| 47 | Suction-Side | 0.41185 | −0.09203 | 0.29999 |
| 48 | Suction-Side | 0.42065 | −0.08303 | 0.29999 |
| 49 | Suction-Side | 0.42921 | −0.07380 | 0.29999 |
| 50 | Suction-Side | 0.43751 | −0.06436 | 0.29999 |
| 51 | Suction-Side | 0.44561 | −0.05471 | 0.29999 |
| 52 | Suction-Side | 0.45347 | −0.04489 | 0.29999 |
| 53 | Suction-Side | 0.46113 | −0.03490 | 0.29999 |
| 54 | Suction-Side | 0.46858 | −0.02476 | 0.29999 |
| 55 | Suction-Side | 0.47584 | −0.01447 | 0.29999 |
| 56 | Suction-Side | 0.48291 | −0.00407 | 0.29999 |
| 57 | Suction-Side | 0.48981 | 0.00646 | 0.29999 |
| 58 | Suction-Side | 0.49653 | 0.01710 | 0.29999 |
| 59 | Suction-Side | 0.50310 | 0.02784 | 0.29999 |
| 60 | Suction-Side | 0.50950 | 0.03867 | 0.29999 |
| 61 | Suction-Side | 0.51576 | 0.04960 | 0.29999 |
| 62 | Suction-Side | 0.52187 | 0.06059 | 0.29999 |
| 63 | Suction-Side | 0.52785 | 0.07166 | 0.29999 |
| 64 | Suction-Side | 0.53372 | 0.08281 | 0.29999 |
| 65 | Suction-Side | 0.53946 | 0.09401 | 0.29999 |
| 66 | Suction-Side | 0.54506 | 0.10527 | 0.29999 |
| 67 | Suction-Side | 0.55058 | 0.11659 | 0.29999 |
| 68 | Suction-Side | 0.55597 | 0.12795 | 0.29999 |
| 69 | Suction-Side | 0.56128 | 0.13937 | 0.29999 |
| 70 | Suction-Side | 0.56649 | 0.15082 | 0.29999 |
| 71 | Suction-Side | 0.57159 | 0.16232 | 0.29999 |
| 72 | Suction-Side | 0.57663 | 0.17387 | 0.29999 |
| 73 | Suction-Side | 0.58157 | 0.18544 | 0.29999 |
| 74 | Suction-Side | 0.58643 | 0.19704 | 0.29999 |
| 75 | Suction-Side | 0.59123 | 0.20867 | 0.29999 |
| 76 | Suction-Side | 0.59595 | 0.22034 | 0.29999 |
| 77 | Suction-Side | 0.60061 | 0.23203 | 0.29999 |
| 78 | Suction-Side | 0.60520 | 0.24375 | 0.29999 |
| 79 | Suction-Side | 0.60973 | 0.25549 | 0.29999 |
| 80 | Suction-Side | 0.61421 | 0.26726 | 0.29999 |
| 81 | Suction-Side | 0.61862 | 0.27904 | 0.29999 |
| 82 | Suction-Side | 0.62299 | 0.29084 | 0.29999 |
| 83 | Suction-Side | 0.62731 | 0.30267 | 0.29999 |
| 84 | Suction-Side | 0.63159 | 0.31451 | 0.29999 |
| 85 | Suction-Side | 0.63582 | 0.32636 | 0.29999 |
| 86 | Suction-Side | 0.64000 | 0.33823 | 0.29999 |
| 87 | Suction-Side | 0.64415 | 0.35011 | 0.29999 |
| 88 | Suction-Side | 0.64826 | 0.36200 | 0.29999 |
| 89 | Suction-Side | 0.65232 | 0.37391 | 0.29999 |
| 90 | Suction-Side | 0.65635 | 0.38584 | 0.29999 |
| 91 | Suction-Side | 0.66035 | 0.39778 | 0.29999 |
| 92 | Suction-Side | 0.66432 | 0.40971 | 0.29999 |
| 93 | Suction-Side | 0.66826 | 0.42167 | 0.29999 |
| 94 | Suction-Side | 0.67106 | 0.47836 | 0.29999 |
| 95 | Suction-Side | 0.67218 | 0.43363 | 0.29999 |
| 96 | Suction-Side | 0.67607 | 0.44559 | 0.29999 |
| 97 | Suction-Side | 0.67622 | 0.47492 | 0.29999 |
| 98 | Suction-Side | 0.67969 | 0.46977 | 0.29999 |
| 99 | Suction-Side | 0.67995 | 0.45757 | 0.29999 |
| 100 | Suction-Side | 0.68097 | 0.46369 | 0.29999 |
| 101 | Pressure-Side | −0.02557 | 0.02097 | 0.29999 |
| 102 | Pressure-Side | −0.01894 | 0.02732 | 0.29999 |
| 103 | Pressure-Side | −0.01126 | 0.03239 | 0.29999 |
| 104 | Pressure-Side | −0.00288 | 0.03623 | 0.29999 |
| 105 | Pressure-Side | 0.00586 | 0.03907 | 0.29999 |
| 106 | Pressure-Side | 0.01483 | 0.04116 | 0.29999 |
| 107 | Pressure-Side | 0.02391 | 0.04267 | 0.29999 |
| 108 | Pressure-Side | 0.03305 | 0.04378 | 0.29999 |
| 109 | Pressure-Side | 0.04222 | 0.04457 | 0.29999 |
| 110 | Pressure-Side | 0.05142 | 0.04516 | 0.29999 |
| 111 | Pressure-Side | 0.06061 | 0.04558 | 0.29999 |
| 112 | Pressure-Side | 0.06981 | 0.04591 | 0.29999 |
| 113 | Pressure-Side | 0.07902 | 0.04618 | 0.29999 |
| 114 | Pressure-Side | 0.08823 | 0.04642 | 0.29999 |
| 115 | Pressure-Side | 0.09742 | 0.04665 | 0.29999 |
| 116 | Pressure-Side | 0.10663 | 0.04690 | 0.29999 |

TABLE I-continued

Non-Dimensionalized (X Y Z/Span Height)

| N | Location | X | Y | Z |
|---|---|---|---|---|
| 117 | Pressure-Side | 0.11584 | 0.04719 | 0.29999 |
| 118 | Pressure-Side | 0.12504 | 0.04755 | 0.29999 |
| 119 | Pressure-Side | 0.13424 | 0.04796 | 0.29999 |
| 120 | Pressure-Side | 0.14343 | 0.04847 | 0.29999 |
| 121 | Pressure-Side | 0.15262 | 0.04906 | 0.29999 |
| 122 | Pressure-Side | 0.16180 | 0.04977 | 0.29999 |
| 123 | Pressure-Side | 0.17097 | 0.05058 | 0.29999 |
| 124 | Pressure-Side | 0.18014 | 0.05151 | 0.29999 |
| 125 | Pressure-Side | 0.18928 | 0.05257 | 0.29999 |
| 126 | Pressure-Side | 0.19841 | 0.05377 | 0.29999 |
| 127 | Pressure-Side | 0.20753 | 0.05511 | 0.29999 |
| 128 | Pressure-Side | 0.21660 | 0.05659 | 0.29999 |
| 129 | Pressure-Side | 0.22567 | 0.05822 | 0.29999 |
| 130 | Pressure-Side | 0.23470 | 0.06001 | 0.29999 |
| 131 | Pressure-Side | 0.24370 | 0.06197 | 0.29999 |
| 132 | Pressure-Side | 0.25266 | 0.06409 | 0.29999 |
| 133 | Pressure-Side | 0.26158 | 0.06638 | 0.29999 |
| 134 | Pressure-Side | 0.27045 | 0.06884 | 0.29999 |
| 135 | Pressure-Side | 0.27928 | 0.07147 | 0.29999 |
| 136 | Pressure-Side | 0.28805 | 0.07427 | 0.29999 |
| 137 | Pressure-Side | 0.29677 | 0.07725 | 0.29999 |
| 138 | Pressure-Side | 0.30542 | 0.08041 | 0.29999 |
| 139 | Pressure-Side | 0.31399 | 0.08374 | 0.29999 |
| 140 | Pressure-Side | 0.32251 | 0.08726 | 0.29999 |
| 141 | Pressure-Side | 0.33095 | 0.09094 | 0.29999 |
| 142 | Pressure-Side | 0.33930 | 0.09481 | 0.29999 |
| 143 | Pressure-Side | 0.34758 | 0.09885 | 0.29999 |
| 144 | Pressure-Side | 0.35577 | 0.10305 | 0.29999 |
| 145 | Pressure-Side | 0.36386 | 0.10743 | 0.29999 |
| 146 | Pressure-Side | 0.37188 | 0.11198 | 0.29999 |
| 147 | Pressure-Side | 0.37978 | 0.11669 | 0.29999 |
| 148 | Pressure-Side | 0.38760 | 0.12157 | 0.29999 |
| 149 | Pressure-Side | 0.39531 | 0.12661 | 0.29999 |
| 150 | Pressure-Side | 0.40291 | 0.13180 | 0.29999 |
| 151 | Pressure-Side | 0.41040 | 0.13715 | 0.29999 |
| 152 | Pressure-Side | 0.41779 | 0.14265 | 0.29999 |
| 153 | Pressure-Side | 0.42506 | 0.14828 | 0.29999 |
| 154 | Pressure-Side | 0.43224 | 0.15406 | 0.29999 |
| 155 | Pressure-Side | 0.43929 | 0.15998 | 0.29999 |
| 156 | Pressure-Side | 0.44623 | 0.16602 | 0.29999 |
| 157 | Pressure-Side | 0.45308 | 0.17219 | 0.29999 |
| 158 | Pressure-Side | 0.45980 | 0.17849 | 0.29999 |
| 159 | Pressure-Side | 0.46640 | 0.18490 | 0.29999 |
| 160 | Pressure-Side | 0.47290 | 0.19142 | 0.29999 |
| 161 | Pressure-Side | 0.47930 | 0.19805 | 0.29999 |
| 162 | Pressure-Side | 0.48558 | 0.20478 | 0.29999 |
| 163 | Pressure-Side | 0.49175 | 0.21162 | 0.29999 |
| 164 | Pressure-Side | 0.49781 | 0.21854 | 0.29999 |
| 165 | Pressure-Side | 0.50377 | 0.22556 | 0.29999 |
| 166 | Pressure-Side | 0.50963 | 0.23267 | 0.29999 |
| 167 | Pressure-Side | 0.51539 | 0.23986 | 0.29999 |
| 168 | Pressure-Side | 0.52104 | 0.24713 | 0.29999 |
| 169 | Pressure-Side | 0.52659 | 0.25447 | 0.29999 |
| 170 | Pressure-Side | 0.53205 | 0.26188 | 0.29999 |
| 171 | Pressure-Side | 0.53742 | 0.26936 | 0.29999 |
| 172 | Pressure-Side | 0.54270 | 0.27690 | 0.29999 |
| 173 | Pressure-Side | 0.54789 | 0.28451 | 0.29999 |
| 174 | Pressure-Side | 0.55301 | 0.29217 | 0.29999 |
| 175 | Pressure-Side | 0.55803 | 0.29989 | 0.29999 |
| 176 | Pressure-Side | 0.56298 | 0.30765 | 0.29999 |
| 177 | Pressure-Side | 0.56786 | 0.31546 | 0.29999 |
| 178 | Pressure-Side | 0.57265 | 0.32332 | 0.29999 |
| 179 | Pressure-Side | 0.57738 | 0.33122 | 0.29999 |
| 180 | Pressure-Side | 0.58205 | 0.33916 | 0.29999 |
| 181 | Pressure-Side | 0.58665 | 0.34715 | 0.29999 |
| 182 | Pressure-Side | 0.59118 | 0.35515 | 0.29999 |
| 183 | Pressure-Side | 0.59567 | 0.36320 | 0.29999 |
| 184 | Pressure-Side | 0.60010 | 0.37127 | 0.29999 |
| 185 | Pressure-Side | 0.60447 | 0.37937 | 0.29999 |
| 186 | Pressure-Side | 0.60880 | 0.38749 | 0.29999 |
| 187 | Pressure-Side | 0.61308 | 0.39567 | 0.29999 |
| 188 | Pressure-Side | 0.61733 | 0.40381 | 0.29999 |
| 189 | Pressure-Side | 0.62154 | 0.41200 | 0.29999 |
| 190 | Pressure-Side | 0.62573 | 0.42021 | 0.29999 |
| 191 | Pressure-Side | 0.62988 | 0.42844 | 0.29999 |
| 192 | Pressure-Side | 0.63398 | 0.43668 | 0.29999 |
| 193 | Pressure-Side | 0.63806 | 0.44492 | 0.29999 |
| 194 | Pressure-Side | 0.64216 | 0.45317 | 0.29999 |
| 195 | Pressure-Side | 0.64624 | 0.46142 | 0.29999 |
| 196 | Pressure-Side | 0.65025 | 0.46971 | 0.29999 |
| 197 | Pressure-Side | 0.65374 | 0.47486 | 0.29999 |
| 198 | Pressure-Side | 0.65889 | 0.47833 | 0.29999 |
| 199 | Pressure-Side | 0.66497 | 0.47957 | 0.29999 |
| 200 | Pressure-Side | 0.67106 | 0.47836 | 0.29999 |
| 1 | Suction-Side | −0.04427 | 0.00525 | 0.40000 |
| 2 | Suction-Side | −0.04359 | −0.00744 | 0.40000 |
| 3 | Suction-Side | −0.04145 | 0.01761 | 0.40000 |
| 4 | Suction-Side | −0.04040 | −0.01975 | 0.40000 |
| 5 | Suction-Side | −0.03552 | −0.03150 | 0.40000 |
| 6 | Suction-Side | −0.03480 | 0.02840 | 0.40000 |
| 7 | Suction-Side | −0.02945 | −0.04269 | 0.40000 |
| 8 | Suction-Side | −0.02250 | −0.05334 | 0.40000 |
| 9 | Suction-Side | −0.01484 | −0.06352 | 0.40000 |
| 10 | Suction-Side | −0.00662 | −0.07324 | 0.40000 |
| 11 | Suction-Side | 0.00209 | −0.08253 | 0.40000 |
| 12 | Suction-Side | 0.01123 | −0.09139 | 0.40000 |
| 13 | Suction-Side | 0.02074 | −0.09984 | 0.40000 |
| 14 | Suction-Side | 0.03061 | −0.10788 | 0.40000 |
| 15 | Suction-Side | 0.04080 | −0.11552 | 0.40000 |
| 16 | Suction-Side | 0.05128 | −0.12274 | 0.40000 |
| 17 | Suction-Side | 0.06206 | −0.12953 | 0.40000 |
| 18 | Suction-Side | 0.07309 | −0.13588 | 0.40000 |
| 19 | Suction-Side | 0.08437 | −0.14178 | 0.40000 |
| 20 | Suction-Side | 0.09588 | −0.14721 | 0.40000 |
| 21 | Suction-Side | 0.10762 | −0.15215 | 0.40000 |
| 22 | Suction-Side | 0.11955 | −0.15658 | 0.40000 |
| 23 | Suction-Side | 0.13167 | −0.16048 | 0.40000 |
| 24 | Suction-Side | 0.14395 | −0.16382 | 0.40000 |
| 25 | Suction-Side | 0.15638 | −0.16660 | 0.40000 |
| 26 | Suction-Side | 0.16892 | −0.16876 | 0.40000 |
| 27 | Suction-Side | 0.18156 | −0.17032 | 0.40000 |
| 28 | Suction-Side | 0.19426 | −0.17123 | 0.40000 |
| 29 | Suction-Side | 0.20698 | −0.17150 | 0.40000 |
| 30 | Suction-Side | 0.21971 | −0.17113 | 0.40000 |
| 31 | Suction-Side | 0.23240 | −0.17008 | 0.40000 |
| 32 | Suction-Side | 0.24502 | −0.16838 | 0.40000 |
| 33 | Suction-Side | 0.25752 | −0.16601 | 0.40000 |
| 34 | Suction-Side | 0.26989 | −0.16302 | 0.40000 |
| 35 | Suction-Side | 0.28209 | −0.15939 | 0.40000 |
| 36 | Suction-Side | 0.29411 | −0.15517 | 0.40000 |
| 37 | Suction-Side | 0.30590 | −0.15036 | 0.40000 |
| 38 | Suction-Side | 0.31746 | −0.14501 | 0.40000 |
| 39 | Suction-Side | 0.32875 | −0.13915 | 0.40000 |
| 40 | Suction-Side | 0.33978 | −0.13280 | 0.40000 |
| 41 | Suction-Side | 0.35055 | −0.12601 | 0.40000 |
| 42 | Suction-Side | 0.36105 | −0.11879 | 0.40000 |
| 43 | Suction-Side | 0.37125 | −0.11119 | 0.40000 |
| 44 | Suction-Side | 0.38119 | −0.10323 | 0.40000 |
| 45 | Suction-Side | 0.39085 | −0.09495 | 0.40000 |
| 46 | Suction-Side | 0.40025 | −0.08635 | 0.40000 |
| 47 | Suction-Side | 0.40939 | −0.07749 | 0.40000 |
| 48 | Suction-Side | 0.41827 | −0.06836 | 0.40000 |
| 49 | Suction-Side | 0.42690 | −0.05900 | 0.40000 |
| 50 | Suction-Side | 0.43529 | −0.04944 | 0.40000 |
| 51 | Suction-Side | 0.44345 | −0.03967 | 0.40000 |
| 52 | Suction-Side | 0.45140 | −0.02972 | 0.40000 |
| 53 | Suction-Side | 0.45914 | −0.01960 | 0.40000 |
| 54 | Suction-Side | 0.46666 | −0.00933 | 0.40000 |
| 55 | Suction-Side | 0.47399 | 0.00108 | 0.40000 |
| 56 | Suction-Side | 0.48114 | 0.01161 | 0.40000 |
| 57 | Suction-Side | 0.48811 | 0.02227 | 0.40000 |
| 58 | Suction-Side | 0.49490 | 0.03304 | 0.40000 |
| 59 | Suction-Side | 0.50151 | 0.04391 | 0.40000 |
| 60 | Suction-Side | 0.50799 | 0.05487 | 0.40000 |
| 61 | Suction-Side | 0.51431 | 0.06593 | 0.40000 |
| 62 | Suction-Side | 0.52048 | 0.07707 | 0.40000 |
| 63 | Suction-Side | 0.52653 | 0.08827 | 0.40000 |
| 64 | Suction-Side | 0.53243 | 0.09955 | 0.40000 |
| 65 | Suction-Side | 0.53821 | 0.11090 | 0.40000 |
| 66 | Suction-Side | 0.54388 | 0.12230 | 0.40000 |
| 67 | Suction-Side | 0.54942 | 0.13376 | 0.40000 |
| 68 | Suction-Side | 0.55487 | 0.14527 | 0.40000 |

TABLE I-continued

| | | Non-Dimensionalized (X Y Z/Span Height) | | |
|---|---|---|---|---|
| N | Location | X | Y | Z |
| 69 | Suction-Side | 0.56020 | 0.15683 | 0.40000 |
| 70 | Suction-Side | 0.56544 | 0.16843 | 0.40000 |
| 71 | Suction-Side | 0.57059 | 0.18007 | 0.40000 |
| 72 | Suction-Side | 0.57564 | 0.19175 | 0.40000 |
| 73 | Suction-Side | 0.58063 | 0.20347 | 0.40000 |
| 74 | Suction-Side | 0.58552 | 0.21523 | 0.40000 |
| 75 | Suction-Side | 0.59033 | 0.22702 | 0.40000 |
| 76 | Suction-Side | 0.59507 | 0.23884 | 0.40000 |
| 77 | Suction-Side | 0.59974 | 0.25068 | 0.40000 |
| 78 | Suction-Side | 0.60436 | 0.26255 | 0.40000 |
| 79 | Suction-Side | 0.60892 | 0.27443 | 0.40000 |
| 80 | Suction-Side | 0.61341 | 0.28635 | 0.40000 |
| 81 | Suction-Side | 0.61785 | 0.29828 | 0.40000 |
| 82 | Suction-Side | 0.62221 | 0.31024 | 0.40000 |
| 83 | Suction-Side | 0.62653 | 0.32221 | 0.40000 |
| 84 | Suction-Side | 0.63082 | 0.33420 | 0.40000 |
| 85 | Suction-Side | 0.63507 | 0.34620 | 0.40000 |
| 86 | Suction-Side | 0.63930 | 0.35822 | 0.40000 |
| 87 | Suction-Side | 0.64346 | 0.37024 | 0.40000 |
| 88 | Suction-Side | 0.64754 | 0.38231 | 0.40000 |
| 89 | Suction-Side | 0.65155 | 0.39439 | 0.40000 |
| 90 | Suction-Side | 0.65557 | 0.40647 | 0.40000 |
| 91 | Suction-Side | 0.65963 | 0.41854 | 0.40000 |
| 92 | Suction-Side | 0.66377 | 0.43058 | 0.40000 |
| 93 | Suction-Side | 0.66784 | 0.44264 | 0.40000 |
| 94 | Suction-Side | 0.67052 | 0.49981 | 0.40000 |
| 95 | Suction-Side | 0.67171 | 0.45476 | 0.40000 |
| 96 | Suction-Side | 0.67547 | 0.46694 | 0.40000 |
| 97 | Suction-Side | 0.67567 | 0.49637 | 0.40000 |
| 98 | Suction-Side | 0.67915 | 0.49123 | 0.40000 |
| 99 | Suction-Side | 0.67946 | 0.47902 | 0.40000 |
| 100 | Suction-Side | 0.68047 | 0.48516 | 0.40000 |
| 101 | Pressure-Side | −0.03480 | 0.02840 | 0.40000 |
| 102 | Pressure-Side | −0.02808 | 0.03488 | 0.40000 |
| 103 | Pressure-Side | −0.02033 | 0.04008 | 0.40000 |
| 104 | Pressure-Side | −0.01188 | 0.04408 | 0.40000 |
| 105 | Pressure-Side | −0.00304 | 0.04708 | 0.40000 |
| 106 | Pressure-Side | 0.00603 | 0.04934 | 0.40000 |
| 107 | Pressure-Side | 0.01523 | 0.05103 | 0.40000 |
| 108 | Pressure-Side | 0.02448 | 0.05231 | 0.40000 |
| 109 | Pressure-Side | 0.03378 | 0.05328 | 0.40000 |
| 110 | Pressure-Side | 0.04310 | 0.05403 | 0.40000 |
| 111 | Pressure-Side | 0.05243 | 0.05465 | 0.40000 |
| 112 | Pressure-Side | 0.06176 | 0.05515 | 0.40000 |
| 113 | Pressure-Side | 0.07110 | 0.05560 | 0.40000 |
| 114 | Pressure-Side | 0.08044 | 0.05603 | 0.40000 |
| 115 | Pressure-Side | 0.08977 | 0.05645 | 0.40000 |
| 116 | Pressure-Side | 0.09911 | 0.05689 | 0.40000 |
| 117 | Pressure-Side | 0.10844 | 0.05738 | 0.40000 |
| 118 | Pressure-Side | 0.11778 | 0.05793 | 0.40000 |
| 119 | Pressure-Side | 0.12711 | 0.05855 | 0.40000 |
| 120 | Pressure-Side | 0.13643 | 0.05926 | 0.40000 |
| 121 | Pressure-Side | 0.14574 | 0.06007 | 0.40000 |
| 122 | Pressure-Side | 0.15505 | 0.06097 | 0.40000 |
| 123 | Pressure-Side | 0.16434 | 0.06200 | 0.40000 |
| 124 | Pressure-Side | 0.17361 | 0.06314 | 0.40000 |
| 125 | Pressure-Side | 0.18288 | 0.06440 | 0.40000 |
| 126 | Pressure-Side | 0.19212 | 0.06581 | 0.40000 |
| 127 | Pressure-Side | 0.20133 | 0.06736 | 0.40000 |
| 128 | Pressure-Side | 0.21053 | 0.06905 | 0.40000 |
| 129 | Pressure-Side | 0.21970 | 0.07090 | 0.40000 |
| 130 | Pressure-Side | 0.22883 | 0.07289 | 0.40000 |
| 131 | Pressure-Side | 0.23792 | 0.07505 | 0.40000 |
| 132 | Pressure-Side | 0.24698 | 0.07737 | 0.40000 |
| 133 | Pressure-Side | 0.25599 | 0.07986 | 0.40000 |
| 134 | Pressure-Side | 0.26495 | 0.08250 | 0.40000 |
| 135 | Pressure-Side | 0.27387 | 0.08533 | 0.40000 |
| 136 | Pressure-Side | 0.28272 | 0.08832 | 0.40000 |
| 137 | Pressure-Side | 0.29152 | 0.09148 | 0.40000 |
| 138 | Pressure-Side | 0.30025 | 0.09482 | 0.40000 |
| 139 | Pressure-Side | 0.30893 | 0.09833 | 0.40000 |
| 140 | Pressure-Side | 0.31751 | 0.10200 | 0.40000 |
| 141 | Pressure-Side | 0.32603 | 0.10585 | 0.40000 |
| 142 | Pressure-Side | 0.33447 | 0.10988 | 0.40000 |
| 143 | Pressure-Side | 0.34283 | 0.11406 | 0.40000 |
| 144 | Pressure-Side | 0.35109 | 0.11842 | 0.40000 |
| 145 | Pressure-Side | 0.35928 | 0.12294 | 0.40000 |
| 146 | Pressure-Side | 0.36737 | 0.12763 | 0.40000 |
| 147 | Pressure-Side | 0.37536 | 0.13248 | 0.40000 |
| 148 | Pressure-Side | 0.38325 | 0.13748 | 0.40000 |
| 149 | Pressure-Side | 0.39104 | 0.14265 | 0.40000 |
| 150 | Pressure-Side | 0.39873 | 0.14796 | 0.40000 |
| 151 | Pressure-Side | 0.40632 | 0.15343 | 0.40000 |
| 152 | Pressure-Side | 0.41379 | 0.15903 | 0.40000 |
| 153 | Pressure-Side | 0.42117 | 0.16479 | 0.40000 |
| 154 | Pressure-Side | 0.42842 | 0.17068 | 0.40000 |
| 155 | Pressure-Side | 0.43557 | 0.17670 | 0.40000 |
| 156 | Pressure-Side | 0.44262 | 0.18285 | 0.40000 |
| 157 | Pressure-Side | 0.44954 | 0.18913 | 0.40000 |
| 158 | Pressure-Side | 0.45636 | 0.19553 | 0.40000 |
| 159 | Pressure-Side | 0.46307 | 0.20204 | 0.40000 |
| 160 | Pressure-Side | 0.46966 | 0.20867 | 0.40000 |
| 161 | Pressure-Side | 0.47615 | 0.21539 | 0.40000 |
| 162 | Pressure-Side | 0.48251 | 0.22224 | 0.40000 |
| 163 | Pressure-Side | 0.48878 | 0.22918 | 0.40000 |
| 164 | Pressure-Side | 0.49494 | 0.23621 | 0.40000 |
| 165 | Pressure-Side | 0.50098 | 0.24333 | 0.40000 |
| 166 | Pressure-Side | 0.50694 | 0.25054 | 0.40000 |
| 167 | Pressure-Side | 0.51278 | 0.25784 | 0.40000 |
| 168 | Pressure-Side | 0.51853 | 0.26522 | 0.40000 |
| 169 | Pressure-Side | 0.52417 | 0.27267 | 0.40000 |
| 170 | Pressure-Side | 0.52972 | 0.28019 | 0.40000 |
| 171 | Pressure-Side | 0.53518 | 0.28778 | 0.40000 |
| 172 | Pressure-Side | 0.54053 | 0.29544 | 0.40000 |
| 173 | Pressure-Side | 0.54581 | 0.30316 | 0.40000 |
| 174 | Pressure-Side | 0.55100 | 0.31093 | 0.40000 |
| 175 | Pressure-Side | 0.55611 | 0.31876 | 0.40000 |
| 176 | Pressure-Side | 0.56113 | 0.32665 | 0.40000 |
| 177 | Pressure-Side | 0.56607 | 0.33457 | 0.40000 |
| 178 | Pressure-Side | 0.57095 | 0.34256 | 0.40000 |
| 179 | Pressure-Side | 0.57575 | 0.35057 | 0.40000 |
| 180 | Pressure-Side | 0.58048 | 0.35864 | 0.40000 |
| 181 | Pressure-Side | 0.58516 | 0.36673 | 0.40000 |
| 182 | Pressure-Side | 0.58976 | 0.37487 | 0.40000 |
| 183 | Pressure-Side | 0.59430 | 0.38304 | 0.40000 |
| 184 | Pressure-Side | 0.59881 | 0.39124 | 0.40000 |
| 185 | Pressure-Side | 0.60325 | 0.39947 | 0.40000 |
| 186 | Pressure-Side | 0.60764 | 0.40771 | 0.40000 |
| 187 | Pressure-Side | 0.61199 | 0.41598 | 0.40000 |
| 188 | Pressure-Side | 0.61630 | 0.42428 | 0.40000 |
| 189 | Pressure-Side | 0.62057 | 0.43260 | 0.40000 |
| 190 | Pressure-Side | 0.62480 | 0.44093 | 0.40000 |
| 191 | Pressure-Side | 0.62901 | 0.44927 | 0.40000 |
| 192 | Pressure-Side | 0.63320 | 0.45763 | 0.40000 |
| 193 | Pressure-Side | 0.63735 | 0.46601 | 0.40000 |
| 194 | Pressure-Side | 0.64149 | 0.47439 | 0.40000 |
| 195 | Pressure-Side | 0.64561 | 0.48278 | 0.40000 |
| 196 | Pressure-Side | 0.64970 | 0.49119 | 0.40000 |
| 197 | Pressure-Side | 0.65319 | 0.49633 | 0.40000 |
| 198 | Pressure-Side | 0.65834 | 0.49980 | 0.40000 |
| 199 | Pressure-Side | 0.66443 | 0.50102 | 0.40000 |
| 200 | Pressure-Side | 0.67052 | 0.49981 | 0.40000 |
| 1 | Suction-Side | −0.05325 | 0.01237 | 0.50000 |
| 2 | Suction-Side | −0.05239 | −0.00045 | 0.50000 |
| 3 | Suction-Side | −0.05062 | 0.02493 | 0.50000 |
| 4 | Suction-Side | −0.04905 | −0.01289 | 0.50000 |
| 5 | Suction-Side | −0.04401 | 0.03595 | 0.50000 |
| 6 | Suction-Side | −0.04401 | −0.02474 | 0.50000 |
| 7 | Suction-Side | −0.03778 | −0.03603 | 0.50000 |
| 8 | Suction-Side | −0.03066 | −0.04677 | 0.50000 |
| 9 | Suction-Side | −0.02283 | −0.05700 | 0.50000 |
| 10 | Suction-Side | −0.01442 | −0.06677 | 0.50000 |
| 11 | Suction-Side | −0.00552 | −0.07608 | 0.50000 |
| 12 | Suction-Side | 0.00383 | −0.08496 | 0.50000 |
| 13 | Suction-Side | 0.01356 | −0.09340 | 0.50000 |
| 14 | Suction-Side | 0.02364 | −0.10142 | 0.50000 |
| 15 | Suction-Side | 0.03406 | −0.10903 | 0.50000 |
| 16 | Suction-Side | 0.04477 | −0.11619 | 0.50000 |
| 17 | Suction-Side | 0.05576 | −0.12291 | 0.50000 |
| 18 | Suction-Side | 0.06703 | −0.12917 | 0.50000 |
| 19 | Suction-Side | 0.07854 | −0.13498 | 0.50000 |
| 20 | Suction-Side | 0.09029 | −0.14028 | 0.50000 |

TABLE I-continued

Non-Dimensionalized (X Y Z/Span Height)

| N | Location | X | Y | Z |
|---|---|---|---|---|
| 21 | Suction-Side | 0.10224 | −0.14509 | 0.50000 |
| 22 | Suction-Side | 0.11440 | −0.14937 | 0.50000 |
| 23 | Suction-Side | 0.12673 | −0.15311 | 0.50000 |
| 24 | Suction-Side | 0.13923 | −0.15627 | 0.50000 |
| 25 | Suction-Side | 0.15186 | −0.15885 | 0.50000 |
| 26 | Suction-Side | 0.16459 | −0.16081 | 0.50000 |
| 27 | Suction-Side | 0.17741 | −0.16216 | 0.50000 |
| 28 | Suction-Side | 0.19028 | −0.16286 | 0.50000 |
| 29 | Suction-Side | 0.20317 | −0.16291 | 0.50000 |
| 30 | Suction-Side | 0.21603 | −0.16232 | 0.50000 |
| 31 | Suction-Side | 0.22887 | −0.16105 | 0.50000 |
| 32 | Suction-Side | 0.24160 | −0.15914 | 0.50000 |
| 33 | Suction-Side | 0.25424 | −0.15658 | 0.50000 |
| 34 | Suction-Side | 0.26672 | −0.15337 | 0.50000 |
| 35 | Suction-Side | 0.27904 | −0.14957 | 0.50000 |
| 36 | Suction-Side | 0.29114 | −0.14516 | 0.50000 |
| 37 | Suction-Side | 0.30304 | −0.14019 | 0.50000 |
| 38 | Suction-Side | 0.31469 | −0.13469 | 0.50000 |
| 39 | Suction-Side | 0.32608 | −0.12867 | 0.50000 |
| 40 | Suction-Side | 0.33722 | −0.12218 | 0.50000 |
| 41 | Suction-Side | 0.34809 | −0.11526 | 0.50000 |
| 42 | Suction-Side | 0.35868 | −0.10791 | 0.50000 |
| 43 | Suction-Side | 0.36899 | −0.10018 | 0.50000 |
| 44 | Suction-Side | 0.37904 | −0.09210 | 0.50000 |
| 45 | Suction-Side | 0.38881 | −0.08370 | 0.50000 |
| 46 | Suction-Side | 0.39830 | −0.07498 | 0.50000 |
| 47 | Suction-Side | 0.40755 | −0.06600 | 0.50000 |
| 48 | Suction-Side | 0.41652 | −0.05675 | 0.50000 |
| 49 | Suction-Side | 0.42526 | −0.04727 | 0.50000 |
| 50 | Suction-Side | 0.43375 | −0.03758 | 0.50000 |
| 51 | Suction-Side | 0.44201 | −0.02768 | 0.50000 |
| 52 | Suction-Side | 0.45005 | −0.01761 | 0.50000 |
| 53 | Suction-Side | 0.45787 | −0.00736 | 0.50000 |
| 54 | Suction-Side | 0.46549 | 0.00303 | 0.50000 |
| 55 | Suction-Side | 0.47290 | 0.01357 | 0.50000 |
| 56 | Suction-Side | 0.48013 | 0.02424 | 0.50000 |
| 57 | Suction-Side | 0.48718 | 0.03504 | 0.50000 |
| 58 | Suction-Side | 0.49405 | 0.04594 | 0.50000 |
| 59 | Suction-Side | 0.50074 | 0.05696 | 0.50000 |
| 60 | Suction-Side | 0.50728 | 0.06807 | 0.50000 |
| 61 | Suction-Side | 0.51366 | 0.07926 | 0.50000 |
| 62 | Suction-Side | 0.51989 | 0.09054 | 0.50000 |
| 63 | Suction-Side | 0.52599 | 0.10190 | 0.50000 |
| 64 | Suction-Side | 0.53196 | 0.11332 | 0.50000 |
| 65 | Suction-Side | 0.53780 | 0.12481 | 0.50000 |
| 66 | Suction-Side | 0.54350 | 0.13638 | 0.50000 |
| 67 | Suction-Side | 0.54909 | 0.14799 | 0.50000 |
| 68 | Suction-Side | 0.55458 | 0.15965 | 0.50000 |
| 69 | Suction-Side | 0.55995 | 0.17137 | 0.50000 |
| 70 | Suction-Side | 0.56522 | 0.18313 | 0.50000 |
| 71 | Suction-Side | 0.57041 | 0.19493 | 0.50000 |
| 72 | Suction-Side | 0.57548 | 0.20677 | 0.50000 |
| 73 | Suction-Side | 0.58048 | 0.21865 | 0.50000 |
| 74 | Suction-Side | 0.58540 | 0.23057 | 0.50000 |
| 75 | Suction-Side | 0.59023 | 0.24252 | 0.50000 |
| 76 | Suction-Side | 0.59501 | 0.25449 | 0.50000 |
| 77 | Suction-Side | 0.59970 | 0.26649 | 0.50000 |
| 78 | Suction-Side | 0.60432 | 0.27852 | 0.50000 |
| 79 | Suction-Side | 0.60889 | 0.29057 | 0.50000 |
| 80 | Suction-Side | 0.61339 | 0.30265 | 0.50000 |
| 81 | Suction-Side | 0.61784 | 0.31475 | 0.50000 |
| 82 | Suction-Side | 0.62224 | 0.32687 | 0.50000 |
| 83 | Suction-Side | 0.62658 | 0.33900 | 0.50000 |
| 84 | Suction-Side | 0.63087 | 0.35116 | 0.50000 |
| 85 | Suction-Side | 0.63513 | 0.36332 | 0.50000 |
| 86 | Suction-Side | 0.63934 | 0.37550 | 0.50000 |
| 87 | Suction-Side | 0.64350 | 0.38770 | 0.50000 |
| 88 | Suction-Side | 0.64763 | 0.39990 | 0.50000 |
| 89 | Suction-Side | 0.65174 | 0.41213 | 0.50000 |
| 90 | Suction-Side | 0.65580 | 0.42436 | 0.50000 |
| 91 | Suction-Side | 0.65984 | 0.43660 | 0.50000 |
| 92 | Suction-Side | 0.66386 | 0.44885 | 0.50000 |
| 93 | Suction-Side | 0.66784 | 0.46110 | 0.50000 |
| 94 | Suction-Side | 0.67084 | 0.51867 | 0.50000 |
| 95 | Suction-Side | 0.67183 | 0.47335 | 0.50000 |
| 96 | Suction-Side | 0.67579 | 0.48562 | 0.50000 |
| 97 | Suction-Side | 0.67599 | 0.51523 | 0.50000 |
| 98 | Suction-Side | 0.67947 | 0.51009 | 0.50000 |
| 99 | Suction-Side | 0.67974 | 0.49790 | 0.50000 |
| 100 | Suction-Side | 0.68078 | 0.50401 | 0.50000 |
| 101 | Pressure-Side | −0.04401 | 0.03595 | 0.50000 |
| 102 | Pressure-Side | −0.03725 | 0.04258 | 0.50000 |
| 103 | Pressure-Side | −0.02945 | 0.04795 | 0.50000 |
| 104 | Pressure-Side | −0.02094 | 0.05213 | 0.50000 |
| 105 | Pressure-Side | −0.01203 | 0.05532 | 0.50000 |
| 106 | Pressure-Side | −0.00286 | 0.05776 | 0.50000 |
| 107 | Pressure-Side | 0.00645 | 0.05962 | 0.50000 |
| 108 | Pressure-Side | 0.01583 | 0.06105 | 0.50000 |
| 109 | Pressure-Side | 0.02524 | 0.06217 | 0.50000 |
| 110 | Pressure-Side | 0.03469 | 0.06307 | 0.50000 |
| 111 | Pressure-Side | 0.04413 | 0.06383 | 0.50000 |
| 112 | Pressure-Side | 0.05360 | 0.06448 | 0.50000 |
| 113 | Pressure-Side | 0.06307 | 0.06506 | 0.50000 |
| 114 | Pressure-Side | 0.07253 | 0.06564 | 0.50000 |
| 115 | Pressure-Side | 0.08201 | 0.06621 | 0.50000 |
| 116 | Pressure-Side | 0.09147 | 0.06679 | 0.50000 |
| 117 | Pressure-Side | 0.10093 | 0.06743 | 0.50000 |
| 118 | Pressure-Side | 0.11039 | 0.06812 | 0.50000 |
| 119 | Pressure-Side | 0.11986 | 0.06889 | 0.50000 |
| 120 | Pressure-Side | 0.12929 | 0.06974 | 0.50000 |
| 121 | Pressure-Side | 0.13874 | 0.07069 | 0.50000 |
| 122 | Pressure-Side | 0.14816 | 0.07175 | 0.50000 |
| 123 | Pressure-Side | 0.15757 | 0.07292 | 0.50000 |
| 124 | Pressure-Side | 0.16697 | 0.07421 | 0.50000 |
| 125 | Pressure-Side | 0.17635 | 0.07563 | 0.50000 |
| 126 | Pressure-Side | 0.18571 | 0.07720 | 0.50000 |
| 127 | Pressure-Side | 0.19504 | 0.07890 | 0.50000 |
| 128 | Pressure-Side | 0.20434 | 0.08073 | 0.50000 |
| 129 | Pressure-Side | 0.21361 | 0.08273 | 0.50000 |
| 130 | Pressure-Side | 0.22285 | 0.08488 | 0.50000 |
| 131 | Pressure-Side | 0.23206 | 0.08718 | 0.50000 |
| 132 | Pressure-Side | 0.24122 | 0.08964 | 0.50000 |
| 133 | Pressure-Side | 0.25033 | 0.09227 | 0.50000 |
| 134 | Pressure-Side | 0.25940 | 0.09505 | 0.50000 |
| 135 | Pressure-Side | 0.26841 | 0.09801 | 0.50000 |
| 136 | Pressure-Side | 0.27736 | 0.10113 | 0.50000 |
| 137 | Pressure-Side | 0.28627 | 0.10441 | 0.50000 |
| 138 | Pressure-Side | 0.29509 | 0.10787 | 0.50000 |
| 139 | Pressure-Side | 0.30386 | 0.11150 | 0.50000 |
| 140 | Pressure-Side | 0.31255 | 0.11530 | 0.50000 |
| 141 | Pressure-Side | 0.32118 | 0.11926 | 0.50000 |
| 142 | Pressure-Side | 0.32971 | 0.12339 | 0.50000 |
| 143 | Pressure-Side | 0.33818 | 0.12768 | 0.50000 |
| 144 | Pressure-Side | 0.34655 | 0.13214 | 0.50000 |
| 145 | Pressure-Side | 0.35483 | 0.13676 | 0.50000 |
| 146 | Pressure-Side | 0.36301 | 0.14155 | 0.50000 |
| 147 | Pressure-Side | 0.37112 | 0.14649 | 0.50000 |
| 148 | Pressure-Side | 0.37912 | 0.15158 | 0.50000 |
| 149 | Pressure-Side | 0.38701 | 0.15683 | 0.50000 |
| 150 | Pressure-Side | 0.39481 | 0.16222 | 0.50000 |
| 151 | Pressure-Side | 0.40251 | 0.16778 | 0.50000 |
| 152 | Pressure-Side | 0.41010 | 0.17347 | 0.50000 |
| 153 | Pressure-Side | 0.41758 | 0.17929 | 0.50000 |
| 154 | Pressure-Side | 0.42495 | 0.18525 | 0.50000 |
| 155 | Pressure-Side | 0.43222 | 0.19135 | 0.50000 |
| 156 | Pressure-Side | 0.43937 | 0.19759 | 0.50000 |
| 157 | Pressure-Side | 0.44642 | 0.20394 | 0.50000 |
| 158 | Pressure-Side | 0.45335 | 0.21041 | 0.50000 |
| 159 | Pressure-Side | 0.46017 | 0.21700 | 0.50000 |
| 160 | Pressure-Side | 0.46688 | 0.22371 | 0.50000 |
| 161 | Pressure-Side | 0.47349 | 0.23052 | 0.50000 |
| 162 | Pressure-Side | 0.47997 | 0.23744 | 0.50000 |
| 163 | Pressure-Side | 0.48635 | 0.24446 | 0.50000 |
| 164 | Pressure-Side | 0.49262 | 0.25157 | 0.50000 |
| 165 | Pressure-Side | 0.49879 | 0.25878 | 0.50000 |
| 166 | Pressure-Side | 0.50485 | 0.26608 | 0.50000 |
| 167 | Pressure-Side | 0.51080 | 0.27347 | 0.50000 |
| 168 | Pressure-Side | 0.51665 | 0.28092 | 0.50000 |
| 169 | Pressure-Side | 0.52241 | 0.28847 | 0.50000 |
| 170 | Pressure-Side | 0.52805 | 0.29609 | 0.50000 |
| 171 | Pressure-Side | 0.53361 | 0.30378 | 0.50000 |
| 172 | Pressure-Side | 0.53907 | 0.31153 | 0.50000 |

TABLE I-continued

Non-Dimensionalized (X Y Z/Span Height)

| N | Location | X | Y | Z |
|---|---|---|---|---|
| 173 | Pressure-Side | 0.54445 | 0.31934 | 0.50000 |
| 174 | Pressure-Side | 0.54973 | 0.32722 | 0.50000 |
| 175 | Pressure-Side | 0.55493 | 0.33516 | 0.50000 |
| 176 | Pressure-Side | 0.56004 | 0.34315 | 0.50000 |
| 177 | Pressure-Side | 0.56508 | 0.35119 | 0.50000 |
| 178 | Pressure-Side | 0.57004 | 0.35927 | 0.50000 |
| 179 | Pressure-Side | 0.57493 | 0.36740 | 0.50000 |
| 180 | Pressure-Side | 0.57974 | 0.37557 | 0.50000 |
| 181 | Pressure-Side | 0.58449 | 0.38378 | 0.50000 |
| 182 | Pressure-Side | 0.58917 | 0.39204 | 0.50000 |
| 183 | Pressure-Side | 0.59380 | 0.40032 | 0.50000 |
| 184 | Pressure-Side | 0.59837 | 0.40864 | 0.50000 |
| 185 | Pressure-Side | 0.60287 | 0.41697 | 0.50000 |
| 186 | Pressure-Side | 0.60734 | 0.42534 | 0.50000 |
| 187 | Pressure-Side | 0.61176 | 0.43374 | 0.50000 |
| 188 | Pressure-Side | 0.61614 | 0.44215 | 0.50000 |
| 189 | Pressure-Side | 0.62047 | 0.45059 | 0.50000 |
| 190 | Pressure-Side | 0.62477 | 0.45904 | 0.50000 |
| 191 | Pressure-Side | 0.62904 | 0.46751 | 0.50000 |
| 192 | Pressure-Side | 0.63328 | 0.47600 | 0.50000 |
| 193 | Pressure-Side | 0.63751 | 0.48449 | 0.50000 |
| 194 | Pressure-Side | 0.64170 | 0.49300 | 0.50000 |
| 195 | Pressure-Side | 0.64588 | 0.50151 | 0.50000 |
| 196 | Pressure-Side | 0.65005 | 0.51003 | 0.50000 |
| 197 | Pressure-Side | 0.65352 | 0.51519 | 0.50000 |
| 198 | Pressure-Side | 0.65866 | 0.51866 | 0.50000 |
| 199 | Pressure-Side | 0.66475 | 0.51988 | 0.50000 |
| 200 | Pressure-Side | 0.67084 | 0.51867 | 0.50000 |
| 1 | Suction-Side | −0.06203 | 0.01954 | 0.60000 |
| 2 | Suction-Side | −0.06093 | 0.00656 | 0.60000 |
| 3 | Suction-Side | −0.05962 | 0.03231 | 0.60000 |
| 4 | Suction-Side | −0.05737 | −0.00598 | 0.60000 |
| 5 | Suction-Side | −0.05312 | 0.04355 | 0.60000 |
| 6 | Suction-Side | −0.05213 | −0.01793 | 0.60000 |
| 7 | Suction-Side | −0.04572 | −0.02928 | 0.60000 |
| 8 | Suction-Side | −0.03842 | −0.04009 | 0.60000 |
| 9 | Suction-Side | −0.03041 | −0.05039 | 0.60000 |
| 10 | Suction-Side | −0.02181 | −0.06021 | 0.60000 |
| 11 | Suction-Side | −0.01273 | −0.06957 | 0.60000 |
| 12 | Suction-Side | −0.00320 | −0.07850 | 0.60000 |
| 13 | Suction-Side | 0.00670 | −0.08699 | 0.60000 |
| 14 | Suction-Side | 0.01696 | −0.09506 | 0.60000 |
| 15 | Suction-Side | 0.02755 | −0.10269 | 0.60000 |
| 16 | Suction-Side | 0.03843 | −0.10988 | 0.60000 |
| 17 | Suction-Side | 0.04961 | −0.11663 | 0.60000 |
| 18 | Suction-Side | 0.06104 | −0.12291 | 0.60000 |
| 19 | Suction-Side | 0.07272 | −0.12872 | 0.60000 |
| 20 | Suction-Side | 0.08464 | −0.13404 | 0.60000 |
| 21 | Suction-Side | 0.09677 | −0.13885 | 0.60000 |
| 22 | Suction-Side | 0.10909 | −0.14313 | 0.60000 |
| 23 | Suction-Side | 0.12160 | −0.14685 | 0.60000 |
| 24 | Suction-Side | 0.13426 | −0.15000 | 0.60000 |
| 25 | Suction-Side | 0.14706 | −0.15256 | 0.60000 |
| 26 | Suction-Side | 0.15996 | −0.15450 | 0.60000 |
| 27 | Suction-Side | 0.17295 | −0.15582 | 0.60000 |
| 28 | Suction-Side | 0.18599 | −0.15648 | 0.60000 |
| 29 | Suction-Side | 0.19904 | −0.15650 | 0.60000 |
| 30 | Suction-Side | 0.21206 | −0.15584 | 0.60000 |
| 31 | Suction-Side | 0.22504 | −0.15453 | 0.60000 |
| 32 | Suction-Side | 0.23795 | −0.15256 | 0.60000 |
| 33 | Suction-Side | 0.25072 | −0.14994 | 0.60000 |
| 34 | Suction-Side | 0.26336 | −0.14667 | 0.60000 |
| 35 | Suction-Side | 0.27582 | −0.14281 | 0.60000 |
| 36 | Suction-Side | 0.28807 | −0.13833 | 0.60000 |
| 37 | Suction-Side | 0.30011 | −0.13329 | 0.60000 |
| 38 | Suction-Side | 0.31192 | −0.12772 | 0.60000 |
| 39 | Suction-Side | 0.32345 | −0.12164 | 0.60000 |
| 40 | Suction-Side | 0.33473 | −0.11506 | 0.60000 |
| 41 | Suction-Side | 0.34574 | −0.10806 | 0.60000 |
| 42 | Suction-Side | 0.35646 | −0.10061 | 0.60000 |
| 43 | Suction-Side | 0.36691 | −0.09280 | 0.60000 |
| 44 | Suction-Side | 0.37707 | −0.08463 | 0.60000 |
| 45 | Suction-Side | 0.38697 | −0.07612 | 0.60000 |
| 46 | Suction-Side | 0.39660 | −0.06730 | 0.60000 |
| 47 | Suction-Side | 0.40595 | −0.05821 | 0.60000 |
| 48 | Suction-Side | 0.41505 | −0.04885 | 0.60000 |
| 49 | Suction-Side | 0.42390 | −0.03926 | 0.60000 |
| 50 | Suction-Side | 0.43250 | −0.02945 | 0.60000 |
| 51 | Suction-Side | 0.44086 | −0.01943 | 0.60000 |
| 52 | Suction-Side | 0.44901 | −0.00924 | 0.60000 |
| 53 | Suction-Side | 0.45692 | 0.00114 | 0.60000 |
| 54 | Suction-Side | 0.46462 | 0.01168 | 0.60000 |
| 55 | Suction-Side | 0.47213 | 0.02235 | 0.60000 |
| 56 | Suction-Side | 0.47943 | 0.03317 | 0.60000 |
| 57 | Suction-Side | 0.48655 | 0.04411 | 0.60000 |
| 58 | Suction-Side | 0.49349 | 0.05515 | 0.60000 |
| 59 | Suction-Side | 0.50025 | 0.06631 | 0.60000 |
| 60 | Suction-Side | 0.50686 | 0.07757 | 0.60000 |
| 61 | Suction-Side | 0.51330 | 0.08892 | 0.60000 |
| 62 | Suction-Side | 0.51959 | 0.10035 | 0.60000 |
| 63 | Suction-Side | 0.52574 | 0.11187 | 0.60000 |
| 64 | Suction-Side | 0.53175 | 0.12345 | 0.60000 |
| 65 | Suction-Side | 0.53762 | 0.13510 | 0.60000 |
| 66 | Suction-Side | 0.54338 | 0.14682 | 0.60000 |
| 67 | Suction-Side | 0.54900 | 0.15860 | 0.60000 |
| 68 | Suction-Side | 0.55451 | 0.17042 | 0.60000 |
| 69 | Suction-Side | 0.55992 | 0.18229 | 0.60000 |
| 70 | Suction-Side | 0.56522 | 0.19422 | 0.60000 |
| 71 | Suction-Side | 0.57042 | 0.20618 | 0.60000 |
| 72 | Suction-Side | 0.57552 | 0.21820 | 0.60000 |
| 73 | Suction-Side | 0.58055 | 0.23025 | 0.60000 |
| 74 | Suction-Side | 0.58548 | 0.24233 | 0.60000 |
| 75 | Suction-Side | 0.59033 | 0.25444 | 0.60000 |
| 76 | Suction-Side | 0.59511 | 0.26659 | 0.60000 |
| 77 | Suction-Side | 0.59982 | 0.27876 | 0.60000 |
| 78 | Suction-Side | 0.60445 | 0.29096 | 0.60000 |
| 79 | Suction-Side | 0.60903 | 0.30318 | 0.60000 |
| 80 | Suction-Side | 0.61353 | 0.31542 | 0.60000 |
| 81 | Suction-Side | 0.61798 | 0.32769 | 0.60000 |
| 82 | Suction-Side | 0.62240 | 0.33997 | 0.60000 |
| 83 | Suction-Side | 0.62674 | 0.35228 | 0.60000 |
| 84 | Suction-Side | 0.63105 | 0.36459 | 0.60000 |
| 85 | Suction-Side | 0.63531 | 0.37693 | 0.60000 |
| 86 | Suction-Side | 0.63953 | 0.38929 | 0.60000 |
| 87 | Suction-Side | 0.64371 | 0.40165 | 0.60000 |
| 88 | Suction-Side | 0.64786 | 0.41402 | 0.60000 |
| 89 | Suction-Side | 0.65199 | 0.42640 | 0.60000 |
| 90 | Suction-Side | 0.65607 | 0.43879 | 0.60000 |
| 91 | Suction-Side | 0.66014 | 0.45119 | 0.60000 |
| 92 | Suction-Side | 0.66416 | 0.46360 | 0.60000 |
| 93 | Suction-Side | 0.66816 | 0.47603 | 0.60000 |
| 94 | Suction-Side | 0.67131 | 0.53406 | 0.60000 |
| 95 | Suction-Side | 0.67218 | 0.48844 | 0.60000 |
| 96 | Suction-Side | 0.67620 | 0.50085 | 0.60000 |
| 97 | Suction-Side | 0.67647 | 0.53062 | 0.60000 |
| 98 | Suction-Side | 0.67995 | 0.52548 | 0.60000 |
| 99 | Suction-Side | 0.68019 | 0.51329 | 0.60000 |
| 100 | Suction-Side | 0.68124 | 0.51940 | 0.60000 |
| 101 | Pressure-Side | −0.05312 | 0.04355 | 0.60000 |
| 102 | Pressure-Side | −0.04635 | 0.05037 | 0.60000 |
| 103 | Pressure-Side | −0.03855 | 0.05594 | 0.60000 |
| 104 | Pressure-Side | −0.03001 | 0.06032 | 0.60000 |
| 105 | Pressure-Side | −0.02102 | 0.06371 | 0.60000 |
| 106 | Pressure-Side | −0.01177 | 0.06630 | 0.60000 |
| 107 | Pressure-Side | −0.00238 | 0.06831 | 0.60000 |
| 108 | Pressure-Side | 0.00711 | 0.06988 | 0.60000 |
| 109 | Pressure-Side | 0.01664 | 0.07111 | 0.60000 |
| 110 | Pressure-Side | 0.02618 | 0.07212 | 0.60000 |
| 111 | Pressure-Side | 0.03576 | 0.07297 | 0.60000 |
| 112 | Pressure-Side | 0.04533 | 0.07372 | 0.60000 |
| 113 | Pressure-Side | 0.05493 | 0.07439 | 0.60000 |
| 114 | Pressure-Side | 0.06451 | 0.07505 | 0.60000 |
| 115 | Pressure-Side | 0.07409 | 0.07570 | 0.60000 |
| 116 | Pressure-Side | 0.08367 | 0.07637 | 0.60000 |
| 117 | Pressure-Side | 0.09325 | 0.07709 | 0.60000 |
| 118 | Pressure-Side | 0.10283 | 0.07788 | 0.60000 |
| 119 | Pressure-Side | 0.11240 | 0.07873 | 0.60000 |
| 120 | Pressure-Side | 0.12197 | 0.07966 | 0.60000 |
| 121 | Pressure-Side | 0.13151 | 0.08069 | 0.60000 |
| 122 | Pressure-Side | 0.14105 | 0.08184 | 0.60000 |
| 123 | Pressure-Side | 0.15058 | 0.08309 | 0.60000 |
| 124 | Pressure-Side | 0.16010 | 0.08447 | 0.60000 |

TABLE I-continued

Non-Dimensionalized (X Y Z/Span Height)

| N | Location | X | Y | Z |
|---|---|---|---|---|
| 125 | Pressure-Side | 0.16959 | 0.08597 | 0.60000 |
| 126 | Pressure-Side | 0.17905 | 0.08760 | 0.60000 |
| 127 | Pressure-Side | 0.18848 | 0.08938 | 0.60000 |
| 128 | Pressure-Side | 0.19791 | 0.09131 | 0.60000 |
| 129 | Pressure-Side | 0.20729 | 0.09338 | 0.60000 |
| 130 | Pressure-Side | 0.21663 | 0.09562 | 0.60000 |
| 131 | Pressure-Side | 0.22593 | 0.09800 | 0.60000 |
| 132 | Pressure-Side | 0.23521 | 0.10053 | 0.60000 |
| 133 | Pressure-Side | 0.24443 | 0.10323 | 0.60000 |
| 134 | Pressure-Side | 0.25360 | 0.10609 | 0.60000 |
| 135 | Pressure-Side | 0.26272 | 0.10912 | 0.60000 |
| 136 | Pressure-Side | 0.27178 | 0.11231 | 0.60000 |
| 137 | Pressure-Side | 0.28078 | 0.11566 | 0.60000 |
| 138 | Pressure-Side | 0.28972 | 0.11918 | 0.60000 |
| 139 | Pressure-Side | 0.29860 | 0.12287 | 0.60000 |
| 140 | Pressure-Side | 0.30740 | 0.12673 | 0.60000 |
| 141 | Pressure-Side | 0.31613 | 0.13074 | 0.60000 |
| 142 | Pressure-Side | 0.32478 | 0.13493 | 0.60000 |
| 143 | Pressure-Side | 0.33334 | 0.13927 | 0.60000 |
| 144 | Pressure-Side | 0.34183 | 0.14378 | 0.60000 |
| 145 | Pressure-Side | 0.35023 | 0.14844 | 0.60000 |
| 146 | Pressure-Side | 0.35853 | 0.15327 | 0.60000 |
| 147 | Pressure-Side | 0.36675 | 0.15826 | 0.60000 |
| 148 | Pressure-Side | 0.37487 | 0.16339 | 0.60000 |
| 149 | Pressure-Side | 0.38288 | 0.16868 | 0.60000 |
| 150 | Pressure-Side | 0.39080 | 0.17412 | 0.60000 |
| 151 | Pressure-Side | 0.39863 | 0.17971 | 0.60000 |
| 152 | Pressure-Side | 0.40634 | 0.18544 | 0.60000 |
| 153 | Pressure-Side | 0.41394 | 0.19130 | 0.60000 |
| 154 | Pressure-Side | 0.42145 | 0.19731 | 0.60000 |
| 155 | Pressure-Side | 0.42884 | 0.20345 | 0.60000 |
| 156 | Pressure-Side | 0.43612 | 0.20971 | 0.60000 |
| 157 | Pressure-Side | 0.44329 | 0.21610 | 0.60000 |
| 158 | Pressure-Side | 0.45035 | 0.22262 | 0.60000 |
| 159 | Pressure-Side | 0.45730 | 0.22926 | 0.60000 |
| 160 | Pressure-Side | 0.46415 | 0.23601 | 0.60000 |
| 161 | Pressure-Side | 0.47087 | 0.24286 | 0.60000 |
| 162 | Pressure-Side | 0.47749 | 0.24983 | 0.60000 |
| 163 | Pressure-Side | 0.48400 | 0.25690 | 0.60000 |
| 164 | Pressure-Side | 0.49039 | 0.26406 | 0.60000 |
| 165 | Pressure-Side | 0.49668 | 0.27133 | 0.60000 |
| 166 | Pressure-Side | 0.50286 | 0.27868 | 0.60000 |
| 167 | Pressure-Side | 0.50894 | 0.28612 | 0.60000 |
| 168 | Pressure-Side | 0.51491 | 0.29366 | 0.60000 |
| 169 | Pressure-Side | 0.52078 | 0.30126 | 0.60000 |
| 170 | Pressure-Side | 0.52655 | 0.30894 | 0.60000 |
| 171 | Pressure-Side | 0.53221 | 0.31670 | 0.60000 |
| 172 | Pressure-Side | 0.53780 | 0.32453 | 0.60000 |
| 173 | Pressure-Side | 0.54327 | 0.33242 | 0.60000 |
| 174 | Pressure-Side | 0.54865 | 0.34037 | 0.60000 |
| 175 | Pressure-Side | 0.55395 | 0.34838 | 0.60000 |
| 176 | Pressure-Side | 0.55918 | 0.35646 | 0.60000 |
| 177 | Pressure-Side | 0.56431 | 0.36458 | 0.60000 |
| 178 | Pressure-Side | 0.56936 | 0.37275 | 0.60000 |
| 179 | Pressure-Side | 0.57433 | 0.38098 | 0.60000 |
| 180 | Pressure-Side | 0.57923 | 0.38923 | 0.60000 |
| 181 | Pressure-Side | 0.58406 | 0.39754 | 0.60000 |
| 182 | Pressure-Side | 0.58883 | 0.40588 | 0.60000 |
| 183 | Pressure-Side | 0.59352 | 0.41427 | 0.60000 |
| 184 | Pressure-Side | 0.59817 | 0.42268 | 0.60000 |
| 185 | Pressure-Side | 0.60275 | 0.43112 | 0.60000 |
| 186 | Pressure-Side | 0.60729 | 0.43960 | 0.60000 |
| 187 | Pressure-Side | 0.61176 | 0.44809 | 0.60000 |
| 188 | Pressure-Side | 0.61620 | 0.45661 | 0.60000 |
| 189 | Pressure-Side | 0.62060 | 0.46516 | 0.60000 |
| 190 | Pressure-Side | 0.62496 | 0.47371 | 0.60000 |
| 191 | Pressure-Side | 0.62929 | 0.48230 | 0.60000 |
| 192 | Pressure-Side | 0.63358 | 0.49090 | 0.60000 |
| 193 | Pressure-Side | 0.63785 | 0.49950 | 0.60000 |
| 194 | Pressure-Side | 0.64210 | 0.50812 | 0.60000 |
| 195 | Pressure-Side | 0.64634 | 0.51674 | 0.60000 |
| 196 | Pressure-Side | 0.65054 | 0.52538 | 0.60000 |
| 197 | Pressure-Side | 0.65401 | 0.53054 | 0.60000 |
| 198 | Pressure-Side | 0.65914 | 0.53402 | 0.60000 |
| 199 | Pressure-Side | 0.66523 | 0.53526 | 0.60000 |
| 200 | Pressure-Side | 0.67131 | 0.53406 | 0.60000 |
| 1 | Suction-Side | −0.07062 | 0.02675 | 0.69999 |
| 2 | Suction-Side | −0.06922 | 0.01363 | 0.69999 |
| 3 | Suction-Side | −0.06848 | 0.03974 | 0.69999 |
| 4 | Suction-Side | −0.06538 | 0.00101 | 0.69999 |
| 5 | Suction-Side | −0.06213 | 0.05124 | 0.69999 |
| 6 | Suction-Side | −0.05991 | −0.01100 | 0.69999 |
| 7 | Suction-Side | −0.05328 | −0.02243 | 0.69999 |
| 8 | Suction-Side | −0.04577 | −0.03330 | 0.69999 |
| 9 | Suction-Side | −0.03757 | −0.04366 | 0.69999 |
| 10 | Suction-Side | −0.02881 | −0.05354 | 0.69999 |
| 11 | Suction-Side | −0.01956 | −0.06299 | 0.69999 |
| 12 | Suction-Side | −0.00989 | −0.07199 | 0.69999 |
| 13 | Suction-Side | 0.00016 | −0.08057 | 0.69999 |
| 14 | Suction-Side | 0.01055 | −0.08873 | 0.69999 |
| 15 | Suction-Side | 0.02126 | −0.09645 | 0.69999 |
| 16 | Suction-Side | 0.03228 | −0.10376 | 0.69999 |
| 17 | Suction-Side | 0.04356 | −0.11062 | 0.69999 |
| 18 | Suction-Side | 0.05512 | −0.11703 | 0.69999 |
| 19 | Suction-Side | 0.06693 | −0.12297 | 0.69999 |
| 20 | Suction-Side | 0.07895 | −0.12843 | 0.69999 |
| 21 | Suction-Side | 0.09121 | −0.13337 | 0.69999 |
| 22 | Suction-Side | 0.10366 | −0.13780 | 0.69999 |
| 23 | Suction-Side | 0.11630 | −0.14166 | 0.69999 |
| 24 | Suction-Side | 0.12908 | −0.14497 | 0.69999 |
| 25 | Suction-Side | 0.14201 | −0.14768 | 0.69999 |
| 26 | Suction-Side | 0.15506 | −0.14978 | 0.69999 |
| 27 | Suction-Side | 0.16819 | −0.15125 | 0.69999 |
| 28 | Suction-Side | 0.18137 | −0.15207 | 0.69999 |
| 29 | Suction-Side | 0.19458 | −0.15222 | 0.69999 |
| 30 | Suction-Side | 0.20779 | −0.15171 | 0.69999 |
| 31 | Suction-Side | 0.22095 | −0.15053 | 0.69999 |
| 32 | Suction-Side | 0.23403 | −0.14867 | 0.69999 |
| 33 | Suction-Side | 0.24700 | −0.14614 | 0.69999 |
| 34 | Suction-Side | 0.25982 | −0.14298 | 0.69999 |
| 35 | Suction-Side | 0.27249 | −0.13918 | 0.69999 |
| 36 | Suction-Side | 0.28494 | −0.13477 | 0.69999 |
| 37 | Suction-Side | 0.29716 | −0.12977 | 0.69999 |
| 38 | Suction-Side | 0.30915 | −0.12422 | 0.69999 |
| 39 | Suction-Side | 0.32089 | −0.11813 | 0.69999 |
| 40 | Suction-Side | 0.33234 | −0.11156 | 0.69999 |
| 41 | Suction-Side | 0.34353 | −0.10452 | 0.69999 |
| 42 | Suction-Side | 0.35443 | −0.09705 | 0.69999 |
| 43 | Suction-Side | 0.36503 | −0.08919 | 0.69999 |
| 44 | Suction-Side | 0.37537 | −0.08095 | 0.69999 |
| 45 | Suction-Side | 0.38541 | −0.07236 | 0.69999 |
| 46 | Suction-Side | 0.39517 | −0.06346 | 0.69999 |
| 47 | Suction-Side | 0.40468 | −0.05426 | 0.69999 |
| 48 | Suction-Side | 0.41390 | −0.04481 | 0.69999 |
| 49 | Suction-Side | 0.42286 | −0.03510 | 0.69999 |
| 50 | Suction-Side | 0.43157 | −0.02517 | 0.69999 |
| 51 | Suction-Side | 0.44004 | −0.01503 | 0.69999 |
| 52 | Suction-Side | 0.44828 | −0.00469 | 0.69999 |
| 53 | Suction-Side | 0.45629 | 0.00582 | 0.69999 |
| 54 | Suction-Side | 0.46408 | 0.01649 | 0.69999 |
| 55 | Suction-Side | 0.47165 | 0.02731 | 0.69999 |
| 56 | Suction-Side | 0.47903 | 0.03827 | 0.69999 |
| 57 | Suction-Side | 0.48622 | 0.04937 | 0.69999 |
| 58 | Suction-Side | 0.49322 | 0.06057 | 0.69999 |
| 59 | Suction-Side | 0.50004 | 0.07190 | 0.69999 |
| 60 | Suction-Side | 0.50670 | 0.08331 | 0.69999 |
| 61 | Suction-Side | 0.51318 | 0.09482 | 0.69999 |
| 62 | Suction-Side | 0.51951 | 0.10641 | 0.69999 |
| 63 | Suction-Side | 0.52570 | 0.11809 | 0.69999 |
| 64 | Suction-Side | 0.53174 | 0.12984 | 0.69999 |
| 65 | Suction-Side | 0.53765 | 0.14166 | 0.69999 |
| 66 | Suction-Side | 0.54342 | 0.15355 | 0.69999 |
| 67 | Suction-Side | 0.54908 | 0.16549 | 0.69999 |
| 68 | Suction-Side | 0.55461 | 0.17749 | 0.69999 |
| 69 | Suction-Side | 0.56003 | 0.18953 | 0.69999 |
| 70 | Suction-Side | 0.56534 | 0.20164 | 0.69999 |
| 71 | Suction-Side | 0.57057 | 0.21377 | 0.69999 |
| 72 | Suction-Side | 0.57568 | 0.22596 | 0.69999 |
| 73 | Suction-Side | 0.58071 | 0.23817 | 0.69999 |
| 74 | Suction-Side | 0.58565 | 0.25044 | 0.69999 |
| 75 | Suction-Side | 0.59050 | 0.26272 | 0.69999 |
| 76 | Suction-Side | 0.59528 | 0.27504 | 0.69999 |

TABLE I-continued

Non-Dimensionalized (X Y Z/Span Height)

| N | Location | X | Y | Z |
|---|---|---|---|---|
| 77 | Suction-Side | 0.60000 | 0.28738 | 0.69999 |
| 78 | Suction-Side | 0.60464 | 0.29976 | 0.69999 |
| 79 | Suction-Side | 0.60921 | 0.31215 | 0.69999 |
| 80 | Suction-Side | 0.61373 | 0.32457 | 0.69999 |
| 81 | Suction-Side | 0.61818 | 0.33701 | 0.69999 |
| 82 | Suction-Side | 0.62259 | 0.34947 | 0.69999 |
| 83 | Suction-Side | 0.62695 | 0.36194 | 0.69999 |
| 84 | Suction-Side | 0.63126 | 0.37443 | 0.69999 |
| 85 | Suction-Side | 0.63553 | 0.38693 | 0.69999 |
| 86 | Suction-Side | 0.63975 | 0.39945 | 0.69999 |
| 87 | Suction-Side | 0.64395 | 0.41198 | 0.69999 |
| 88 | Suction-Side | 0.64812 | 0.42453 | 0.69999 |
| 89 | Suction-Side | 0.65226 | 0.43707 | 0.69999 |
| 90 | Suction-Side | 0.65638 | 0.44963 | 0.69999 |
| 91 | Suction-Side | 0.66046 | 0.46219 | 0.69999 |
| 92 | Suction-Side | 0.66452 | 0.47478 | 0.69999 |
| 93 | Suction-Side | 0.66856 | 0.48735 | 0.69999 |
| 94 | Suction-Side | 0.67188 | 0.54587 | 0.69999 |
| 95 | Suction-Side | 0.67260 | 0.49993 | 0.69999 |
| 96 | Suction-Side | 0.67667 | 0.51251 | 0.69999 |
| 97 | Suction-Side | 0.67705 | 0.54243 | 0.69999 |
| 98 | Suction-Side | 0.68051 | 0.53729 | 0.69999 |
| 99 | Suction-Side | 0.68070 | 0.52509 | 0.69999 |
| 100 | Suction-Side | 0.68177 | 0.53120 | 0.69999 |
| 101 | Pressure-Side | −0.06213 | 0.05124 | 0.69999 |
| 102 | Pressure-Side | −0.05542 | 0.05825 | 0.69999 |
| 103 | Pressure-Side | −0.04764 | 0.06405 | 0.69999 |
| 104 | Pressure-Side | −0.03910 | 0.06867 | 0.69999 |
| 105 | Pressure-Side | −0.03007 | 0.07224 | 0.69999 |
| 106 | Pressure-Side | −0.02076 | 0.07501 | 0.69999 |
| 107 | Pressure-Side | −0.01128 | 0.07713 | 0.69999 |
| 108 | Pressure-Side | −0.00171 | 0.07881 | 0.69999 |
| 109 | Pressure-Side | 0.00791 | 0.08014 | 0.69999 |
| 110 | Pressure-Side | 0.01757 | 0.08121 | 0.69999 |
| 111 | Pressure-Side | 0.02724 | 0.08212 | 0.69999 |
| 112 | Pressure-Side | 0.03692 | 0.08291 | 0.69999 |
| 113 | Pressure-Side | 0.04661 | 0.08363 | 0.69999 |
| 114 | Pressure-Side | 0.05631 | 0.08432 | 0.69999 |
| 115 | Pressure-Side | 0.06600 | 0.08500 | 0.69999 |
| 116 | Pressure-Side | 0.07568 | 0.08569 | 0.69999 |
| 117 | Pressure-Side | 0.08537 | 0.08643 | 0.69999 |
| 118 | Pressure-Side | 0.09505 | 0.08723 | 0.69999 |
| 119 | Pressure-Side | 0.10472 | 0.08810 | 0.69999 |
| 120 | Pressure-Side | 0.11440 | 0.08905 | 0.69999 |
| 121 | Pressure-Side | 0.12406 | 0.09010 | 0.69999 |
| 122 | Pressure-Side | 0.13370 | 0.09126 | 0.69999 |
| 123 | Pressure-Side | 0.14333 | 0.09252 | 0.69999 |
| 124 | Pressure-Side | 0.15295 | 0.09390 | 0.69999 |
| 125 | Pressure-Side | 0.16254 | 0.09543 | 0.69999 |
| 126 | Pressure-Side | 0.17211 | 0.09708 | 0.69999 |
| 127 | Pressure-Side | 0.18167 | 0.09886 | 0.69999 |
| 128 | Pressure-Side | 0.19118 | 0.10080 | 0.69999 |
| 129 | Pressure-Side | 0.20067 | 0.10289 | 0.69999 |
| 130 | Pressure-Side | 0.21013 | 0.10511 | 0.69999 |
| 131 | Pressure-Side | 0.21954 | 0.10750 | 0.69999 |
| 132 | Pressure-Side | 0.22892 | 0.11004 | 0.69999 |
| 133 | Pressure-Side | 0.23825 | 0.11275 | 0.69999 |
| 134 | Pressure-Side | 0.24753 | 0.11560 | 0.69999 |
| 135 | Pressure-Side | 0.25676 | 0.11863 | 0.69999 |
| 136 | Pressure-Side | 0.26595 | 0.12182 | 0.69999 |
| 137 | Pressure-Side | 0.27506 | 0.12519 | 0.69999 |
| 138 | Pressure-Side | 0.28411 | 0.12871 | 0.69999 |
| 139 | Pressure-Side | 0.29310 | 0.13239 | 0.69999 |
| 140 | Pressure-Side | 0.30201 | 0.13624 | 0.69999 |
| 141 | Pressure-Side | 0.31087 | 0.14026 | 0.69999 |
| 142 | Pressure-Side | 0.31964 | 0.14443 | 0.69999 |
| 143 | Pressure-Side | 0.32833 | 0.14877 | 0.69999 |
| 144 | Pressure-Side | 0.33694 | 0.15327 | 0.69999 |
| 145 | Pressure-Side | 0.34546 | 0.15793 | 0.69999 |
| 146 | Pressure-Side | 0.35390 | 0.16276 | 0.69999 |
| 147 | Pressure-Side | 0.36224 | 0.16774 | 0.69999 |
| 148 | Pressure-Side | 0.37048 | 0.17287 | 0.69999 |
| 149 | Pressure-Side | 0.37864 | 0.17814 | 0.69999 |
| 150 | Pressure-Side | 0.38669 | 0.18358 | 0.69999 |
| 151 | Pressure-Side | 0.39464 | 0.18916 | 0.69999 |
| 152 | Pressure-Side | 0.40250 | 0.19488 | 0.69999 |
| 153 | Pressure-Side | 0.41024 | 0.20075 | 0.69999 |
| 154 | Pressure-Side | 0.41788 | 0.20674 | 0.69999 |
| 155 | Pressure-Side | 0.42541 | 0.21288 | 0.69999 |
| 156 | Pressure-Side | 0.43284 | 0.21916 | 0.69999 |
| 157 | Pressure-Side | 0.44014 | 0.22555 | 0.69999 |
| 158 | Pressure-Side | 0.44735 | 0.23207 | 0.69999 |
| 159 | Pressure-Side | 0.45443 | 0.23872 | 0.69999 |
| 160 | Pressure-Side | 0.46141 | 0.24547 | 0.69999 |
| 161 | Pressure-Side | 0.46828 | 0.25234 | 0.69999 |
| 162 | Pressure-Side | 0.47503 | 0.25933 | 0.69999 |
| 163 | Pressure-Side | 0.48167 | 0.26641 | 0.69999 |
| 164 | Pressure-Side | 0.48821 | 0.27360 | 0.69999 |
| 165 | Pressure-Side | 0.49463 | 0.28088 | 0.69999 |
| 166 | Pressure-Side | 0.50096 | 0.28827 | 0.69999 |
| 167 | Pressure-Side | 0.50716 | 0.29574 | 0.69999 |
| 168 | Pressure-Side | 0.51326 | 0.30330 | 0.69999 |
| 169 | Pressure-Side | 0.51926 | 0.31095 | 0.69999 |
| 170 | Pressure-Side | 0.52514 | 0.31867 | 0.69999 |
| 171 | Pressure-Side | 0.53094 | 0.32647 | 0.69999 |
| 172 | Pressure-Side | 0.53664 | 0.33435 | 0.69999 |
| 173 | Pressure-Side | 0.54223 | 0.34228 | 0.69999 |
| 174 | Pressure-Side | 0.54772 | 0.35030 | 0.69999 |
| 175 | Pressure-Side | 0.55313 | 0.35836 | 0.69999 |
| 176 | Pressure-Side | 0.55845 | 0.36649 | 0.69999 |
| 177 | Pressure-Side | 0.56368 | 0.37468 | 0.69999 |
| 178 | Pressure-Side | 0.56884 | 0.38292 | 0.69999 |
| 179 | Pressure-Side | 0.57390 | 0.39120 | 0.69999 |
| 180 | Pressure-Side | 0.57889 | 0.39955 | 0.69999 |
| 181 | Pressure-Side | 0.58380 | 0.40792 | 0.69999 |
| 182 | Pressure-Side | 0.58865 | 0.41634 | 0.69999 |
| 183 | Pressure-Side | 0.59344 | 0.42480 | 0.69999 |
| 184 | Pressure-Side | 0.59814 | 0.43329 | 0.69999 |
| 185 | Pressure-Side | 0.60281 | 0.44182 | 0.69999 |
| 186 | Pressure-Side | 0.60740 | 0.45038 | 0.69999 |
| 187 | Pressure-Side | 0.61195 | 0.45896 | 0.69999 |
| 188 | Pressure-Side | 0.61644 | 0.46757 | 0.69999 |
| 189 | Pressure-Side | 0.62089 | 0.47621 | 0.69999 |
| 190 | Pressure-Side | 0.62531 | 0.48486 | 0.69999 |
| 191 | Pressure-Side | 0.62968 | 0.49354 | 0.69999 |
| 192 | Pressure-Side | 0.63402 | 0.50223 | 0.69999 |
| 193 | Pressure-Side | 0.63834 | 0.51094 | 0.69999 |
| 194 | Pressure-Side | 0.64264 | 0.51964 | 0.69999 |
| 195 | Pressure-Side | 0.64691 | 0.52836 | 0.69999 |
| 196 | Pressure-Side | 0.65117 | 0.53710 | 0.69999 |
| 197 | Pressure-Side | 0.65460 | 0.54227 | 0.69999 |
| 198 | Pressure-Side | 0.65973 | 0.54578 | 0.69999 |
| 199 | Pressure-Side | 0.66580 | 0.54706 | 0.69999 |
| 200 | Pressure-Side | 0.67188 | 0.54587 | 0.69999 |
| 1 | Suction-Side | −0.07905 | 0.03402 | 0.79999 |
| 2 | Suction-Side | −0.07733 | 0.02077 | 0.79999 |
| 3 | Suction-Side | −0.07720 | 0.04723 | 0.79999 |
| 4 | Suction-Side | −0.07318 | 0.00805 | 0.79999 |
| 5 | Suction-Side | −0.07103 | 0.05903 | 0.79999 |
| 6 | Suction-Side | −0.06744 | −0.00404 | 0.79999 |
| 7 | Suction-Side | −0.06057 | −0.01552 | 0.79999 |
| 8 | Suction-Side | −0.05287 | −0.02647 | 0.79999 |
| 9 | Suction-Side | −0.04449 | −0.03692 | 0.79999 |
| 10 | Suction-Side | −0.03559 | −0.04691 | 0.79999 |
| 11 | Suction-Side | −0.02621 | −0.05645 | 0.79999 |
| 12 | Suction-Side | −0.01641 | −0.06560 | 0.79999 |
| 13 | Suction-Side | −0.00626 | −0.07431 | 0.79999 |
| 14 | Suction-Side | 0.00424 | −0.08263 | 0.79999 |
| 15 | Suction-Side | 0.01504 | −0.09053 | 0.79999 |
| 16 | Suction-Side | 0.02614 | −0.09802 | 0.79999 |
| 17 | Suction-Side | 0.03753 | −0.10508 | 0.79999 |
| 18 | Suction-Side | 0.04916 | −0.11170 | 0.79999 |
| 19 | Suction-Side | 0.06105 | −0.11786 | 0.79999 |
| 20 | Suction-Side | 0.07317 | −0.12355 | 0.79999 |
| 21 | Suction-Side | 0.08550 | −0.12875 | 0.79999 |
| 22 | Suction-Side | 0.09805 | −0.13343 | 0.79999 |
| 23 | Suction-Side | 0.11078 | −0.13756 | 0.79999 |
| 24 | Suction-Side | 0.12368 | −0.14113 | 0.79999 |
| 25 | Suction-Side | 0.13673 | −0.14412 | 0.79999 |
| 26 | Suction-Side | 0.14992 | −0.14650 | 0.79999 |
| 27 | Suction-Side | 0.16319 | −0.14824 | 0.79999 |
| 28 | Suction-Side | 0.17654 | −0.14933 | 0.79999 |

TABLE I-continued

Non-Dimensionalized (X Y Z/Span Height)

| N | Location | X | Y | Z |
|---|---|---|---|---|
| 29 | Suction-Side | 0.18992 | −0.14976 | 0.79999 |
| 30 | Suction-Side | 0.20330 | −0.14951 | 0.79999 |
| 31 | Suction-Side | 0.21666 | −0.14858 | 0.79999 |
| 32 | Suction-Side | 0.22995 | −0.14695 | 0.79999 |
| 33 | Suction-Side | 0.24314 | −0.14466 | 0.79999 |
| 34 | Suction-Side | 0.25619 | −0.14168 | 0.79999 |
| 35 | Suction-Side | 0.26908 | −0.13805 | 0.79999 |
| 36 | Suction-Side | 0.28177 | −0.13378 | 0.79999 |
| 37 | Suction-Side | 0.29424 | −0.12892 | 0.79999 |
| 38 | Suction-Side | 0.30647 | −0.12346 | 0.79999 |
| 39 | Suction-Side | 0.31844 | −0.11746 | 0.79999 |
| 40 | Suction-Side | 0.33014 | −0.11094 | 0.79999 |
| 41 | Suction-Side | 0.34154 | −0.10392 | 0.79999 |
| 42 | Suction-Side | 0.35265 | −0.09645 | 0.79999 |
| 43 | Suction-Side | 0.36348 | −0.08857 | 0.79999 |
| 44 | Suction-Side | 0.37399 | −0.08029 | 0.79999 |
| 45 | Suction-Side | 0.38422 | −0.07166 | 0.79999 |
| 46 | Suction-Side | 0.39416 | −0.06269 | 0.79999 |
| 47 | Suction-Side | 0.40382 | −0.05342 | 0.79999 |
| 48 | Suction-Side | 0.41321 | −0.04385 | 0.79999 |
| 49 | Suction-Side | 0.42231 | −0.03405 | 0.79999 |
| 50 | Suction-Side | 0.43116 | −0.02400 | 0.79999 |
| 51 | Suction-Side | 0.43976 | −0.01373 | 0.79999 |
| 52 | Suction-Side | 0.44810 | −0.00326 | 0.79999 |
| 53 | Suction-Side | 0.45621 | 0.00739 | 0.79999 |
| 54 | Suction-Side | 0.46409 | 0.01822 | 0.79999 |
| 55 | Suction-Side | 0.47176 | 0.02920 | 0.79999 |
| 56 | Suction-Side | 0.47922 | 0.04032 | 0.79999 |
| 57 | Suction-Side | 0.48648 | 0.05156 | 0.79999 |
| 58 | Suction-Side | 0.49354 | 0.06294 | 0.79999 |
| 59 | Suction-Side | 0.50043 | 0.07442 | 0.79999 |
| 60 | Suction-Side | 0.50714 | 0.08602 | 0.79999 |
| 61 | Suction-Side | 0.51366 | 0.09770 | 0.79999 |
| 62 | Suction-Side | 0.52004 | 0.10948 | 0.79999 |
| 63 | Suction-Side | 0.52626 | 0.12133 | 0.79999 |
| 64 | Suction-Side | 0.53233 | 0.13327 | 0.79999 |
| 65 | Suction-Side | 0.53827 | 0.14527 | 0.79999 |
| 66 | Suction-Side | 0.54407 | 0.15733 | 0.79999 |
| 67 | Suction-Side | 0.54974 | 0.16947 | 0.79999 |
| 68 | Suction-Side | 0.55530 | 0.18165 | 0.79999 |
| 69 | Suction-Side | 0.56073 | 0.19389 | 0.79999 |
| 70 | Suction-Side | 0.56606 | 0.20617 | 0.79999 |
| 71 | Suction-Side | 0.57128 | 0.21850 | 0.79999 |
| 72 | Suction-Side | 0.57641 | 0.23086 | 0.79999 |
| 73 | Suction-Side | 0.58145 | 0.24328 | 0.79999 |
| 74 | Suction-Side | 0.58639 | 0.25571 | 0.79999 |
| 75 | Suction-Side | 0.59126 | 0.26819 | 0.79999 |
| 76 | Suction-Side | 0.59604 | 0.28070 | 0.79999 |
| 77 | Suction-Side | 0.60075 | 0.29323 | 0.79999 |
| 78 | Suction-Side | 0.60540 | 0.30579 | 0.79999 |
| 79 | Suction-Side | 0.60997 | 0.31837 | 0.79999 |
| 80 | Suction-Side | 0.61449 | 0.33099 | 0.79999 |
| 81 | Suction-Side | 0.61895 | 0.34361 | 0.79999 |
| 82 | Suction-Side | 0.62337 | 0.35625 | 0.79999 |
| 83 | Suction-Side | 0.62772 | 0.36891 | 0.79999 |
| 84 | Suction-Side | 0.63204 | 0.38158 | 0.79999 |
| 85 | Suction-Side | 0.63634 | 0.39427 | 0.79999 |
| 86 | Suction-Side | 0.64058 | 0.40696 | 0.79999 |
| 87 | Suction-Side | 0.64479 | 0.41968 | 0.79999 |
| 88 | Suction-Side | 0.64897 | 0.43240 | 0.79999 |
| 89 | Suction-Side | 0.65313 | 0.44513 | 0.79999 |
| 90 | Suction-Side | 0.65728 | 0.45786 | 0.79999 |
| 91 | Suction-Side | 0.66140 | 0.47059 | 0.79999 |
| 92 | Suction-Side | 0.66551 | 0.48334 | 0.79999 |
| 93 | Suction-Side | 0.66960 | 0.49609 | 0.79999 |
| 94 | Suction-Side | 0.67316 | 0.55518 | 0.79999 |
| 95 | Suction-Side | 0.67369 | 0.50884 | 0.79999 |
| 96 | Suction-Side | 0.67777 | 0.52160 | 0.79999 |
| 97 | Suction-Side | 0.67832 | 0.55172 | 0.79999 |
| 98 | Suction-Side | 0.68175 | 0.54654 | 0.79999 |
| 99 | Suction-Side | 0.68187 | 0.53434 | 0.79999 |
| 100 | Suction-Side | 0.68297 | 0.54045 | 0.79999 |
| 101 | Pressure-Side | −0.07103 | 0.05903 | 0.79999 |
| 102 | Pressure-Side | −0.06441 | 0.06627 | 0.79999 |
| 103 | Pressure-Side | −0.05668 | 0.07231 | 0.79999 |
| 104 | Pressure-Side | −0.04813 | 0.07713 | 0.79999 |
| 105 | Pressure-Side | −0.03907 | 0.08088 | 0.79999 |
| 106 | Pressure-Side | −0.02969 | 0.08376 | 0.79999 |
| 107 | Pressure-Side | −0.02013 | 0.08600 | 0.79999 |
| 108 | Pressure-Side | −0.01047 | 0.08772 | 0.79999 |
| 109 | Pressure-Side | −0.00074 | 0.08909 | 0.79999 |
| 110 | Pressure-Side | 0.00901 | 0.09020 | 0.79999 |
| 111 | Pressure-Side | 0.01878 | 0.09111 | 0.79999 |
| 112 | Pressure-Side | 0.02856 | 0.09190 | 0.79999 |
| 113 | Pressure-Side | 0.03835 | 0.09261 | 0.79999 |
| 114 | Pressure-Side | 0.04815 | 0.09328 | 0.79999 |
| 115 | Pressure-Side | 0.05794 | 0.09394 | 0.79999 |
| 116 | Pressure-Side | 0.06774 | 0.09462 | 0.79999 |
| 117 | Pressure-Side | 0.07753 | 0.09534 | 0.79999 |
| 118 | Pressure-Side | 0.08731 | 0.09611 | 0.79999 |
| 119 | Pressure-Side | 0.09711 | 0.09695 | 0.79999 |
| 120 | Pressure-Side | 0.10687 | 0.09786 | 0.79999 |
| 121 | Pressure-Side | 0.11664 | 0.09887 | 0.79999 |
| 122 | Pressure-Side | 0.12640 | 0.10000 | 0.79999 |
| 123 | Pressure-Side | 0.13614 | 0.10123 | 0.79999 |
| 124 | Pressure-Side | 0.14585 | 0.10258 | 0.79999 |
| 125 | Pressure-Side | 0.15555 | 0.10407 | 0.79999 |
| 126 | Pressure-Side | 0.16524 | 0.10568 | 0.79999 |
| 127 | Pressure-Side | 0.17490 | 0.10743 | 0.79999 |
| 128 | Pressure-Side | 0.18454 | 0.10933 | 0.79999 |
| 129 | Pressure-Side | 0.19413 | 0.11137 | 0.79999 |
| 130 | Pressure-Side | 0.20370 | 0.11356 | 0.79999 |
| 131 | Pressure-Side | 0.21324 | 0.11591 | 0.79999 |
| 132 | Pressure-Side | 0.22273 | 0.11841 | 0.79999 |
| 133 | Pressure-Side | 0.23218 | 0.12107 | 0.79999 |
| 134 | Pressure-Side | 0.24159 | 0.12390 | 0.79999 |
| 135 | Pressure-Side | 0.25093 | 0.12687 | 0.79999 |
| 136 | Pressure-Side | 0.26023 | 0.13002 | 0.79999 |
| 137 | Pressure-Side | 0.26948 | 0.13333 | 0.79999 |
| 138 | Pressure-Side | 0.27867 | 0.13681 | 0.79999 |
| 139 | Pressure-Side | 0.28778 | 0.14046 | 0.79999 |
| 140 | Pressure-Side | 0.29683 | 0.14426 | 0.79999 |
| 141 | Pressure-Side | 0.30580 | 0.14823 | 0.79999 |
| 142 | Pressure-Side | 0.31471 | 0.15236 | 0.79999 |
| 143 | Pressure-Side | 0.32353 | 0.15666 | 0.79999 |
| 144 | Pressure-Side | 0.33229 | 0.16111 | 0.79999 |
| 145 | Pressure-Side | 0.34094 | 0.16573 | 0.79999 |
| 146 | Pressure-Side | 0.34952 | 0.17052 | 0.79999 |
| 147 | Pressure-Side | 0.35800 | 0.17545 | 0.79999 |
| 148 | Pressure-Side | 0.36640 | 0.18054 | 0.79999 |
| 149 | Pressure-Side | 0.37469 | 0.18579 | 0.79999 |
| 150 | Pressure-Side | 0.38291 | 0.19118 | 0.79999 |
| 151 | Pressure-Side | 0.39100 | 0.19672 | 0.79999 |
| 152 | Pressure-Side | 0.39900 | 0.20241 | 0.79999 |
| 153 | Pressure-Side | 0.40691 | 0.20824 | 0.79999 |
| 154 | Pressure-Side | 0.41470 | 0.21421 | 0.79999 |
| 155 | Pressure-Side | 0.42238 | 0.22032 | 0.79999 |
| 156 | Pressure-Side | 0.42995 | 0.22657 | 0.79999 |
| 157 | Pressure-Side | 0.43742 | 0.23294 | 0.79999 |
| 158 | Pressure-Side | 0.44477 | 0.23945 | 0.79999 |
| 159 | Pressure-Side | 0.45201 | 0.24607 | 0.79999 |
| 160 | Pressure-Side | 0.45915 | 0.25282 | 0.79999 |
| 161 | Pressure-Side | 0.46617 | 0.25967 | 0.79999 |
| 162 | Pressure-Side | 0.47308 | 0.26665 | 0.79999 |
| 163 | Pressure-Side | 0.47987 | 0.27373 | 0.79999 |
| 164 | Pressure-Side | 0.48655 | 0.28092 | 0.79999 |
| 165 | Pressure-Side | 0.49313 | 0.28822 | 0.79999 |
| 166 | Pressure-Side | 0.49959 | 0.29561 | 0.79999 |
| 167 | Pressure-Side | 0.50594 | 0.30310 | 0.79999 |
| 168 | Pressure-Side | 0.51219 | 0.31068 | 0.79999 |
| 169 | Pressure-Side | 0.51831 | 0.31835 | 0.79999 |
| 170 | Pressure-Side | 0.52435 | 0.32610 | 0.79999 |
| 171 | Pressure-Side | 0.53027 | 0.33392 | 0.79999 |
| 172 | Pressure-Side | 0.53609 | 0.34182 | 0.79999 |
| 173 | Pressure-Side | 0.54181 | 0.34980 | 0.79999 |
| 174 | Pressure-Side | 0.54743 | 0.35784 | 0.79999 |
| 175 | Pressure-Side | 0.55296 | 0.36596 | 0.79999 |
| 176 | Pressure-Side | 0.55839 | 0.37414 | 0.79999 |
| 177 | Pressure-Side | 0.56374 | 0.38238 | 0.79999 |
| 178 | Pressure-Side | 0.56899 | 0.39067 | 0.79999 |
| 179 | Pressure-Side | 0.57415 | 0.39901 | 0.79999 |
| 180 | Pressure-Side | 0.57924 | 0.40741 | 0.79999 |

TABLE I-continued

Non-Dimensionalized (X Y Z/Span Height)

| N | Location | X | Y | Z |
|---|---|---|---|---|
| 181 | Pressure-Side | 0.58425 | 0.41585 | 0.79999 |
| 182 | Pressure-Side | 0.58919 | 0.42434 | 0.79999 |
| 183 | Pressure-Side | 0.59405 | 0.43288 | 0.79999 |
| 184 | Pressure-Side | 0.59885 | 0.44143 | 0.79999 |
| 185 | Pressure-Side | 0.60358 | 0.45005 | 0.79999 |
| 186 | Pressure-Side | 0.60824 | 0.45868 | 0.79999 |
| 187 | Pressure-Side | 0.61285 | 0.46735 | 0.79999 |
| 188 | Pressure-Side | 0.61741 | 0.47604 | 0.79999 |
| 189 | Pressure-Side | 0.62192 | 0.48476 | 0.79999 |
| 190 | Pressure-Side | 0.62638 | 0.49350 | 0.79999 |
| 191 | Pressure-Side | 0.63081 | 0.50227 | 0.79999 |
| 192 | Pressure-Side | 0.63521 | 0.51104 | 0.79999 |
| 193 | Pressure-Side | 0.63957 | 0.51984 | 0.79999 |
| 194 | Pressure-Side | 0.64390 | 0.52865 | 0.79999 |
| 195 | Pressure-Side | 0.64822 | 0.53746 | 0.79999 |
| 196 | Pressure-Side | 0.65251 | 0.54630 | 0.79999 |
| 197 | Pressure-Side | 0.65591 | 0.55150 | 0.79999 |
| 198 | Pressure-Side | 0.66100 | 0.55504 | 0.79999 |
| 199 | Pressure-Side | 0.66707 | 0.55635 | 0.79999 |
| 200 | Pressure-Side | 0.67316 | 0.55518 | 0.79999 |
| 1 | Suction-Side | −0.08728 | 0.04130 | 0.90000 |
| 2 | Suction-Side | −0.08581 | 0.05475 | 0.90000 |
| 3 | Suction-Side | −0.08513 | 0.02792 | 0.90000 |
| 4 | Suction-Side | −0.08057 | 0.01514 | 0.90000 |
| 5 | Suction-Side | −0.07988 | 0.06690 | 0.90000 |
| 6 | Suction-Side | −0.07445 | 0.00302 | 0.90000 |
| 7 | Suction-Side | −0.06724 | −0.00849 | 0.90000 |
| 8 | Suction-Side | −0.05924 | −0.01947 | 0.90000 |
| 9 | Suction-Side | −0.05062 | −0.02997 | 0.90000 |
| 10 | Suction-Side | −0.04149 | −0.04003 | 0.90000 |
| 11 | Suction-Side | −0.03192 | −0.04968 | 0.90000 |
| 12 | Suction-Side | −0.02198 | −0.05894 | 0.90000 |
| 13 | Suction-Side | −0.01169 | −0.06782 | 0.90000 |
| 14 | Suction-Side | −0.00110 | −0.07632 | 0.90000 |
| 15 | Suction-Side | 0.00978 | −0.08444 | 0.90000 |
| 16 | Suction-Side | 0.02094 | −0.09219 | 0.90000 |
| 17 | Suction-Side | 0.03236 | −0.09955 | 0.90000 |
| 18 | Suction-Side | 0.04404 | −0.10650 | 0.90000 |
| 19 | Suction-Side | 0.05595 | −0.11304 | 0.90000 |
| 20 | Suction-Side | 0.06809 | −0.11913 | 0.90000 |
| 21 | Suction-Side | 0.08045 | −0.12476 | 0.90000 |
| 22 | Suction-Side | 0.09303 | −0.12989 | 0.90000 |
| 23 | Suction-Side | 0.10581 | −0.13452 | 0.90000 |
| 24 | Suction-Side | 0.11877 | −0.13860 | 0.90000 |
| 25 | Suction-Side | 0.13188 | −0.14210 | 0.90000 |
| 26 | Suction-Side | 0.14516 | −0.14500 | 0.90000 |
| 27 | Suction-Side | 0.15856 | −0.14726 | 0.90000 |
| 28 | Suction-Side | 0.17204 | −0.14887 | 0.90000 |
| 29 | Suction-Side | 0.18560 | −0.14980 | 0.90000 |
| 30 | Suction-Side | 0.19918 | −0.15002 | 0.90000 |
| 31 | Suction-Side | 0.21275 | −0.14952 | 0.90000 |
| 32 | Suction-Side | 0.22628 | −0.14831 | 0.90000 |
| 33 | Suction-Side | 0.23973 | −0.14636 | 0.90000 |
| 34 | Suction-Side | 0.25304 | −0.14370 | 0.90000 |
| 35 | Suction-Side | 0.26621 | −0.14034 | 0.90000 |
| 36 | Suction-Side | 0.27917 | −0.13628 | 0.90000 |
| 37 | Suction-Side | 0.29191 | −0.13158 | 0.90000 |
| 38 | Suction-Side | 0.30441 | −0.12625 | 0.90000 |
| 39 | Suction-Side | 0.31663 | −0.12032 | 0.90000 |
| 40 | Suction-Side | 0.32858 | −0.11384 | 0.90000 |
| 41 | Suction-Side | 0.34021 | −0.10683 | 0.90000 |
| 42 | Suction-Side | 0.35154 | −0.09934 | 0.90000 |
| 43 | Suction-Side | 0.36257 | −0.09140 | 0.90000 |
| 44 | Suction-Side | 0.37329 | −0.08306 | 0.90000 |
| 45 | Suction-Side | 0.38370 | −0.07433 | 0.90000 |
| 46 | Suction-Side | 0.39380 | −0.06525 | 0.90000 |
| 47 | Suction-Side | 0.40363 | −0.05586 | 0.90000 |
| 48 | Suction-Side | 0.41314 | −0.04617 | 0.90000 |
| 49 | Suction-Side | 0.42239 | −0.03620 | 0.90000 |
| 50 | Suction-Side | 0.43136 | −0.02601 | 0.90000 |
| 51 | Suction-Side | 0.44006 | −0.01558 | 0.90000 |
| 52 | Suction-Side | 0.44852 | −0.00494 | 0.90000 |
| 53 | Suction-Side | 0.45673 | 0.00589 | 0.90000 |
| 54 | Suction-Side | 0.46470 | 0.01688 | 0.90000 |
| 55 | Suction-Side | 0.47245 | 0.02804 | 0.90000 |
| 56 | Suction-Side | 0.47999 | 0.03934 | 0.90000 |
| 57 | Suction-Side | 0.48732 | 0.05078 | 0.90000 |
| 58 | Suction-Side | 0.49446 | 0.06234 | 0.90000 |
| 59 | Suction-Side | 0.50140 | 0.07402 | 0.90000 |
| 60 | Suction-Side | 0.50816 | 0.08581 | 0.90000 |
| 61 | Suction-Side | 0.51475 | 0.09769 | 0.90000 |
| 62 | Suction-Side | 0.52117 | 0.10966 | 0.90000 |
| 63 | Suction-Side | 0.52743 | 0.12172 | 0.90000 |
| 64 | Suction-Side | 0.53354 | 0.13385 | 0.90000 |
| 65 | Suction-Side | 0.53952 | 0.14605 | 0.90000 |
| 66 | Suction-Side | 0.54534 | 0.15832 | 0.90000 |
| 67 | Suction-Side | 0.55104 | 0.17065 | 0.90000 |
| 68 | Suction-Side | 0.55663 | 0.18305 | 0.90000 |
| 69 | Suction-Side | 0.56209 | 0.19549 | 0.90000 |
| 70 | Suction-Side | 0.56743 | 0.20797 | 0.90000 |
| 71 | Suction-Side | 0.57268 | 0.22051 | 0.90000 |
| 72 | Suction-Side | 0.57782 | 0.23308 | 0.90000 |
| 73 | Suction-Side | 0.58286 | 0.24569 | 0.90000 |
| 74 | Suction-Side | 0.58783 | 0.25835 | 0.90000 |
| 75 | Suction-Side | 0.59269 | 0.27102 | 0.90000 |
| 76 | Suction-Side | 0.59749 | 0.28374 | 0.90000 |
| 77 | Suction-Side | 0.60221 | 0.29647 | 0.90000 |
| 78 | Suction-Side | 0.60686 | 0.30924 | 0.90000 |
| 79 | Suction-Side | 0.61144 | 0.32203 | 0.90000 |
| 80 | Suction-Side | 0.61598 | 0.33484 | 0.90000 |
| 81 | Suction-Side | 0.62046 | 0.34766 | 0.90000 |
| 82 | Suction-Side | 0.62487 | 0.36051 | 0.90000 |
| 83 | Suction-Side | 0.62925 | 0.37338 | 0.90000 |
| 84 | Suction-Side | 0.63358 | 0.38626 | 0.90000 |
| 85 | Suction-Side | 0.63789 | 0.39913 | 0.90000 |
| 86 | Suction-Side | 0.64214 | 0.41204 | 0.90000 |
| 87 | Suction-Side | 0.64638 | 0.42494 | 0.90000 |
| 88 | Suction-Side | 0.65060 | 0.43786 | 0.90000 |
| 89 | Suction-Side | 0.65479 | 0.45079 | 0.90000 |
| 90 | Suction-Side | 0.65895 | 0.46372 | 0.90000 |
| 91 | Suction-Side | 0.66311 | 0.47665 | 0.90000 |
| 92 | Suction-Side | 0.66726 | 0.48958 | 0.90000 |
| 93 | Suction-Side | 0.67142 | 0.50252 | 0.90000 |
| 94 | Suction-Side | 0.67525 | 0.56219 | 0.90000 |
| 95 | Suction-Side | 0.67555 | 0.51547 | 0.90000 |
| 96 | Suction-Side | 0.67966 | 0.52841 | 0.90000 |
| 97 | Suction-Side | 0.68040 | 0.55874 | 0.90000 |
| 98 | Suction-Side | 0.68381 | 0.55356 | 0.90000 |
| 99 | Suction-Side | 0.68385 | 0.54134 | 0.90000 |
| 100 | Suction-Side | 0.68498 | 0.54746 | 0.90000 |
| 101 | Pressure-Side | −0.07988 | 0.06690 | 0.90000 |
| 102 | Pressure-Side | −0.07341 | 0.07439 | 0.90000 |
| 103 | Pressure-Side | −0.06578 | 0.08073 | 0.90000 |
| 104 | Pressure-Side | −0.05728 | 0.08584 | 0.90000 |
| 105 | Pressure-Side | −0.04820 | 0.08982 | 0.90000 |
| 106 | Pressure-Side | −0.03878 | 0.09291 | 0.90000 |
| 107 | Pressure-Side | −0.02914 | 0.09527 | 0.90000 |
| 108 | Pressure-Side | −0.01939 | 0.09711 | 0.90000 |
| 109 | Pressure-Side | −0.00958 | 0.09853 | 0.90000 |
| 110 | Pressure-Side | 0.00028 | 0.09964 | 0.90000 |
| 111 | Pressure-Side | 0.01017 | 0.10055 | 0.90000 |
| 112 | Pressure-Side | 0.02005 | 0.10131 | 0.90000 |
| 113 | Pressure-Side | 0.02995 | 0.10197 | 0.90000 |
| 114 | Pressure-Side | 0.03985 | 0.10257 | 0.90000 |
| 115 | Pressure-Side | 0.04976 | 0.10314 | 0.90000 |
| 116 | Pressure-Side | 0.05967 | 0.10372 | 0.90000 |
| 117 | Pressure-Side | 0.06957 | 0.10432 | 0.90000 |
| 118 | Pressure-Side | 0.07947 | 0.10499 | 0.90000 |
| 119 | Pressure-Side | 0.08936 | 0.10570 | 0.90000 |
| 120 | Pressure-Side | 0.09926 | 0.10650 | 0.90000 |
| 121 | Pressure-Side | 0.10913 | 0.10738 | 0.90000 |
| 122 | Pressure-Side | 0.11901 | 0.10837 | 0.90000 |
| 123 | Pressure-Side | 0.12887 | 0.10946 | 0.90000 |
| 124 | Pressure-Side | 0.13871 | 0.11069 | 0.90000 |
| 125 | Pressure-Side | 0.14854 | 0.11203 | 0.90000 |
| 126 | Pressure-Side | 0.15836 | 0.11352 | 0.90000 |
| 127 | Pressure-Side | 0.16814 | 0.11513 | 0.90000 |
| 128 | Pressure-Side | 0.17791 | 0.11689 | 0.90000 |
| 129 | Pressure-Side | 0.18763 | 0.11881 | 0.90000 |
| 130 | Pressure-Side | 0.19735 | 0.12087 | 0.90000 |
| 131 | Pressure-Side | 0.20701 | 0.12310 | 0.90000 |
| 132 | Pressure-Side | 0.21664 | 0.12548 | 0.90000 |

TABLE I-continued

| Non-Dimensionalized (X Y Z/Span Height) | | | | |
|---|---|---|---|---|
| N | Location | X | Y | Z |
| 133 | Pressure-Side | 0.22624 | 0.12802 | 0.90000 |
| 134 | Pressure-Side | 0.23578 | 0.13073 | 0.90000 |
| 135 | Pressure-Side | 0.24527 | 0.13360 | 0.90000 |
| 136 | Pressure-Side | 0.25472 | 0.13664 | 0.90000 |
| 137 | Pressure-Side | 0.26410 | 0.13984 | 0.90000 |
| 138 | Pressure-Side | 0.27343 | 0.14322 | 0.90000 |
| 139 | Pressure-Side | 0.28271 | 0.14677 | 0.90000 |
| 140 | Pressure-Side | 0.29190 | 0.15049 | 0.90000 |
| 141 | Pressure-Side | 0.30103 | 0.15437 | 0.90000 |
| 142 | Pressure-Side | 0.31009 | 0.15841 | 0.90000 |
| 143 | Pressure-Side | 0.31906 | 0.16264 | 0.90000 |
| 144 | Pressure-Side | 0.32797 | 0.16701 | 0.90000 |
| 145 | Pressure-Side | 0.33679 | 0.17155 | 0.90000 |
| 146 | Pressure-Side | 0.34552 | 0.17627 | 0.90000 |
| 147 | Pressure-Side | 0.35416 | 0.18113 | 0.90000 |
| 148 | Pressure-Side | 0.36272 | 0.18616 | 0.90000 |
| 149 | Pressure-Side | 0.37117 | 0.19134 | 0.90000 |
| 150 | Pressure-Side | 0.37954 | 0.19668 | 0.90000 |
| 151 | Pressure-Side | 0.38780 | 0.20217 | 0.90000 |
| 152 | Pressure-Side | 0.39597 | 0.20782 | 0.90000 |
| 153 | Pressure-Side | 0.40402 | 0.21360 | 0.90000 |
| 154 | Pressure-Side | 0.41197 | 0.21954 | 0.90000 |
| 155 | Pressure-Side | 0.41983 | 0.22561 | 0.90000 |
| 156 | Pressure-Side | 0.42756 | 0.23182 | 0.90000 |
| 157 | Pressure-Side | 0.43519 | 0.23816 | 0.90000 |
| 158 | Pressure-Side | 0.44271 | 0.24463 | 0.90000 |
| 159 | Pressure-Side | 0.45011 | 0.25124 | 0.90000 |
| 160 | Pressure-Side | 0.45741 | 0.25796 | 0.90000 |
| 161 | Pressure-Side | 0.46460 | 0.26480 | 0.90000 |
| 162 | Pressure-Side | 0.47165 | 0.27177 | 0.90000 |
| 163 | Pressure-Side | 0.47862 | 0.27884 | 0.90000 |
| 164 | Pressure-Side | 0.48546 | 0.28603 | 0.90000 |
| 165 | Pressure-Side | 0.49219 | 0.29331 | 0.90000 |
| 166 | Pressure-Side | 0.49880 | 0.30071 | 0.90000 |
| 167 | Pressure-Side | 0.50530 | 0.30819 | 0.90000 |
| 168 | Pressure-Side | 0.51171 | 0.31578 | 0.90000 |
| 169 | Pressure-Side | 0.51798 | 0.32346 | 0.90000 |
| 170 | Pressure-Side | 0.52416 | 0.33122 | 0.90000 |
| 171 | Pressure-Side | 0.53023 | 0.33908 | 0.90000 |
| 172 | Pressure-Side | 0.53619 | 0.34701 | 0.90000 |
| 173 | Pressure-Side | 0.54205 | 0.35501 | 0.90000 |
| 174 | Pressure-Side | 0.54780 | 0.36309 | 0.90000 |
| 175 | Pressure-Side | 0.55345 | 0.37125 | 0.90000 |
| 176 | Pressure-Side | 0.55900 | 0.37947 | 0.90000 |
| 177 | Pressure-Side | 0.56448 | 0.38776 | 0.90000 |
| 178 | Pressure-Side | 0.56985 | 0.39609 | 0.90000 |
| 179 | Pressure-Side | 0.57512 | 0.40449 | 0.90000 |
| 180 | Pressure-Side | 0.58032 | 0.41294 | 0.90000 |
| 181 | Pressure-Side | 0.58542 | 0.42145 | 0.90000 |
| 182 | Pressure-Side | 0.59046 | 0.43000 | 0.90000 |
| 183 | Pressure-Side | 0.59542 | 0.43860 | 0.90000 |
| 184 | Pressure-Side | 0.60030 | 0.44724 | 0.90000 |
| 185 | Pressure-Side | 0.60511 | 0.45592 | 0.90000 |
| 186 | Pressure-Side | 0.60985 | 0.46462 | 0.90000 |
| 187 | Pressure-Side | 0.61453 | 0.47338 | 0.90000 |
| 188 | Pressure-Side | 0.61915 | 0.48215 | 0.90000 |
| 189 | Pressure-Side | 0.62372 | 0.49096 | 0.90000 |
| 190 | Pressure-Side | 0.62824 | 0.49979 | 0.90000 |
| 191 | Pressure-Side | 0.63272 | 0.50864 | 0.90000 |
| 192 | Pressure-Side | 0.63716 | 0.51752 | 0.90000 |
| 193 | Pressure-Side | 0.64157 | 0.52641 | 0.90000 |
| 194 | Pressure-Side | 0.64594 | 0.53531 | 0.90000 |
| 195 | Pressure-Side | 0.65032 | 0.54421 | 0.90000 |
| 196 | Pressure-Side | 0.65465 | 0.55314 | 0.90000 |
| 197 | Pressure-Side | 0.65804 | 0.55835 | 0.90000 |
| 198 | Pressure-Side | 0.66309 | 0.56196 | 0.90000 |
| 199 | Pressure-Side | 0.66915 | 0.56332 | 0.90000 |
| 200 | Pressure-Side | 0.67525 | 0.56219 | 0.90000 |
| 1 | Suction-Side | −0.09592 | 0.04941 | 1.00000 |
| 2 | Suction-Side | −0.09459 | 0.03571 | 1.00000 |
| 3 | Suction-Side | −0.09373 | 0.06298 | 1.00000 |
| 4 | Suction-Side | −0.09069 | 0.02249 | 1.00000 |
| 5 | Suction-Side | −0.08776 | 0.07538 | 1.00000 |
| 6 | Suction-Side | −0.08504 | 0.00990 | 1.00000 |
| 7 | Suction-Side | −0.07815 | −0.00205 | 1.00000 |
| 8 | Suction-Side | −0.07037 | −0.01344 | 1.00000 |
| 9 | Suction-Side | −0.06186 | −0.02431 | 1.00000 |
| 10 | Suction-Side | −0.05280 | −0.03470 | 1.00000 |
| 11 | Suction-Side | −0.04323 | −0.04464 | 1.00000 |
| 12 | Suction-Side | −0.03325 | −0.05417 | 1.00000 |
| 13 | Suction-Side | −0.02290 | −0.06328 | 1.00000 |
| 14 | Suction-Side | −0.01220 | −0.07200 | 1.00000 |
| 15 | Suction-Side | −0.00120 | −0.08032 | 1.00000 |
| 16 | Suction-Side | 0.01010 | −0.08824 | 1.00000 |
| 17 | Suction-Side | 0.02166 | −0.09576 | 1.00000 |
| 18 | Suction-Side | 0.03349 | −0.10287 | 1.00000 |
| 19 | Suction-Side | 0.04556 | −0.10957 | 1.00000 |
| 20 | Suction-Side | 0.05785 | −0.11583 | 1.00000 |
| 21 | Suction-Side | 0.07037 | −0.12165 | 1.00000 |
| 22 | Suction-Side | 0.08307 | −0.12701 | 1.00000 |
| 23 | Suction-Side | 0.09599 | −0.13187 | 1.00000 |
| 24 | Suction-Side | 0.10907 | −0.13624 | 1.00000 |
| 25 | Suction-Side | 0.12232 | −0.14010 | 1.00000 |
| 26 | Suction-Side | 0.13571 | −0.14341 | 1.00000 |
| 27 | Suction-Side | 0.14924 | −0.14613 | 1.00000 |
| 28 | Suction-Side | 0.16287 | −0.14827 | 1.00000 |
| 29 | Suction-Side | 0.17658 | −0.14978 | 1.00000 |
| 30 | Suction-Side | 0.19036 | −0.15066 | 1.00000 |
| 31 | Suction-Side | 0.20415 | −0.15087 | 1.00000 |
| 32 | Suction-Side | 0.21793 | −0.15040 | 1.00000 |
| 33 | Suction-Side | 0.23167 | −0.14921 | 1.00000 |
| 34 | Suction-Side | 0.24535 | −0.14731 | 1.00000 |
| 35 | Suction-Side | 0.25889 | −0.14471 | 1.00000 |
| 36 | Suction-Side | 0.27229 | −0.14139 | 1.00000 |
| 37 | Suction-Side | 0.28548 | −0.13737 | 1.00000 |
| 38 | Suction-Side | 0.29845 | −0.13267 | 1.00000 |
| 39 | Suction-Side | 0.31116 | −0.12730 | 1.00000 |
| 40 | Suction-Side | 0.32358 | −0.12131 | 1.00000 |
| 41 | Suction-Side | 0.33572 | −0.11473 | 1.00000 |
| 42 | Suction-Side | 0.34752 | −0.10758 | 1.00000 |
| 43 | Suction-Side | 0.35899 | −0.09992 | 1.00000 |
| 44 | Suction-Side | 0.37014 | −0.09178 | 1.00000 |
| 45 | Suction-Side | 0.38094 | −0.08319 | 1.00000 |
| 46 | Suction-Side | 0.39140 | −0.07421 | 1.00000 |
| 47 | Suction-Side | 0.40155 | −0.06487 | 1.00000 |
| 48 | Suction-Side | 0.41137 | −0.05518 | 1.00000 |
| 49 | Suction-Side | 0.42089 | −0.04518 | 1.00000 |
| 50 | Suction-Side | 0.43010 | −0.03491 | 1.00000 |
| 51 | Suction-Side | 0.43901 | −0.02439 | 1.00000 |
| 52 | Suction-Side | 0.44767 | −0.01363 | 1.00000 |
| 53 | Suction-Side | 0.45604 | −0.00267 | 1.00000 |
| 54 | Suction-Side | 0.46416 | 0.00849 | 1.00000 |
| 55 | Suction-Side | 0.47204 | 0.01981 | 1.00000 |
| 56 | Suction-Side | 0.47969 | 0.03130 | 1.00000 |
| 57 | Suction-Side | 0.48711 | 0.04292 | 1.00000 |
| 58 | Suction-Side | 0.49433 | 0.05469 | 1.00000 |
| 59 | Suction-Side | 0.50134 | 0.06658 | 1.00000 |
| 60 | Suction-Side | 0.50816 | 0.07857 | 1.00000 |
| 61 | Suction-Side | 0.51479 | 0.09067 | 1.00000 |
| 62 | Suction-Side | 0.52125 | 0.10286 | 1.00000 |
| 63 | Suction-Side | 0.52755 | 0.11514 | 1.00000 |
| 64 | Suction-Side | 0.53369 | 0.12750 | 1.00000 |
| 65 | Suction-Side | 0.53967 | 0.13992 | 1.00000 |
| 66 | Suction-Side | 0.54552 | 0.15243 | 1.00000 |
| 67 | Suction-Side | 0.55122 | 0.16499 | 1.00000 |
| 68 | Suction-Side | 0.55680 | 0.17761 | 1.00000 |
| 69 | Suction-Side | 0.56226 | 0.19028 | 1.00000 |
| 70 | Suction-Side | 0.56760 | 0.20300 | 1.00000 |
| 71 | Suction-Side | 0.57284 | 0.21577 | 1.00000 |
| 72 | Suction-Side | 0.57798 | 0.22858 | 1.00000 |
| 73 | Suction-Side | 0.58302 | 0.24142 | 1.00000 |
| 74 | Suction-Side | 0.58796 | 0.25429 | 1.00000 |
| 75 | Suction-Side | 0.59283 | 0.26721 | 1.00000 |
| 76 | Suction-Side | 0.59761 | 0.28015 | 1.00000 |
| 77 | Suction-Side | 0.60233 | 0.29312 | 1.00000 |
| 78 | Suction-Side | 0.60697 | 0.30611 | 1.00000 |
| 79 | Suction-Side | 0.61155 | 0.31913 | 1.00000 |
| 80 | Suction-Side | 0.61608 | 0.33216 | 1.00000 |
| 81 | Suction-Side | 0.62055 | 0.34522 | 1.00000 |
| 82 | Suction-Side | 0.62497 | 0.35828 | 1.00000 |
| 83 | Suction-Side | 0.62936 | 0.37137 | 1.00000 |
| 84 | Suction-Side | 0.63370 | 0.38446 | 1.00000 |

TABLE I-continued

Non-Dimensionalized (X Y Z/Span Height)

| N | Location | X | Y | Z |
|---|---|---|---|---|
| 85 | Suction-Side | 0.63801 | 0.39757 | 1.00000 |
| 86 | Suction-Side | 0.64230 | 0.41068 | 1.00000 |
| 87 | Suction-Side | 0.64657 | 0.42381 | 1.00000 |
| 88 | Suction-Side | 0.65081 | 0.43694 | 1.00000 |
| 89 | Suction-Side | 0.65503 | 0.45007 | 1.00000 |
| 90 | Suction-Side | 0.65925 | 0.46321 | 1.00000 |
| 91 | Suction-Side | 0.66346 | 0.47636 | 1.00000 |
| 92 | Suction-Side | 0.66767 | 0.48949 | 1.00000 |
| 93 | Suction-Side | 0.67187 | 0.50263 | 1.00000 |
| 94 | Suction-Side | 0.67604 | 0.51579 | 1.00000 |
| 95 | Suction-Side | 0.67604 | 0.56294 | 1.00000 |
| 96 | Suction-Side | 0.68023 | 0.52893 | 1.00000 |
| 97 | Suction-Side | 0.68119 | 0.55948 | 1.00000 |
| 98 | Suction-Side | 0.68450 | 0.54206 | 1.00000 |
| 99 | Suction-Side | 0.68456 | 0.55427 | 1.00000 |
| 100 | Suction-Side | 0.68568 | 0.54817 | 1.00000 |
| 101 | Pressure-Side | −0.08776 | 0.07538 | 1.00000 |
| 102 | Pressure-Side | −0.08134 | 0.08295 | 1.00000 |
| 103 | Pressure-Side | −0.07349 | 0.08905 | 1.00000 |
| 104 | Pressure-Side | −0.06469 | 0.09369 | 1.00000 |
| 105 | Pressure-Side | −0.05538 | 0.09720 | 1.00000 |
| 106 | Pressure-Side | −0.04578 | 0.09984 | 1.00000 |
| 107 | Pressure-Side | −0.03604 | 0.10188 | 1.00000 |
| 108 | Pressure-Side | −0.02622 | 0.10348 | 1.00000 |
| 109 | Pressure-Side | −0.01635 | 0.10475 | 1.00000 |
| 110 | Pressure-Side | −0.00645 | 0.10578 | 1.00000 |
| 111 | Pressure-Side | 0.00348 | 0.10666 | 1.00000 |
| 112 | Pressure-Side | 0.01341 | 0.10742 | 1.00000 |
| 113 | Pressure-Side | 0.02334 | 0.10811 | 1.00000 |
| 114 | Pressure-Side | 0.03328 | 0.10877 | 1.00000 |
| 115 | Pressure-Side | 0.04320 | 0.10941 | 1.00000 |
| 116 | Pressure-Side | 0.05314 | 0.11006 | 1.00000 |
| 117 | Pressure-Side | 0.06307 | 0.11075 | 1.00000 |
| 118 | Pressure-Side | 0.07300 | 0.11147 | 1.00000 |
| 119 | Pressure-Side | 0.08293 | 0.11227 | 1.00000 |
| 120 | Pressure-Side | 0.09285 | 0.11312 | 1.00000 |
| 121 | Pressure-Side | 0.10277 | 0.11406 | 1.00000 |
| 122 | Pressure-Side | 0.11267 | 0.11509 | 1.00000 |
| 123 | Pressure-Side | 0.12255 | 0.11620 | 1.00000 |
| 124 | Pressure-Side | 0.13244 | 0.11743 | 1.00000 |
| 125 | Pressure-Side | 0.14230 | 0.11877 | 1.00000 |
| 126 | Pressure-Side | 0.15215 | 0.12022 | 1.00000 |
| 127 | Pressure-Side | 0.16198 | 0.12180 | 1.00000 |
| 128 | Pressure-Side | 0.17179 | 0.12350 | 1.00000 |
| 129 | Pressure-Side | 0.18157 | 0.12535 | 1.00000 |
| 130 | Pressure-Side | 0.19134 | 0.12731 | 1.00000 |
| 131 | Pressure-Side | 0.20107 | 0.12944 | 1.00000 |
| 132 | Pressure-Side | 0.21076 | 0.13170 | 1.00000 |
| 133 | Pressure-Side | 0.22042 | 0.13412 | 1.00000 |
| 134 | Pressure-Side | 0.23004 | 0.13668 | 1.00000 |
| 135 | Pressure-Side | 0.23962 | 0.13941 | 1.00000 |
| 136 | Pressure-Side | 0.24915 | 0.14228 | 1.00000 |
| 137 | Pressure-Side | 0.25862 | 0.14531 | 1.00000 |
| 138 | Pressure-Side | 0.26806 | 0.14850 | 1.00000 |
| 139 | Pressure-Side | 0.27743 | 0.15186 | 1.00000 |
| 140 | Pressure-Side | 0.28675 | 0.15538 | 1.00000 |
| 141 | Pressure-Side | 0.29599 | 0.15906 | 1.00000 |
| 142 | Pressure-Side | 0.30518 | 0.16291 | 1.00000 |
| 143 | Pressure-Side | 0.31428 | 0.16694 | 1.00000 |
| 144 | Pressure-Side | 0.32332 | 0.17111 | 1.00000 |
| 145 | Pressure-Side | 0.33227 | 0.17547 | 1.00000 |
| 146 | Pressure-Side | 0.34115 | 0.17998 | 1.00000 |
| 147 | Pressure-Side | 0.34994 | 0.18466 | 1.00000 |
| 148 | Pressure-Side | 0.35864 | 0.18948 | 1.00000 |
| 149 | Pressure-Side | 0.36727 | 0.19448 | 1.00000 |
| 150 | Pressure-Side | 0.37578 | 0.19963 | 1.00000 |
| 151 | Pressure-Side | 0.38420 | 0.20495 | 1.00000 |
| 152 | Pressure-Side | 0.39252 | 0.21041 | 1.00000 |
| 153 | Pressure-Side | 0.40074 | 0.21603 | 1.00000 |
| 154 | Pressure-Side | 0.40885 | 0.22180 | 1.00000 |
| 155 | Pressure-Side | 0.41686 | 0.22771 | 1.00000 |
| 156 | Pressure-Side | 0.42476 | 0.23377 | 1.00000 |
| 157 | Pressure-Side | 0.43254 | 0.23998 | 1.00000 |
| 158 | Pressure-Side | 0.44022 | 0.24631 | 1.00000 |
| 159 | Pressure-Side | 0.44780 | 0.25278 | 1.00000 |
| 160 | Pressure-Side | 0.45525 | 0.25938 | 1.00000 |
| 161 | Pressure-Side | 0.46259 | 0.26611 | 1.00000 |
| 162 | Pressure-Side | 0.46982 | 0.27295 | 1.00000 |
| 163 | Pressure-Side | 0.47693 | 0.27993 | 1.00000 |
| 164 | Pressure-Side | 0.48392 | 0.28701 | 1.00000 |
| 165 | Pressure-Side | 0.49080 | 0.29421 | 1.00000 |
| 166 | Pressure-Side | 0.49757 | 0.30151 | 1.00000 |
| 167 | Pressure-Side | 0.50421 | 0.30893 | 1.00000 |
| 168 | Pressure-Side | 0.51074 | 0.31643 | 1.00000 |
| 169 | Pressure-Side | 0.51717 | 0.32405 | 1.00000 |
| 170 | Pressure-Side | 0.52347 | 0.33176 | 1.00000 |
| 171 | Pressure-Side | 0.52968 | 0.33954 | 1.00000 |
| 172 | Pressure-Side | 0.53576 | 0.34742 | 1.00000 |
| 173 | Pressure-Side | 0.54173 | 0.35538 | 1.00000 |
| 174 | Pressure-Side | 0.54760 | 0.36342 | 1.00000 |
| 175 | Pressure-Side | 0.55337 | 0.37154 | 1.00000 |
| 176 | Pressure-Side | 0.55903 | 0.37973 | 1.00000 |
| 177 | Pressure-Side | 0.56459 | 0.38800 | 1.00000 |
| 178 | Pressure-Side | 0.57005 | 0.39632 | 1.00000 |
| 179 | Pressure-Side | 0.57542 | 0.40470 | 1.00000 |
| 180 | Pressure-Side | 0.58069 | 0.41314 | 1.00000 |
| 181 | Pressure-Side | 0.58588 | 0.42165 | 1.00000 |
| 182 | Pressure-Side | 0.59098 | 0.43019 | 1.00000 |
| 183 | Pressure-Side | 0.59600 | 0.43879 | 1.00000 |
| 184 | Pressure-Side | 0.60093 | 0.44744 | 1.00000 |
| 185 | Pressure-Side | 0.60578 | 0.45613 | 1.00000 |
| 186 | Pressure-Side | 0.61057 | 0.46486 | 1.00000 |
| 187 | Pressure-Side | 0.61529 | 0.47363 | 1.00000 |
| 188 | Pressure-Side | 0.61994 | 0.48243 | 1.00000 |
| 189 | Pressure-Side | 0.62453 | 0.49127 | 1.00000 |
| 190 | Pressure-Side | 0.62908 | 0.50013 | 1.00000 |
| 191 | Pressure-Side | 0.63357 | 0.50901 | 1.00000 |
| 192 | Pressure-Side | 0.63802 | 0.51791 | 1.00000 |
| 193 | Pressure-Side | 0.64245 | 0.52684 | 1.00000 |
| 194 | Pressure-Side | 0.64683 | 0.53578 | 1.00000 |
| 195 | Pressure-Side | 0.65121 | 0.54472 | 1.00000 |
| 196 | Pressure-Side | 0.65555 | 0.55368 | 1.00000 |
| 197 | Pressure-Side | 0.65889 | 0.55893 | 1.00000 |
| 198 | Pressure-Side | 0.66388 | 0.56259 | 1.00000 |
| 199 | Pressure-Side | 0.66993 | 0.56400 | 1.00000 |
| 200 | Pressure-Side | 0.67604 | 0.56294 | 1.00000 |

According to various embodiments, and as a result of endwall contour 218, a region of a passage trough 250 between two airfoils 202 proximate endwall 212 can be affected. For example, a bottom edge of a passage trough 250 between a pair of nozzles 200 can vary radially, whereas an endwall without a contour would leave a bottom edge of such a throat as at least a straight line, if not a substantially constant radial distance.

Figure 5:
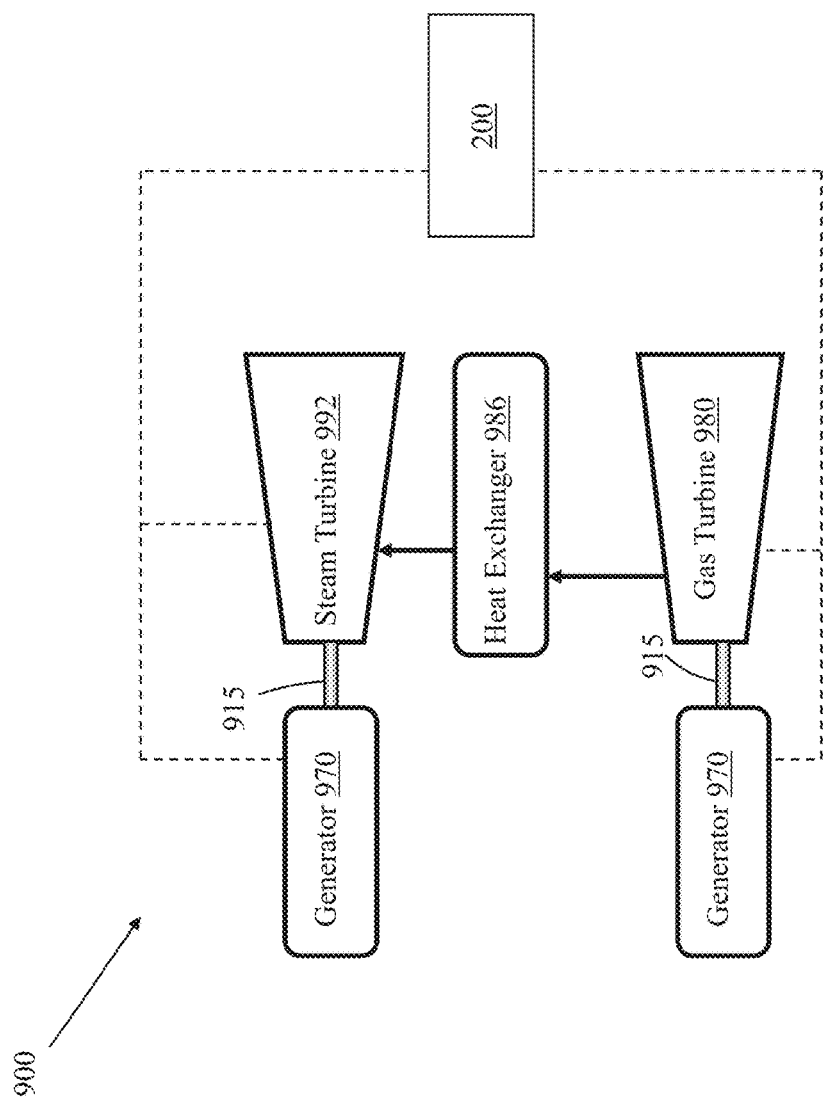
FIG. 5 shows a schematic block diagram illustrating portions of a multi-shaft combined cycle power plant system according to embodiments of the invention.
Figure 6:
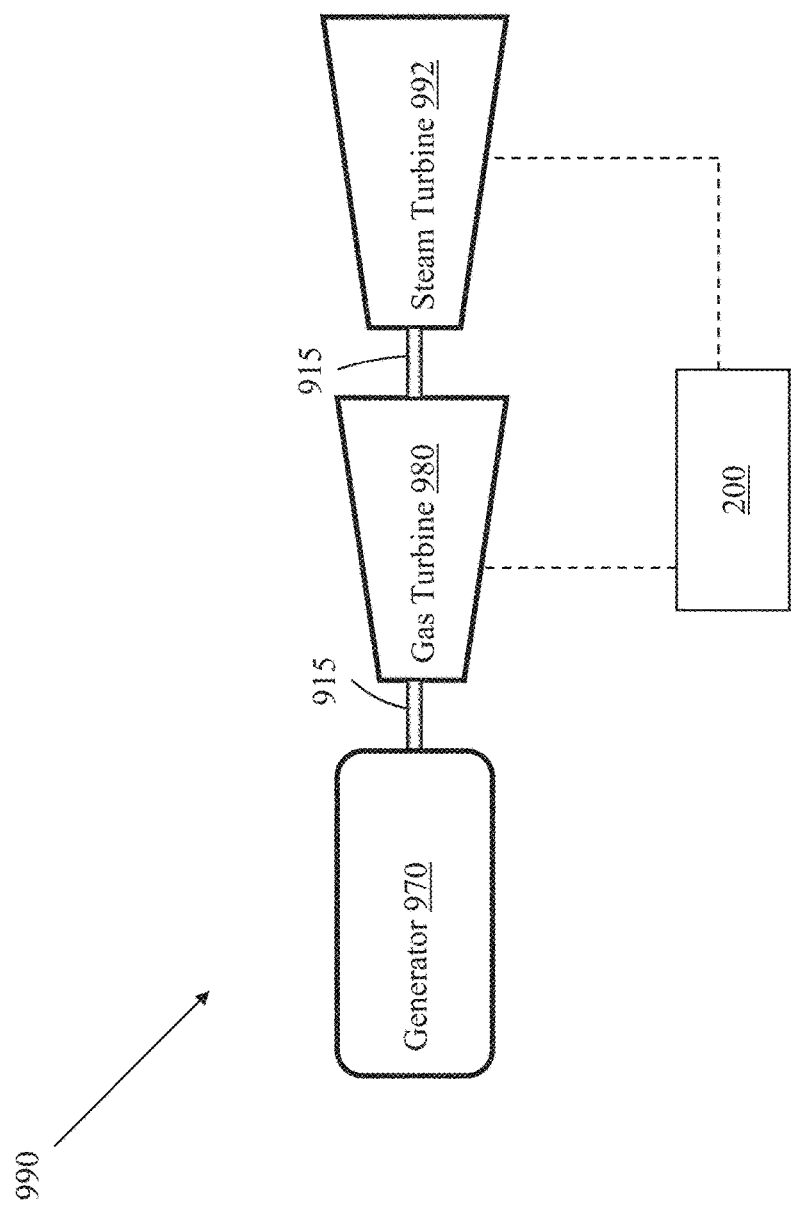
FIG. 6 shows a schematic block diagram illustrating portions of a single-shaft combined cycle power plant system according to embodiments of the invention.

Turning to FIG. 5, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 5 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include one or more nozzles 200 as shown and described with reference to FIG. 2 and/or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 6, a single shaft combined cycle power plant 990 may include a single generator 970 coupled to both gas turbine 980 and steam turbine 992 via a single shaft 915. Steam turbine 992 and/or gas turbine 980 may include one or more nozzles 200 shown and described with reference to FIG. 2 and/or other embodiments described herein.

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from the increased efficiency of the apparatus and devices described herein.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A turbine nozzle comprising:
    an airfoil having: a suction side; a pressure side opposing the suction side; a leading edge spanning between the pressure side and the suction side; and a trailing edge opposing the leading edge and spanning between the pressure side and the suction side; and
    at least one endwall connected with the airfoil along the suction side, pressure side, trailing edge and the leading edge, the at least one endwall including a non-axisymmetric contour proximate a junction between the endwall and the leading edge of the airfoil,
    wherein the non-axisymmetric contour includes three distinct leading edge features, the three distinct leading edge features including a leading edge pressure side feature, a leading edge suction side feature and a mid-passage feature,
    wherein the leading edge pressure side feature of the non-axisymmetric contour includes a thickened area having an apex at approximately 5% axial chord upstream of the leading edge, and
    wherein the non-axisymmetric contour further includes a passage trough on the pressure side of the airfoil, wherein the passage trough includes a depression having an apex at approximately 60% of a chord length of the pressure side of the airfoil, wherein the depression spans approximately 40% to 60% pitch as measured from the pressure side of the airfoil, wherein the at least one endwall directs flow of a working fluid through the passage trough.

2. The turbine nozzle of claim 1, further comprising a fillet connecting a surface of the endwall to a surface of the airfoil.

3. The turbine nozzle of claim 1, wherein the turbine nozzle includes a second stage nozzle.

4. The turbine nozzle of claim 1, wherein the at least one endwall includes an inner endwall or an outer endwall.

5. The turbine nozzle of claim 1, wherein the thickened area extends across at least approximately 10 percent of an axial length of the endwall, and has a pitch of approximately zero percent to approximately 10 percent from the suction side.

6. The turbine nozzle of claim 1, wherein the thickened area extends across approximately 20 percent to approximately 30 percent of an axial length of the endwall.

7. The turbine nozzle of claim 1, wherein at least one of the suction side or the pressure side of the airfoil includes a nominal profile substantially in accordance with Cartesian coordinate values of X, Y and Z set forth in TABLE I, wherein the coordinate values are non-dimensional values of from 0 to 1 convertible to distances by multiplying the values by a trailing edge height expressed in units of distance, and wherein X and Y values connected by smooth continuing arcs define airfoil profile sections at each distance Z along the airfoil, the profile sections at the Z distances being joined smoothly with one another to form the airfoil profile, wherein the Cartesian coordinate values have an origin at a root of the leading edge of the airfoil.

8. A static nozzle section comprising:
a set of static nozzles, the set of static nozzles including at least one nozzle having:
an airfoil having: a suction side; a pressure side opposing the suction side; a leading edge spanning between the pressure side and the suction side; and a trailing edge opposing the leading edge and spanning between the pressure side and the suction side; and
at least one endwall connected with the airfoil along the suction side, pressure side, trailing edge and the leading edge, the at least one endwall including a non-axisymmetric contour proximate a junction between the endwall and the leading edge of the airfoil,
wherein at least one of the suction side or the pressure side of the airfoil includes a nominal profile substantially in accordance with Cartesian coordinate values of X, Y and Z set forth in TABLE I, wherein the coordinate values are non-dimensional values of from 0 to 1 convertible to distances by multiplying the values by a trailing edge height expressed in units of distance, and wherein X and Y values connected by smooth continuing arcs define airfoil profile sections at each distance Z along the airfoil, the profile sections at the Z distances being joined smoothly with one another to form the airfoil profile, wherein the Cartesian coordinate values have an origin at a root of the leading edge of the airfoil.

9. The static nozzle section of claim 8, further comprising a fillet connecting a surface of the endwall to a surface of the airfoil.

10. The static nozzle section of claim 8, wherein the turbine nozzle includes a second stage nozzle.

11. The static nozzle section of claim 8, wherein the non-axisymmetric contour includes a thickened area having an apex at approximately 5% axial chord upstream of the leading edge.

12. The static nozzle section of claim 11, wherein the thickened area extends across at least approximately 10 percent of an axial length of the endwall, and has a pitch of approximately zero percent to approximately 10 percent from the suction side.

13. The static nozzle section of claim 11, wherein the thickened area extends across approximately 20 percent to approximately 30 percent of an axial length of the endwall.

14. The static nozzle section of claim 8, wherein the at least one endwall directs flow of a working fluid through a passage trough proximate the pressure side of the airfoil.

15. A turbine nozzle comprising:
an airfoil having: a suction side; a pressure side opposing the suction side; a leading edge spanning between the pressure side and the suction side; and a trailing edge opposing the leading edge and spanning between the pressure side and the suction side; and
at least one endwall connected with the airfoil along the suction side, pressure side, trailing edge and the leading edge, wherein at least one of the pressure side or the suction side of the airfoil includes a nominal profile substantially in accordance with Cartesian coordinate values of X, Y and Z set forth in TABLE I, wherein the coordinate values are non-dimensional values of from 0 to 1 convertible to distances by multiplying the values by a trailing edge height expressed in units of distance, and wherein X and Y values connected by smooth continuing arcs define airfoil profile sections at each distance Z along the airfoil, the profile sections at the Z distances being joined smoothly with one another to form the airfoil profile, wherein the Cartesian coordinate values have an origin at a root of the leading edge of the airfoil.

16. The turbine nozzle of claim 15, wherein the at least one endwall includes a non-axisymmetric contour proximate a junction between the endwall and the leading edge of the airfoil.

17. The turbine nozzle of claim 16, wherein the non-axisymmetric contour includes a thickened area having an apex at approximately 5% axial chord upstream of the leading edge.

18. The turbine nozzle of claim 16, wherein the thickened area extends across at least approximately 10 percent of an axial length of the endwall, and has a pitch of approximately zero percent to approximately 10 percent from the suction side.

* * * * *